Figure 1:
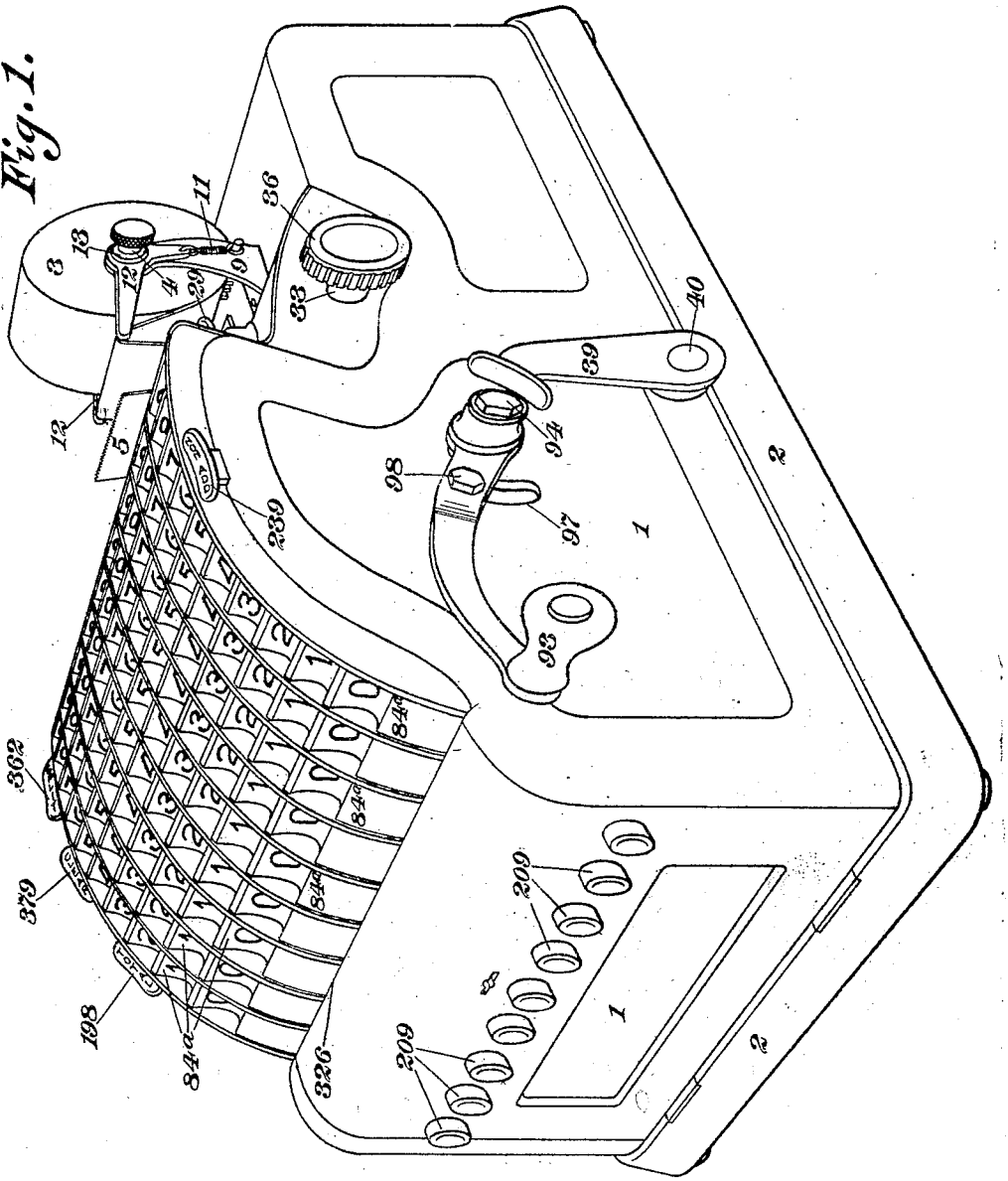

A. J. MEIER, W. L. SWIFT & E. L. RELLER.
CALCULATING MACHINE.
APPLICATION FILED APR. 13, 1912.

1,118,670.    Patented Nov. 24, 1914.
24 SHEETS—SHEET 5.

Witnesses:
Harry H. Reise.
George G. Anderson.

Inventors:
ALBERT JOHN MEIER, WILLIAM L. SWIFT, AND EDWIN L. RELLER,
By Hugh K. Wagner
Their Attorney.

A. J. MEIER, W. L. SWIFT & E. L. RELLER.
CALCULATING MACHINE.
APPLICATION FILED APR. 13, 1912.

1,118,670.

Patented Nov. 24, 1914.
24 SHEETS—SHEET 8.

Witnesses:
Harry H. Reiss
George G. Anderson

Inventors:
ALBERT JOHN MEIER, WILLIAM L. SWIFT, AND EDWIN L. RELLER,
By Hugh K. Wagner
Their Attorney.

A. J. MEIER, W. L. SWIFT & E. L. RELLER.
CALCULATING MACHINE.
APPLICATION FILED APR. 13, 1912.

1,118,670.

Patented Nov. 24, 1914.
24 SHEETS—SHEET 13.

Witnesses:
Harry H. Reiss
George G. Anderson

Inventors:
Albert John Meier, William L. Swift, and Edwin L. Reller,
By Hugh K. Wagner
Their Attorney A. J. MEIER, W. L. SWIFT & E. L. RELLER.
CALCULATING MACHINE.
APPLICATION FILED APR. 13, 1912.
1,118,670.
Patented Nov. 24, 1914.
24 SHEETS—SHEET 16.
Fig. 19.  Fig. 18.  Fig. 20.
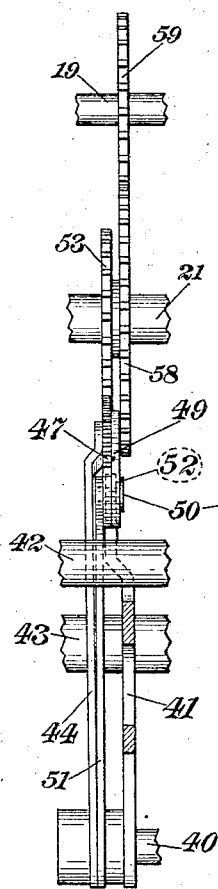
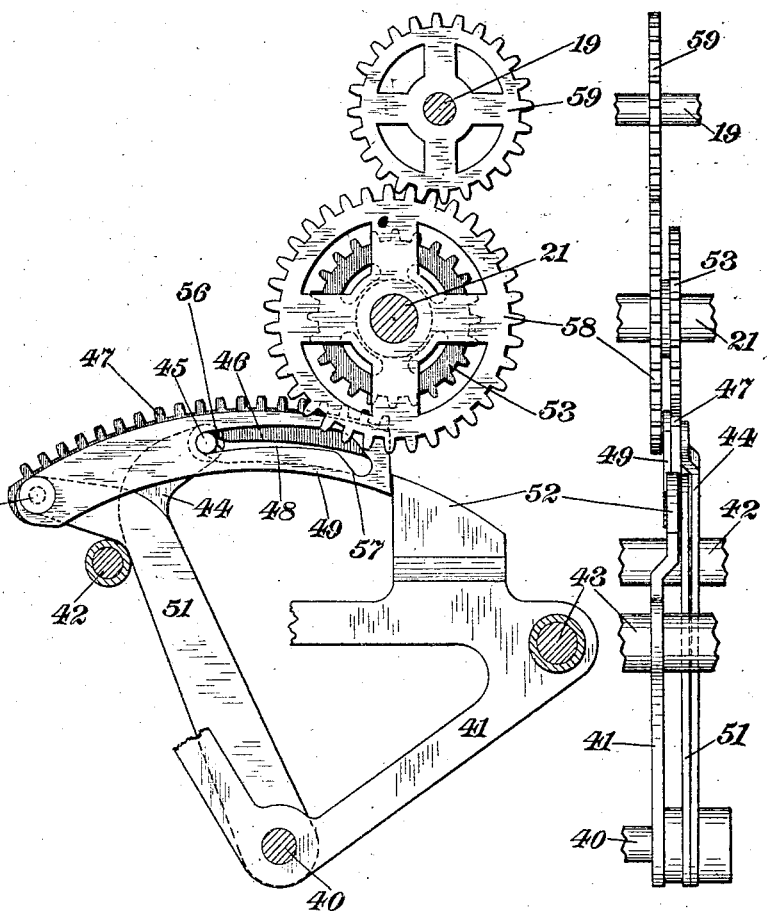
Witnesses:
Harry H. Reise
George G. Anderson
Inventors:
Albert John Meier, William L. Swift, and Edwin L. Reller,
By Hugh K. Wagner
Their Attorney A. J. MEIER, W. L. SWIFT & E. L. RELLER.
CALCULATING MACHINE.
APPLICATION FILED APR. 13, 1912.

1,118,670.

Patented Nov. 24, 1914.
24 SHEETS—SHEET 19.

Witnesses:
Harry H. Reiss.
George G. Anderson.

Inventors:
ALBERT JOHN MEIER, WILLIAM L. SWIFT, AND EDWIN L. RELLER,
By Hugh N. Wagner
Their Attorney A. J. MEIER, W. L. SWIFT & E. L. RELLER.
CALCULATING MACHINE.
APPLICATION FILED APR. 13, 1912.

1,118,670.

Patented Nov. 24, 1914.
24 SHEETS—SHEET 21.

*Fig. 26.*

*Fig. 27.*

Witnesses:
Harry H. Peiss.
George G. Anderson.

Inventors:
Albert John Meier, William L. Swift, and Edwin L. Reller,
By Hugh H. Wagner
Their Attorney.

A. J. MEIER, W. L. SWIFT & E. L. RELLER.
CALCULATING MACHINE.
APPLICATION FILED APR. 13, 1912.
1,118,670.
Patented Nov. 24, 1914.
24 SHEETS—SHEET 23.
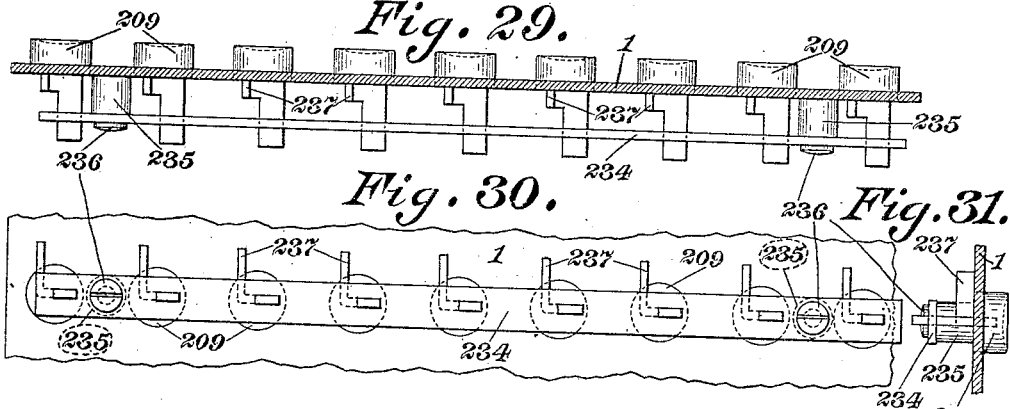
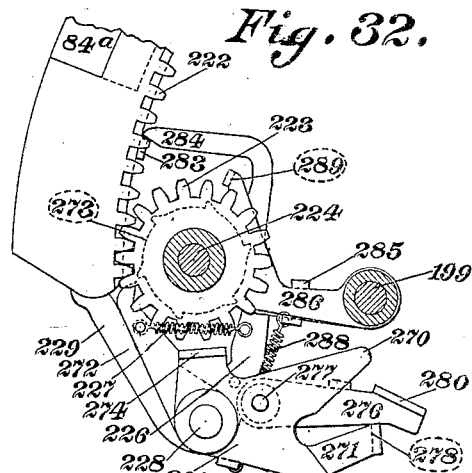
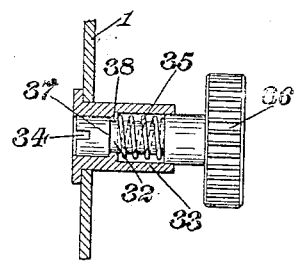
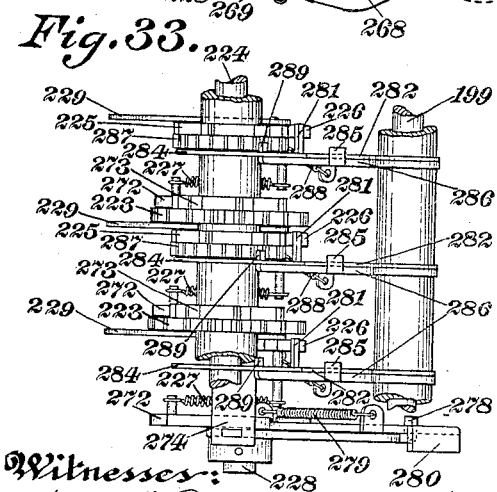
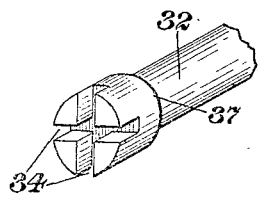
Witnesses:
Harry H. Reiss
George G. Anderson
Inventors:
Albert John Meier, William L. Swift, and Edwin L. Reller,
By Hugh K. Wagner
Their Attorney.

A. J. MEIER, W. L. SWIFT & E. L. RELLER.
CALCULATING MACHINE.
APPLICATION FILED APR. 13, 1912.

1,118,670.

Patented Nov. 24, 1914.
24 SHEETS—SHEET 24.

Witnesses:
Harry H. Peiss
George G. Anderson

Inventors:
Albert John Meier, William L. Swift, and Edwin L. Reller,
By Hugh K. Wagner
Their Attorney.

UNITED STATES PATENT OFFICE.

ALBERT JOHN MEIER, OF GLENDALE, AND WILLIAM L. SWIFT AND EDWIN L. RELLER, OF ST. LOUIS, MISSOURI, ASSIGNORS TO THE DUPLEX ADDING MACHINE COMPANY, OF ST. LOUIS, MISSOURI, A CORPORATION OF MISSOURI.

CALCULATING-MACHINE.

1,118,670.   Specification of Letters Patent.   Patented Nov. 24, 1914.

Application filed April 13, 1912. Serial No. 690,514.

*To all whom it may concern:*

Be it known that we, ALBERT J. MEIER, WILLIAM L. SWIFT, and EDWIN L. RELLER, citizens of the United States, said ALBERT J. MEIER residing at Glendale, in the county of St. Louis, State of Missouri, and said WILLIAM L. SWIFT and EDWIN L. RELLER residing at the city of St. Louis, State of Missouri, have invented certain new and useful Improvements in Calculating-Machines, of which the following is a specification, reference being had therein to the accompanying drawings.

This invention relates to calculating machines, and embodies improvements of the apparatus described and illustrated in the pending application of Edwin A. Reed, Edwin L. Reller, William L. Swift, and Albert J. Meier, Serial No. 618,655, filed April 3, 1911, the object being to provide a generally improved calculating machine, as will be hereinafter described, the features of novelty being set forth particularly in the claims.

Figure 2:
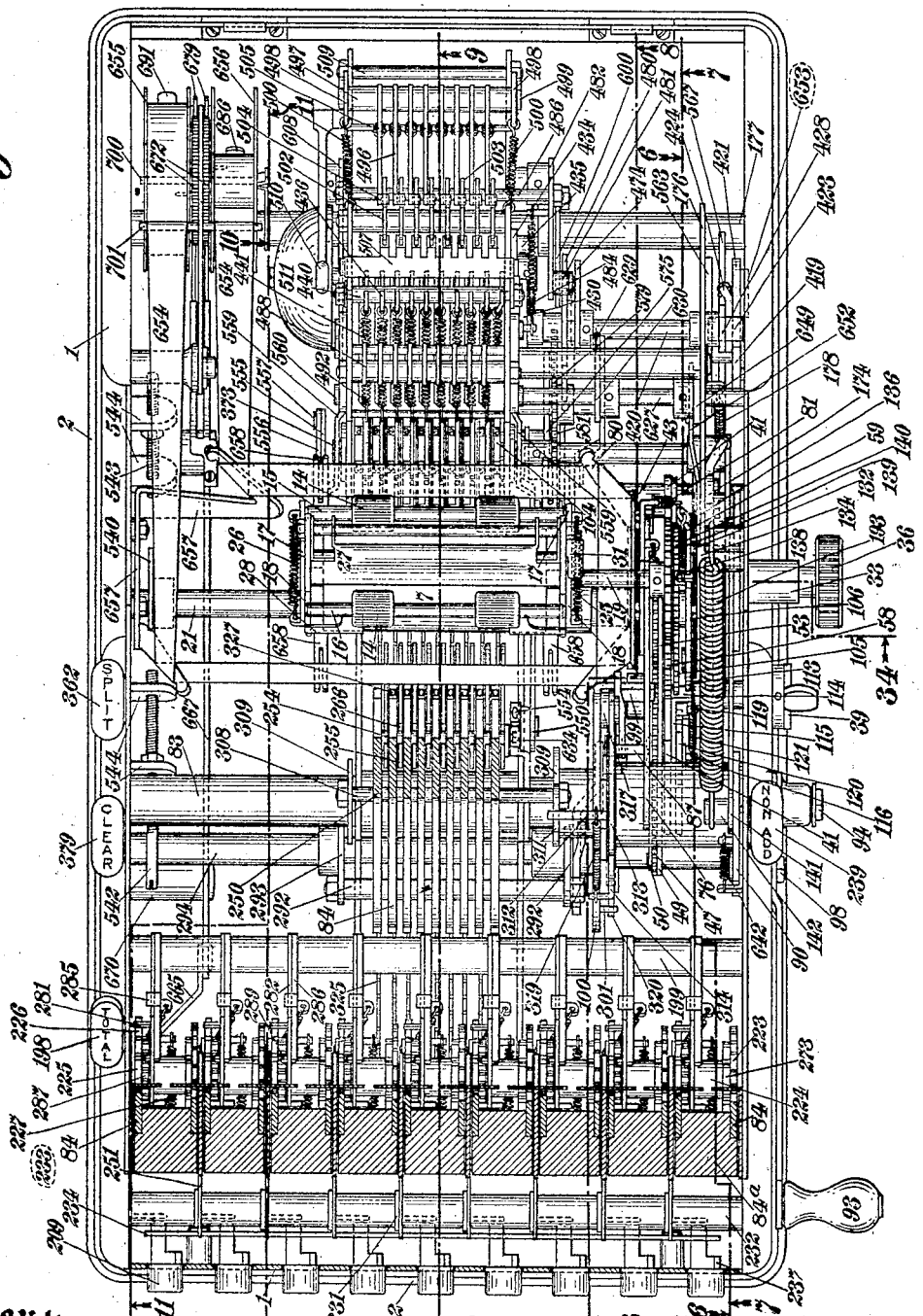
Figure 3:
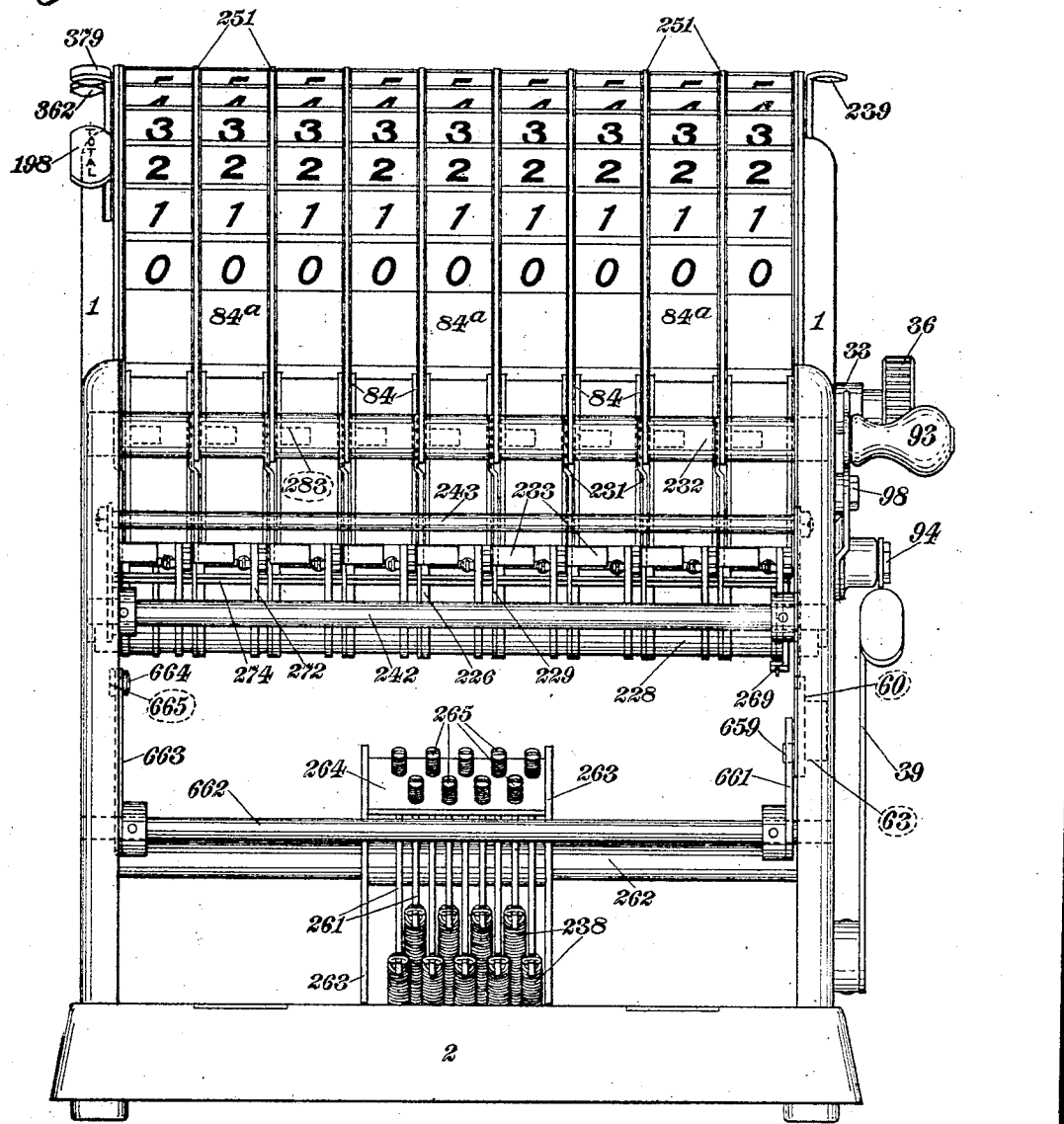
Figure 4:
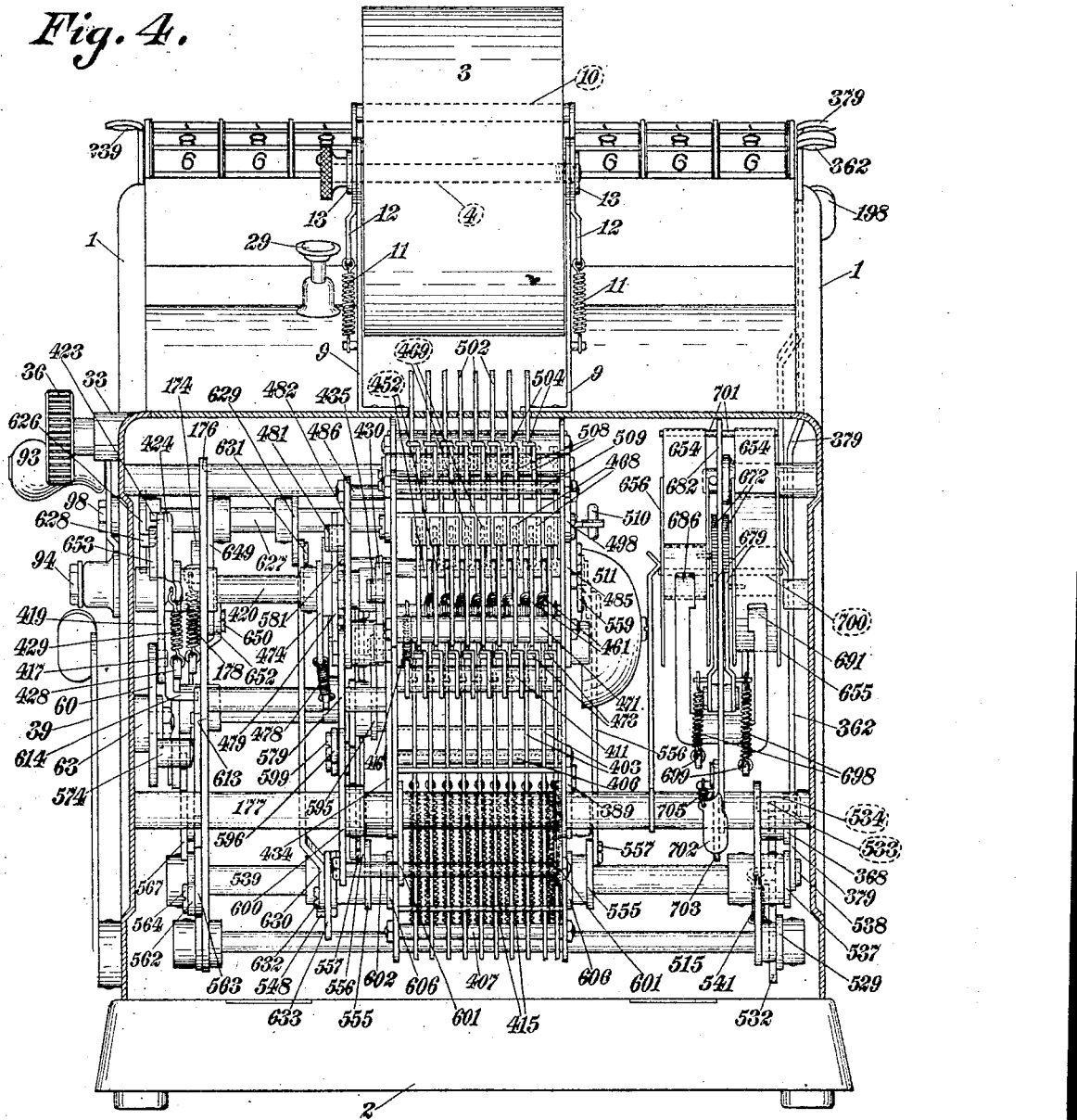
Figure 5:
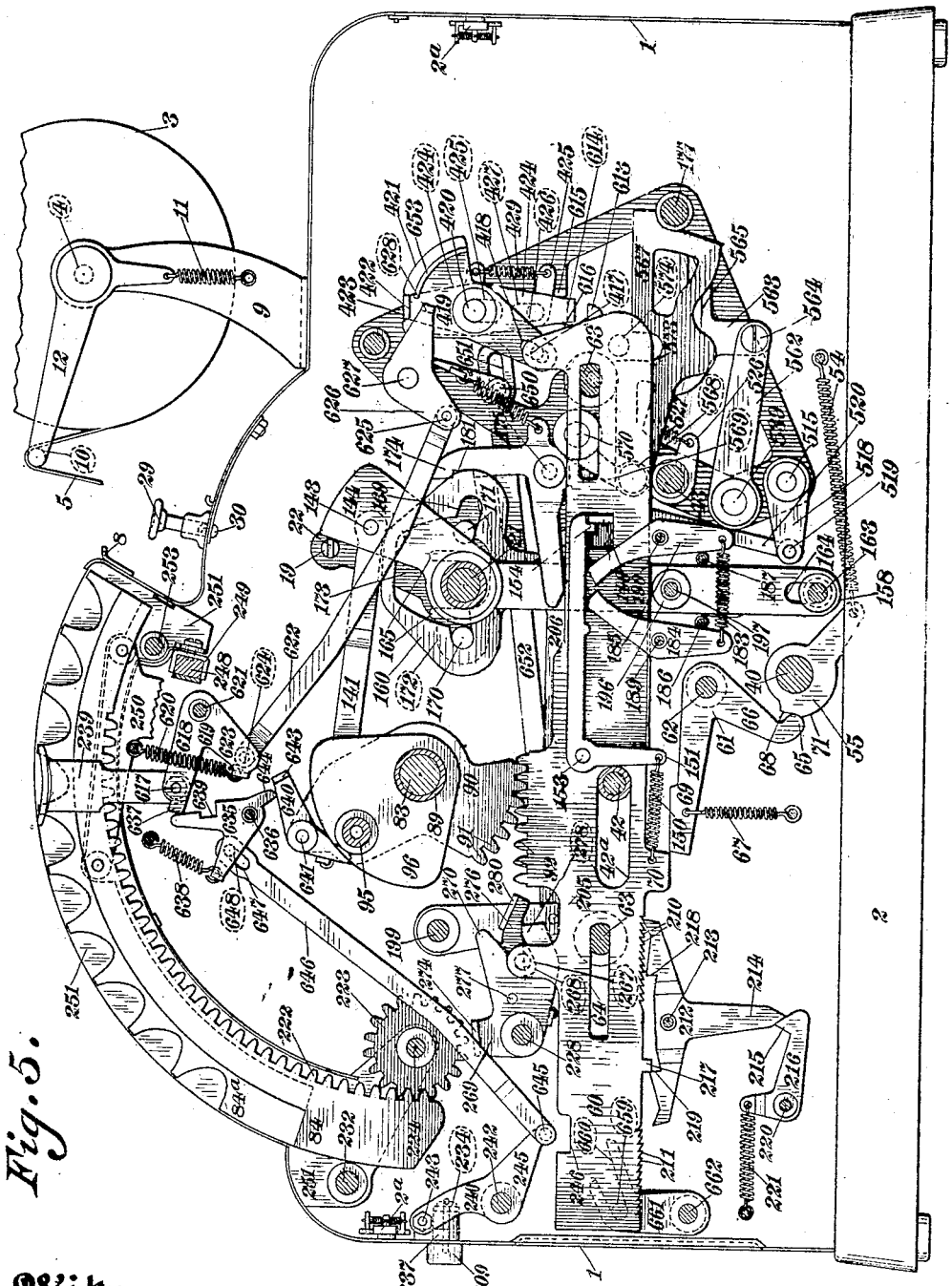
Figure 6:
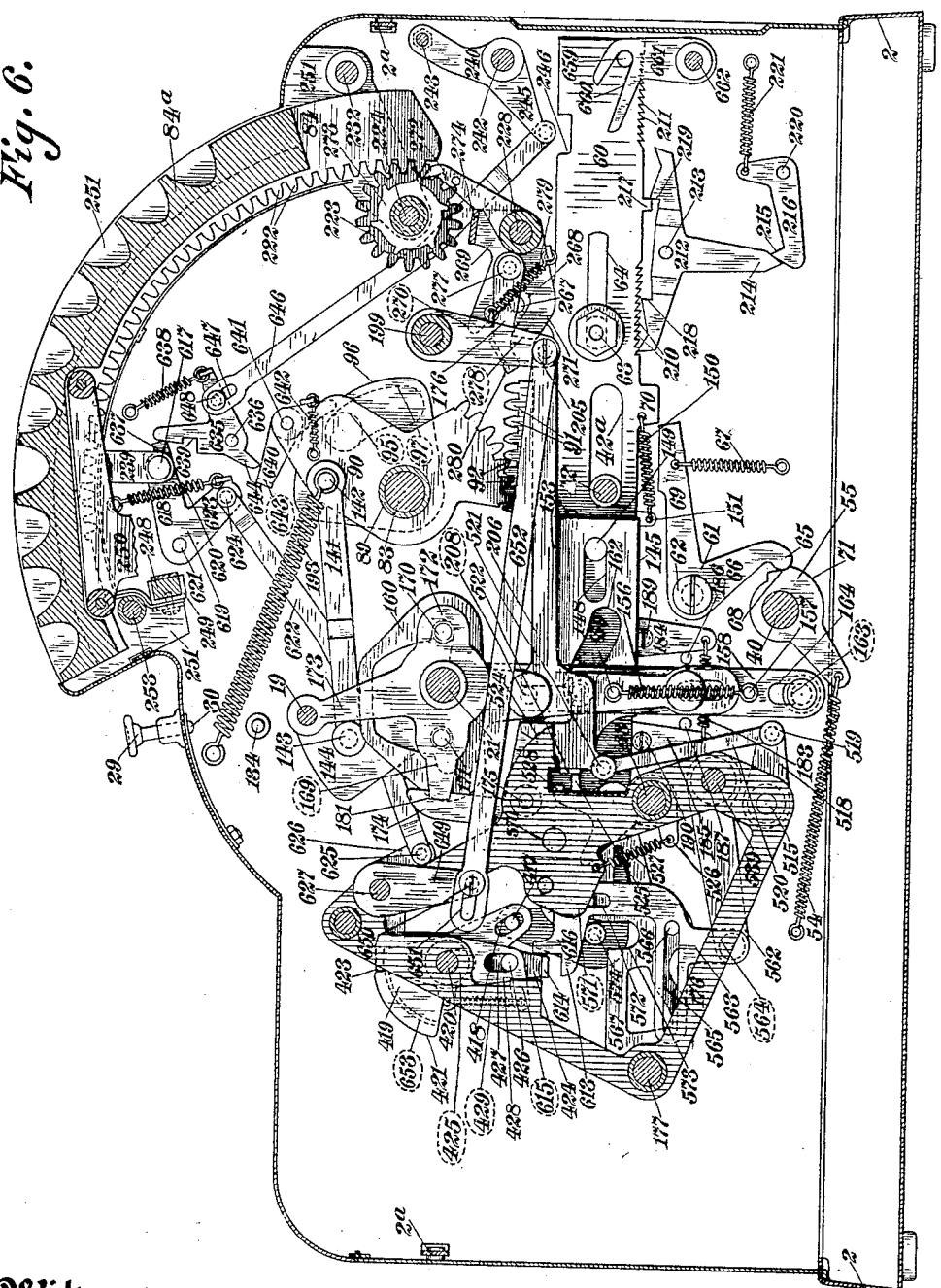
Figure 7:
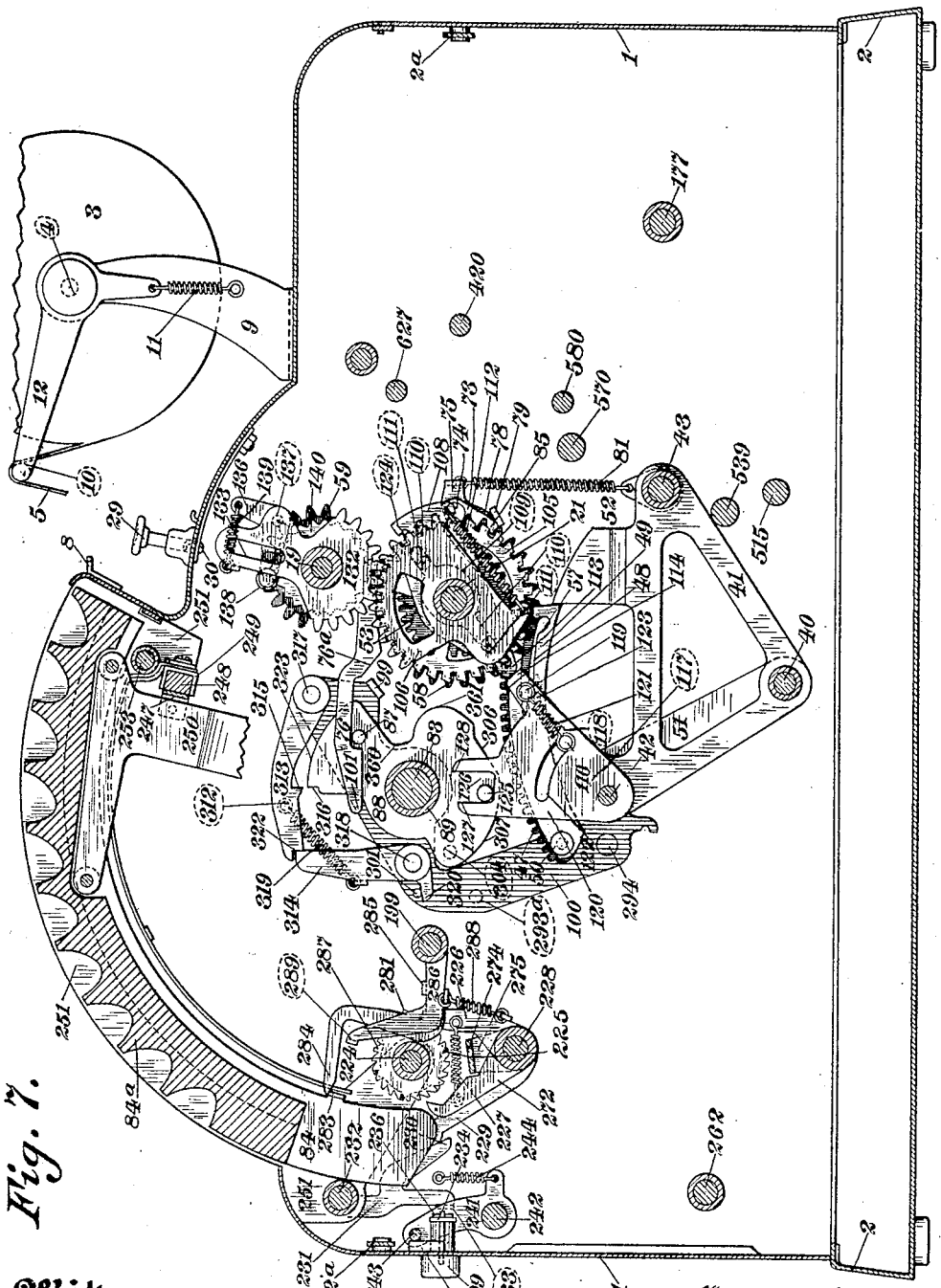
Figure 8:
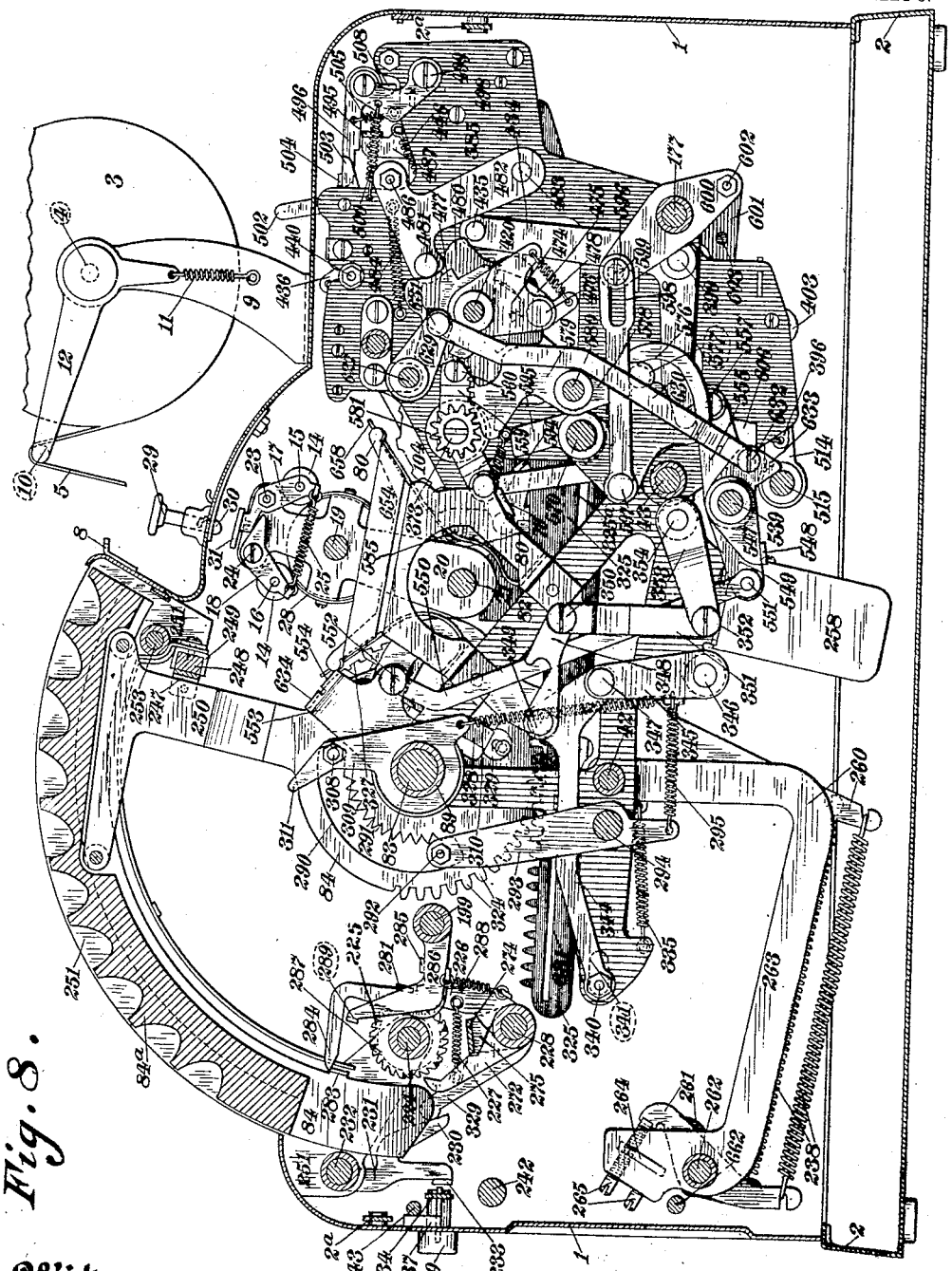
Figure 9:
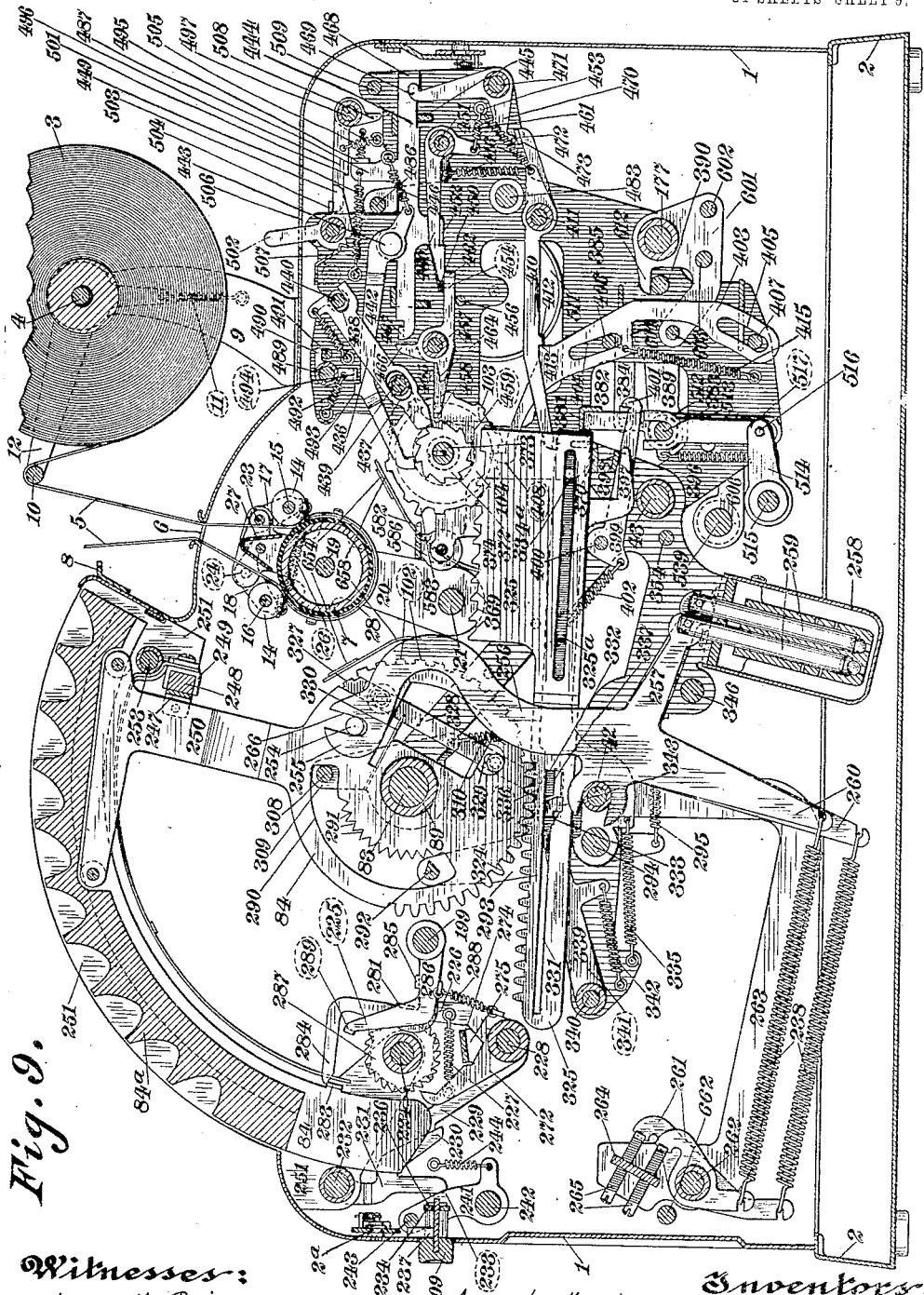
Figure 10:
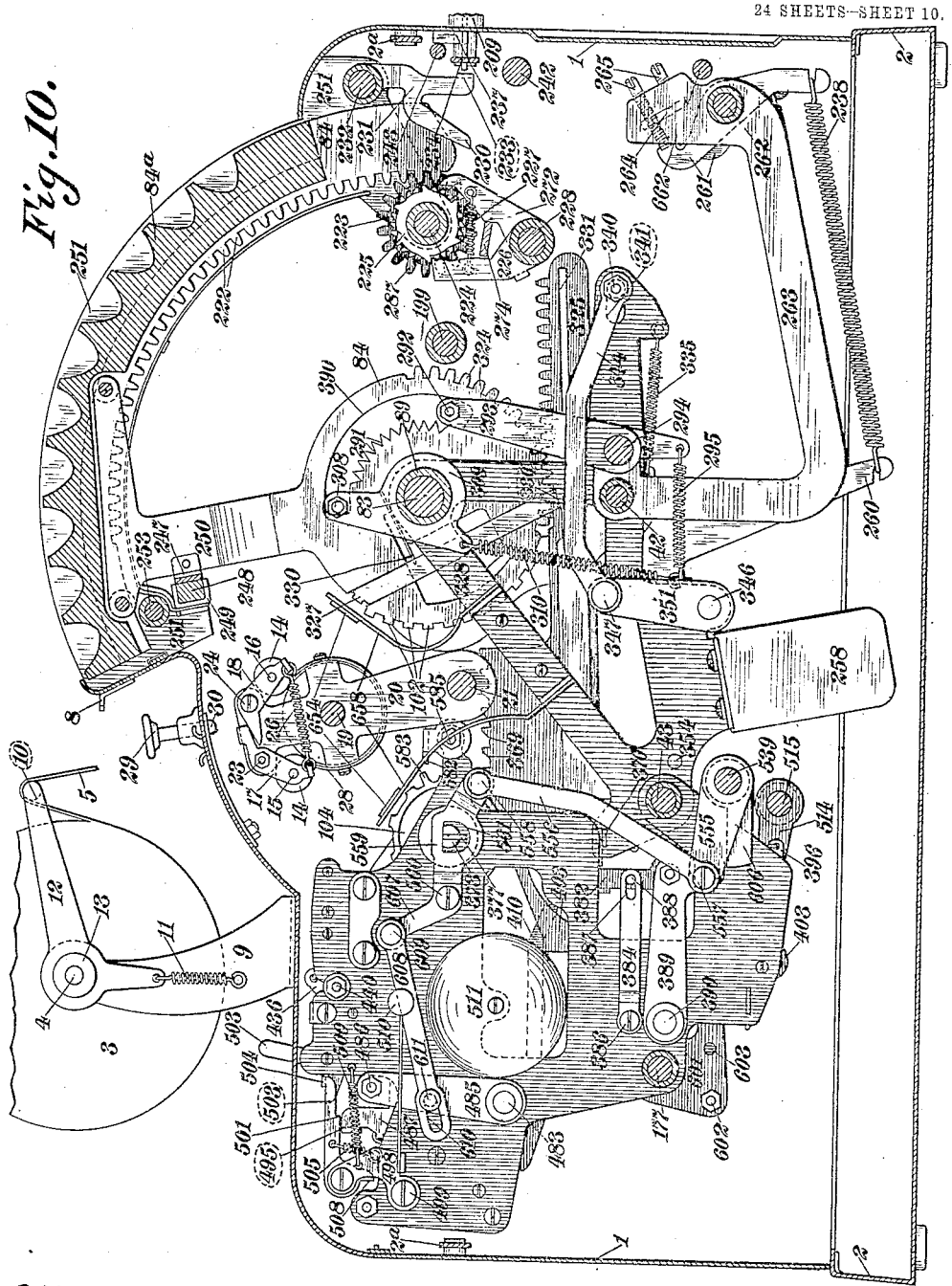
Figure 11:
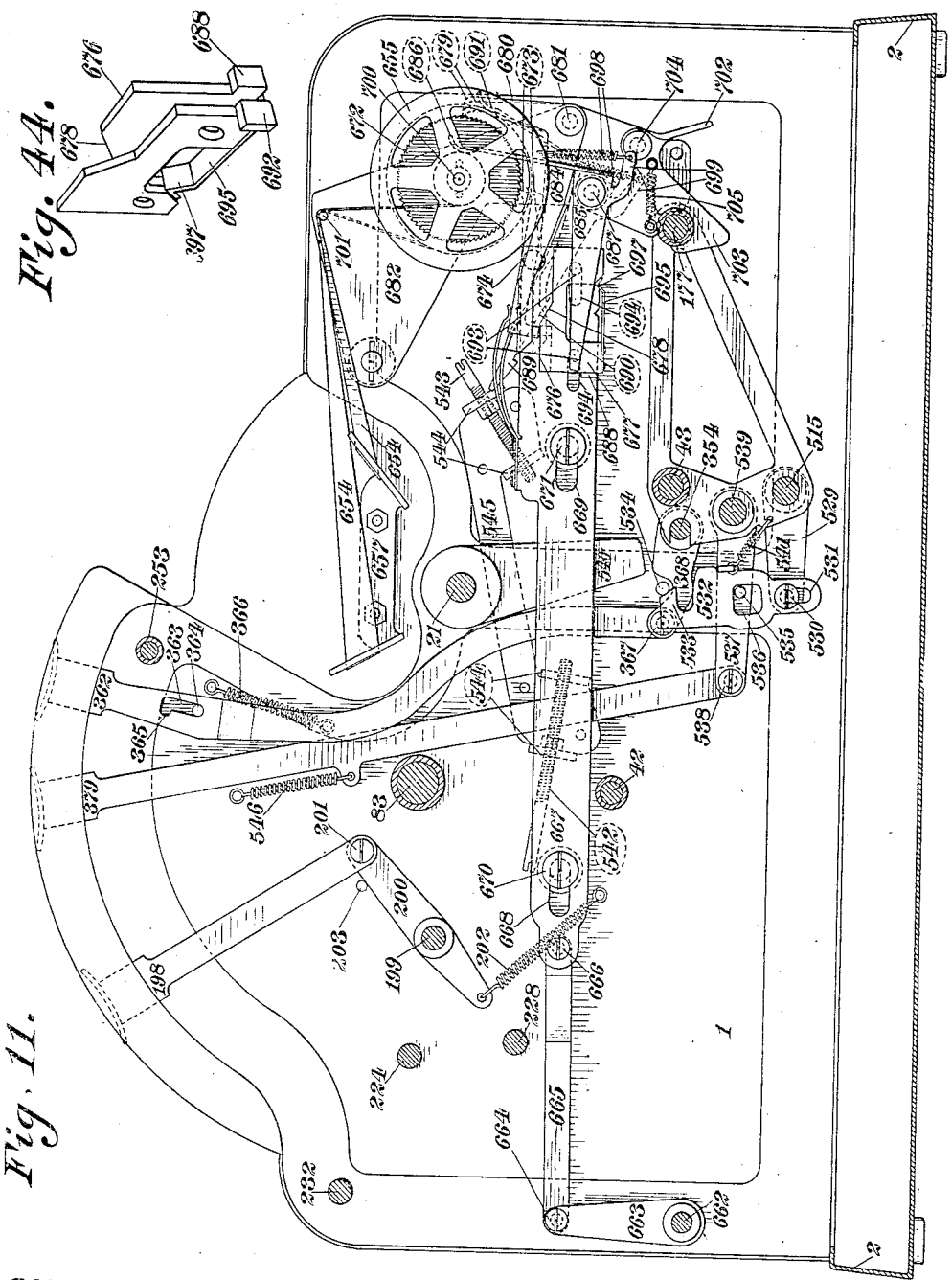
Figure 12:
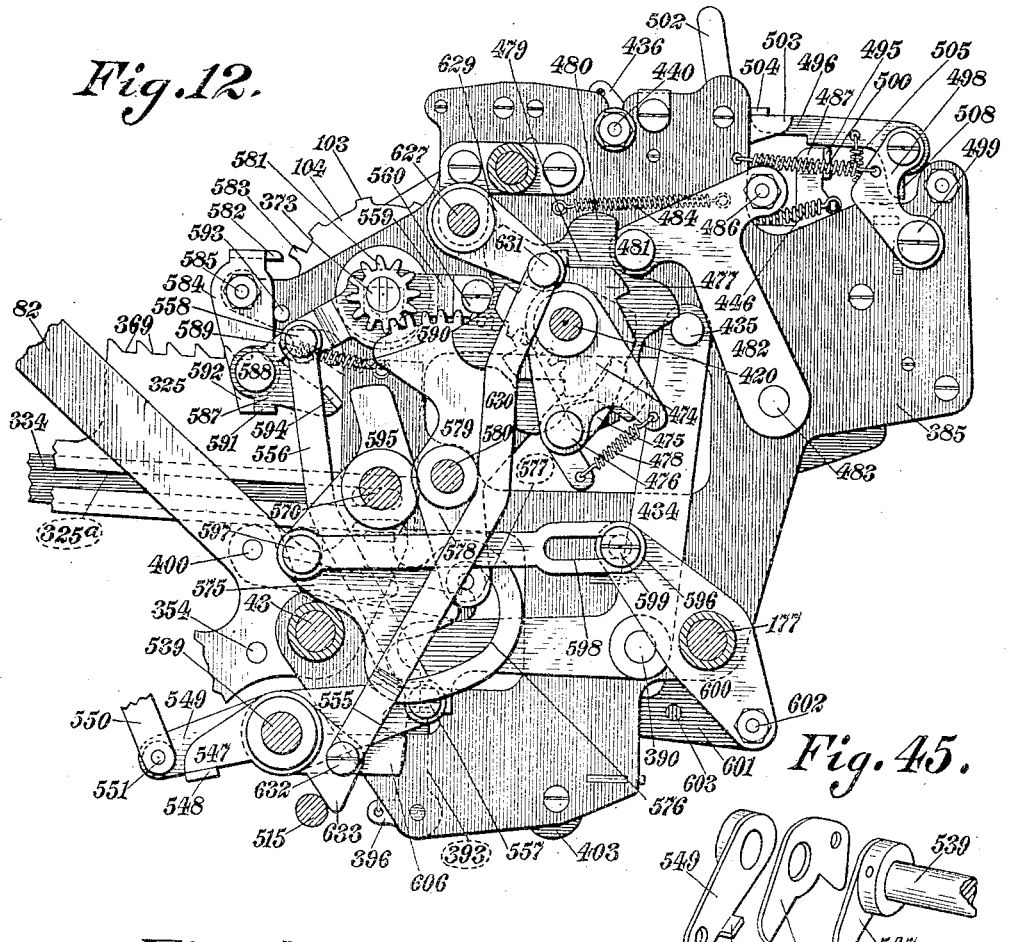
Figure 13:
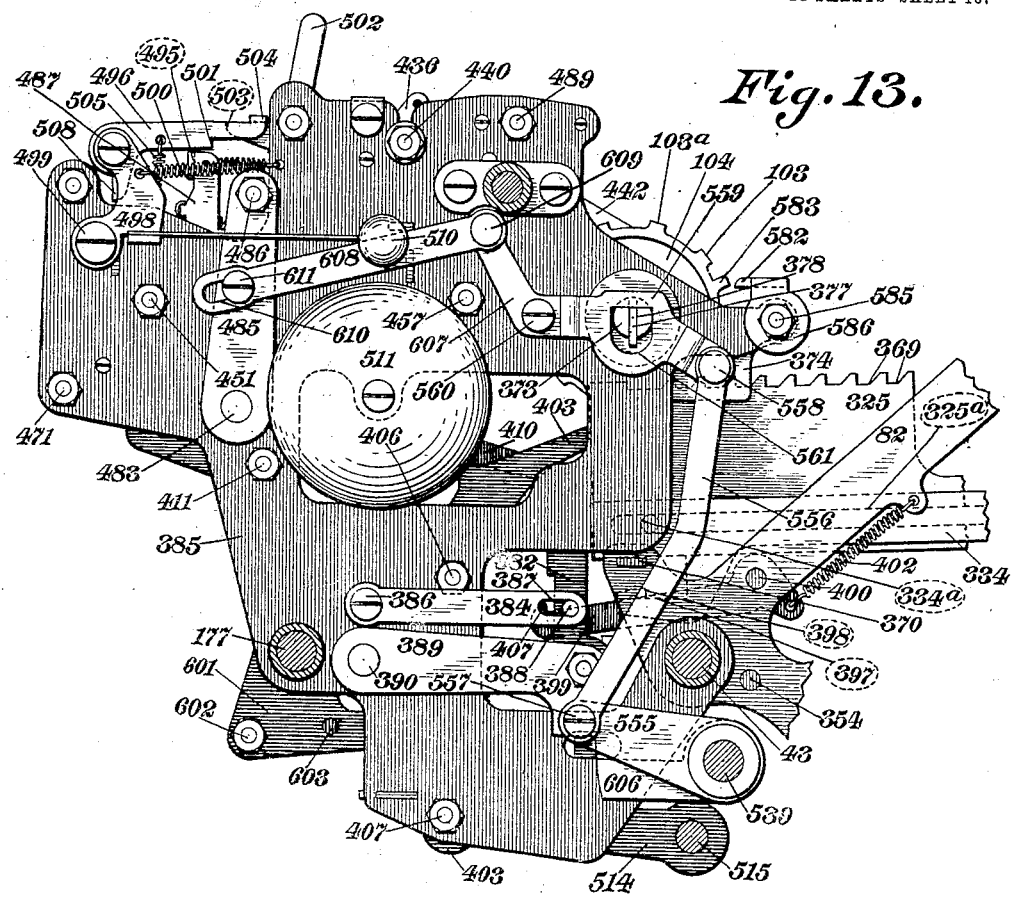
Figure 43:
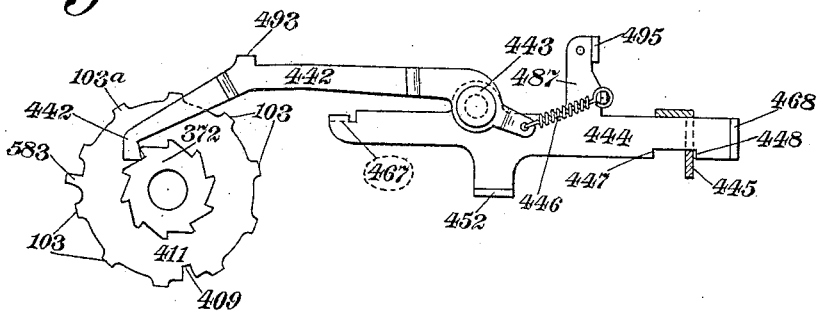
Figure 14:
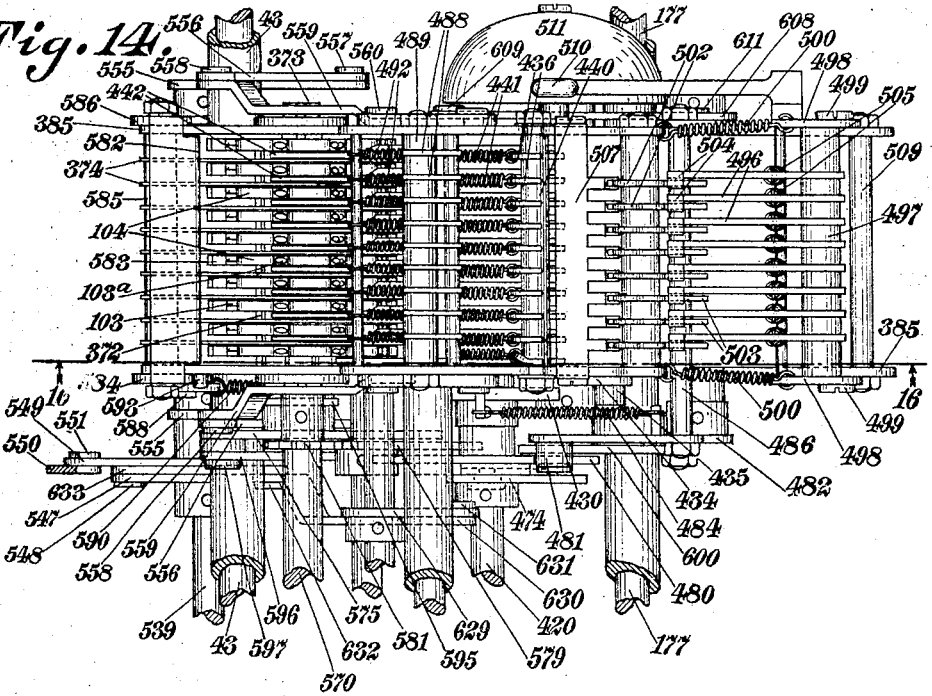
Figure 15:
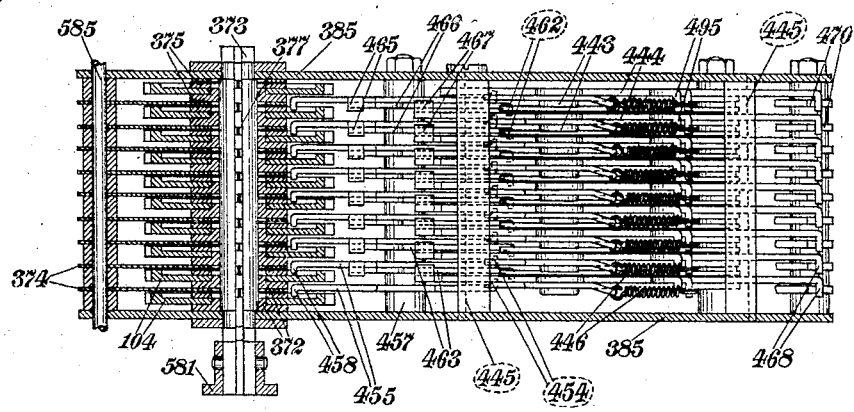
Figure 16:
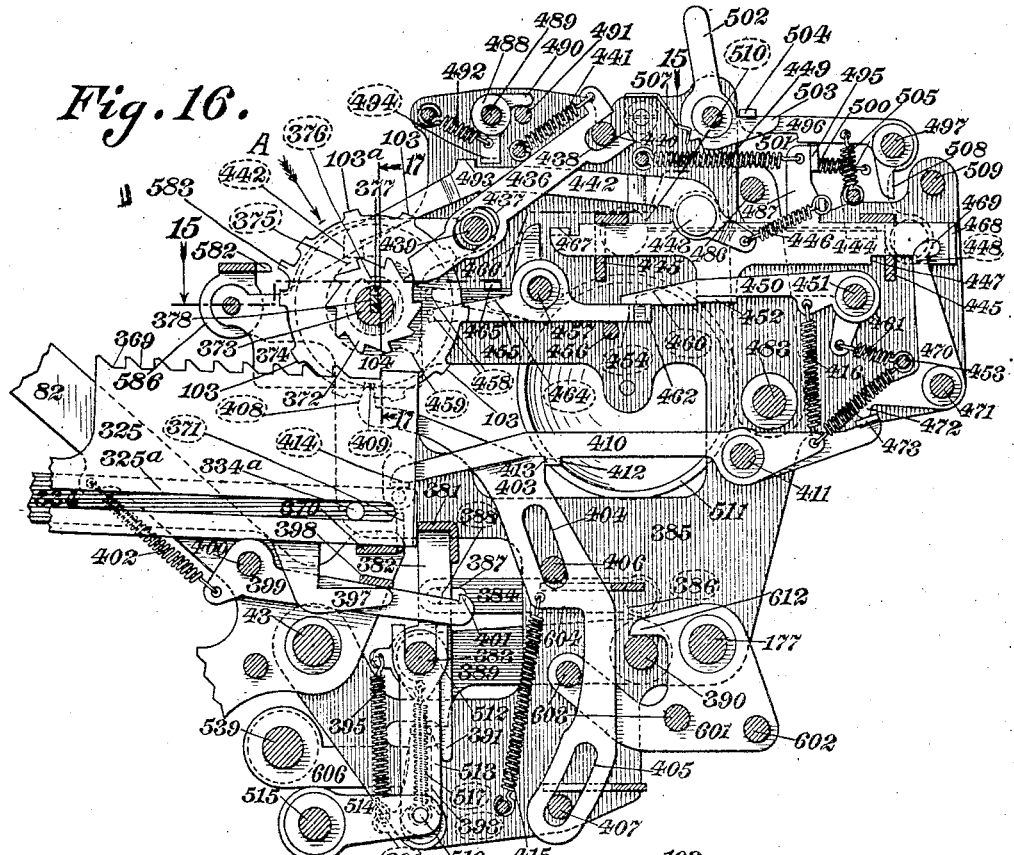
Figure 17:
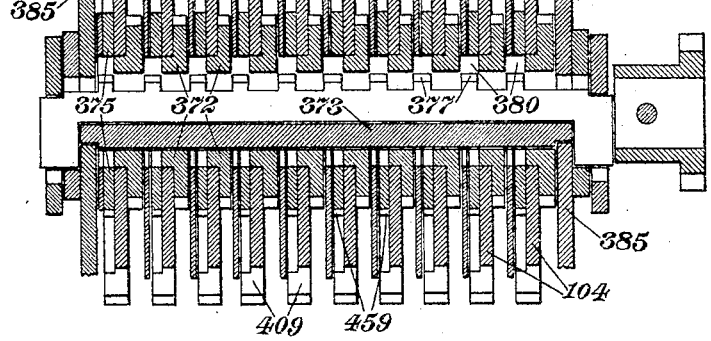
Figure 21:
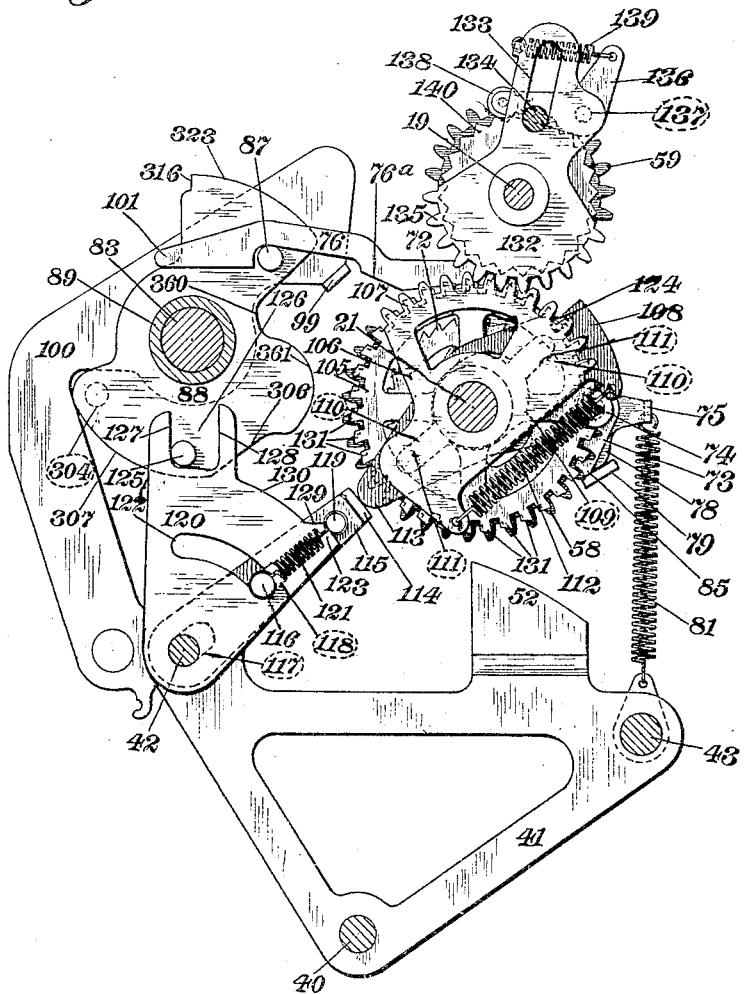
Figure 22:
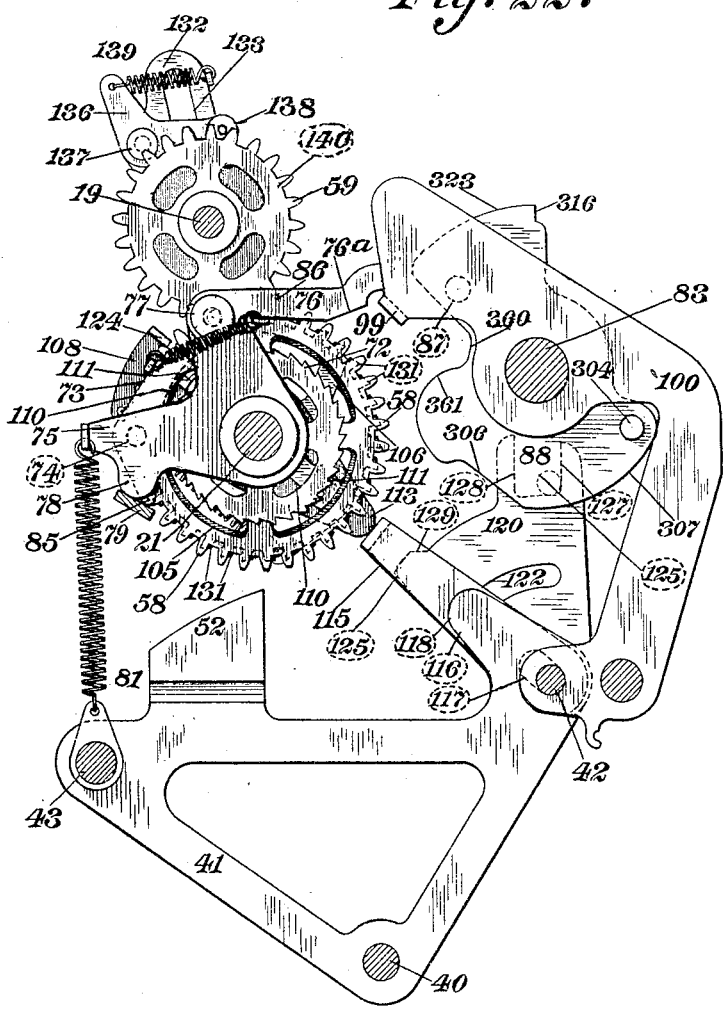
Figure 23:
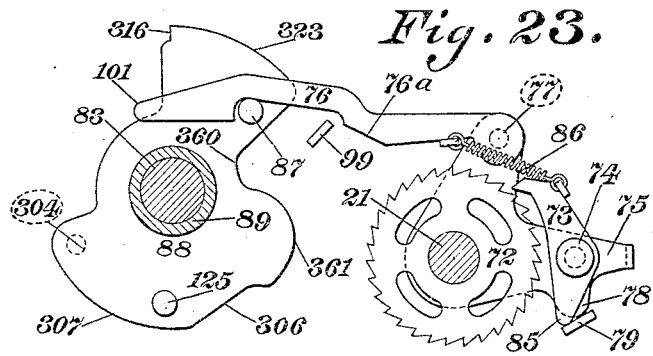
Figure 24:
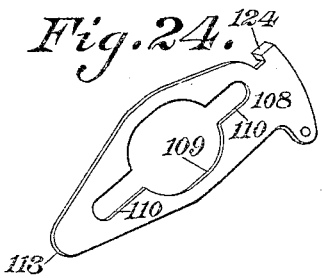
Figure 36:
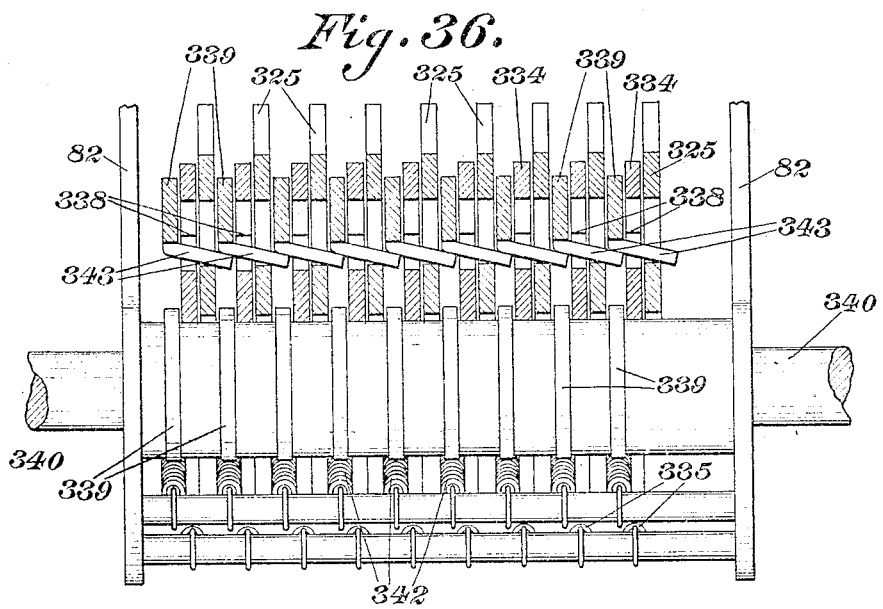
Figure 25:
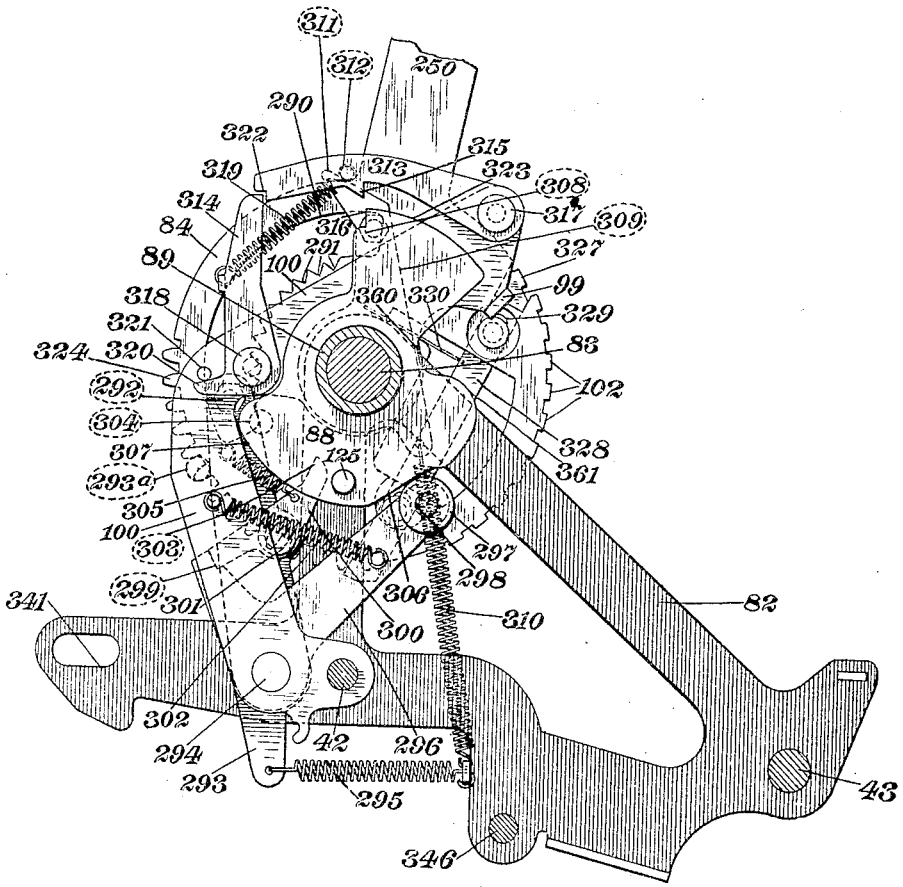
Figure 28:
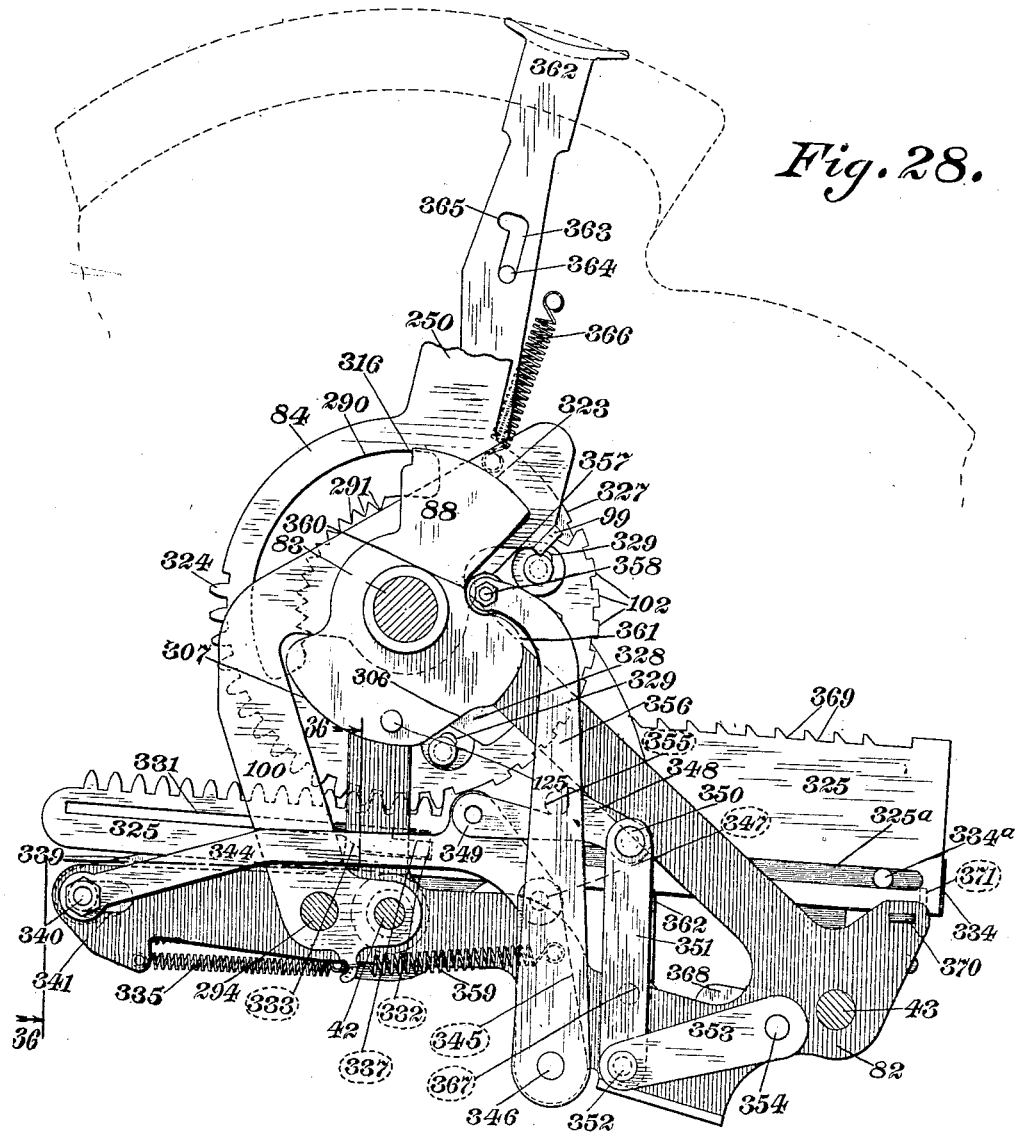
Figure 37:
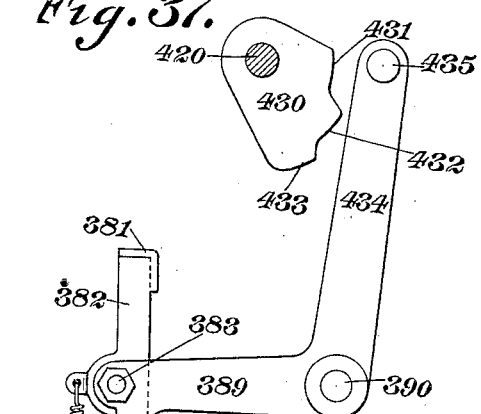
Figure 38:
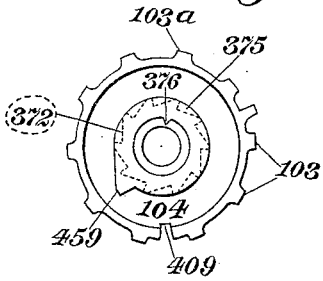
Figure 39:
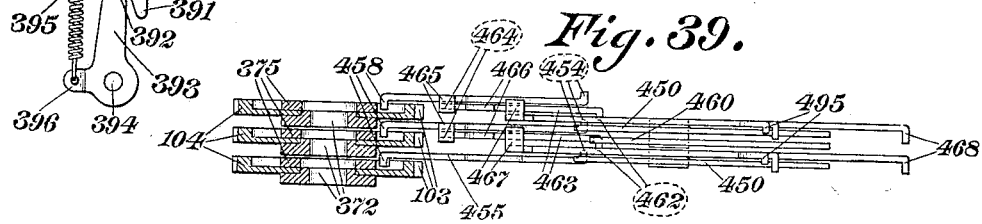
Figure 40:
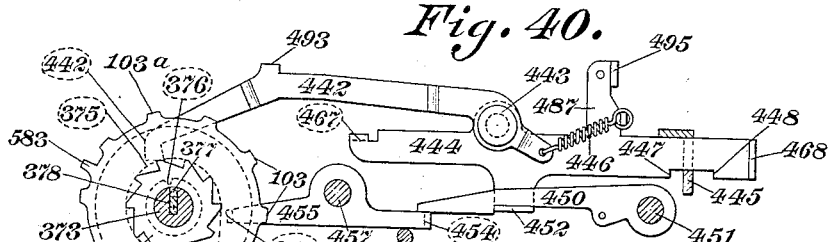
Figure 41:
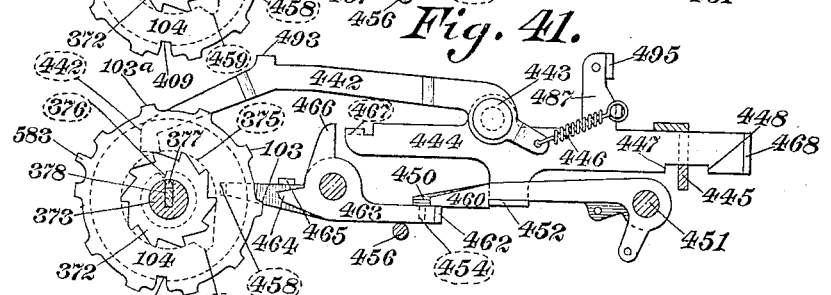

In the accompanying drawings forming part of this specification, in which like numbers of reference denote like parts wherever they occur, Figure 1 is a perspective view of the machine; Fig. 2 is a top plan view of the machine with the cover plate removed and some of the parts broken away to expose some of the internal mechanism; Fig. 3 is a front elevation of the machine with the front plate removed; Fig. 4 is a rear elevation of the machine with the rear plate removed; Fig. 5 is a right side elevation of the machine with the right side plate removed; Fig. 6 is a sectional view on the line 6—6, Fig. 2; Fig. 7 is a sectional view on the line 7—7, Fig. 2; Fig. 8 is a sectional view on the line 8—8, Fig. 2; Fig. 9 is a sectional view on the line 9—9, Fig. 2; Fig. 10 is a sectional view on the line 10—10, Fig. 2; Fig. 11 is a sectional view on the line 11—11, Fig. 2; Fig. 12 is a right side elevation of the accumulator; Fig. 13 is a left side elevation of the accumulator; Fig. 14 is a top plan view of the accumulator; Fig. 15 is a sectional view on the line 15—15, Fig. 16; Fig. 16 is a sectional view on the line 16—16, Fig. 14; Fig. 17 is a sectional view, on an enlarged scale, on the line 17—17, Fig. 16; Fig. 18 is a diagrammatical view of the visible item mechanism; Figs. 19 and 20 are, respectively, left and right elevations of same; Figs. 21 and 22 are diagrammatical views of the normal paper-feeding mechanism, looking at opposite sides thereof; Fig. 23 is a diagrammatical view showing the normal relation between the paper-feeding ratchet and its pawl; Fig. 24 is a detailed perspective view of one of the parts of the paper-feeding mechanism; Fig. 25 is a diagrammatical view showing the item type-centering means, and the handle-locking mechanism; Fig. 26 is a diagrammatical view showing the platen operating mechanism; Fig. 27 is a detailed perspective view of the slidable plate of the platen operating mechanism; Fig. 28 is a diagrammatical view showing the automatic cipher mechanism and the operating means therefor; Figs. 29, 30, and 31 are detailed views of the error keys; Fig. 32 is a right end elevation of the shaft bearing the sector-locking mechanism and parts associated therewith; Fig. 33 is a top plan view of the sector-locking mechanism for two of the sectors; Fig. 34 is a sectional view on the line 34—34, Fig. 2, showing the manual paper-feeding device; Fig. 35 is a detailed perspective view showing the grooved end of the manual paper-feeding device; Fig. 36 is a sectional view, on an enlarged scale, on the line 36—36, Fig. 28; Fig. 37 is a diagrammatical view showing the normal relation between the accumulator jack and means for raising same; Fig. 38 is a detailed elevation of an accumulator wheel; Fig. 39 is a horizontal sectional view through the centers of the units, tens, and hundreds accumulator wheels, showing the setting mechanism for the carry-over pawls; Fig. 40 is a diagrammatical view showing the units accumulator wheel and parts associated therewith for setting the carry-over pawl of the tens accumulator wheel; Fig. 41 is a diagrammatical view showing the tens accumulator wheel and parts associated therewith for setting the carry-over mechanism of the hundreds accumulator wheel; Fig. 42 is a diagrammatical view showing the position of a carry-over pawl when its accumulator wheel 104 stands with a type-face thereon in printing position; Fig. 43 is a diagrammatical view showing a carry-over pawl in position to rotate its accumulator wheel; and Figs. 44 and 45 are detailed views.

*The casing.*—The casing 1 incloses nearly all of the moving parts, and internally affords bearings for various shafts and supports for other parts and means for binding all the parts of the machine together, the side plates of the casing being secured firmly to a suitable base 2, the front and rear plates being held in place by locking devices 2ª, such as are described and illustrated in the above-mentioned application, or by other suitable means, and the top plate being held in place by the rear plates or by other suitable means.

*The paper.*—The roll 3 of paper is preferably mounted above the machine on a suitable shaft 4, and the paper 5 feeds through slot 6 Fig. 9 in the top plate of the casing 1 to the platen 7, and around same, and out through the same slot to a point adjacent to knife 8, which is mounted on casing 1, said shaft being detachably secured to standards 9 that are mounted on the top plate of casing 1, so that same can be removed to mount a fresh roll of paper thereon. Pieces of paper bearing separate amounts, tabulations, or totals can be torn off strip 5 by pulling said strip against knife 8.

In order to keep the paper 5 taut, an idle rod 10 Fig. 5 is kept pressed against same by the tension of springs 11 on bell-cranks 12, or equivalent means, said rod 10 being shown in the drawings as connecting such bell-cranks which are mounted on studs 13 Fig. 1 borne by standards 9.

The paper 5 is pressed against platen 7 by two pairs of rollers 14 Figs. 8 and 10, a rod 15 extending between one of said pairs and a rod 16 between the other pair, and each of said rods extending through and beyond its pair of rollers 14. Beyond rollers 14, rod 15 is journaled in a pair of members 17, and rod 16 is, in like manner, journaled in a pair of members 18. The platen 7 is rigidly mounted on a shaft 19, which is journaled in a pair of arms 20 rigidly mounted on shaft 21, and is adapted to swing with and to be operated by said arms. The shaft 19 extends beyond one of the arms 20 and terminates within a short distance of the right side plate of the casing, the end of same being provided with a projection or tongue 22, Fig. 5, which preferably extends transversely thereof for the purpose hereinafter described. Members 17 are pivoted at 23, Figs. 8 and 10, to arms 20, respectively, and members 18 are likewise pivoted at 24, respectively, to arms 20. A spring 25 holds one of the members 17 and its coöperating member 18 together, and spring 26 does the same for the other member 17 and its corresponding member 18, and thus rollers 14 are held in pressing engagement with the paper on the platen 7. One wing of a paper guide 27, Fig. 9, directs the course of the paper toward platen 7 at the time when paper 5 reaches same, and another wing of said guide directs the paper 5 as it leaves the platen 7 toward the knife 8. While passing around the platen 7, the paper is held in contact therewith and directed by a pair of guides 28.

When it is desired to place a fresh roll 2 of paper on shaft 4, and on some other occasions, it is convenient to be able to release the pressure of rollers 14 from paper 5 and for this purpose button 29, Fig. 8, is provided. Its shank 30 is adapted to engage projection 31 on one of the members 17 and to depress same, thus forcing said projection into contact with the heel of its coöperating member 18, by which movement said members 17 and 18 are caused to rock on their pivotal points, whereby the rollers 14 are moved away from the paper, so as to release pressure from same.

*Hand paper-feeding mechanism.*—In order to afford a means for rotating the platen 7 for any necessary purposes, a rod 32, Figs. 34 and 35, is rotatably and reciprocatively mounted in a sleeve 33 that is preferably secured to the right side plate of casing 1 and is disposed in substantially axial alinement with the platen shaft 19, when the latter is in normal position. The inner end of rod 32 has a groove 34 or a plurality of such grooves extending transversely thereof, so that, when the rod 32 is moved longitudinally toward the end of the platen shaft 19, the projection 22 on the end of the latter enters a groove 34 in the end of rod 32, whereby said shaft is caused to rotate with said rod when the latter is rotated. A spring 35 exerts its pressure against the shank of a knob 36 on the outer end of rod 32 and thereby tends to move said rod outwardly and to hold same in normal position, such outward movement of rod 32 being limited by the engagement of its shoulder 37 with an offset 38 in sleeve 33, so that, normally, the groove end of said rod lies entirely within said sleeve, as best seen in Fig. 34. The knob 36 is utilized to effect the reciprocation of rod 32, in order to couple same to the platen shaft 19, and, also, the rotation of said rod, so as to rotate the platen 7 for any necessary purposes, such, for instance, as when it is desired to feed the paper forward to a certain position where a particular item or total will be presented in such position that it can be torn off by knife 8 or when a new roll of paper has just been placed on shaft 4.

*Item-displaying mechanism.*—To make a particular item printed on paper 5 visible when desired, mechanism is provided which is controlled by a lever 39, Fig. 1, that is preferably located exteriorly adjacent the right side of casing 1. Said lever 39 is rigidly mounted on shaft 40, Figs. 18 to 20, which is journaled in the right side plate of casing 1 and, also, in the frame 41, the latter being preferably somewhat triangular-shaped and being supported by the cross-rods 42 and 43 that extend from one side to the other of casing 1. When the lever 39 is pushed in the direction away from where the operator normally stands in front of the machine, same causes the shaft 40 to rotate clockwise, Figs. 5, 7, and 18, said shaft, in turn, causing the arm 44 rigidly mounted thereon to rotate therewith. A pin 45 borne by arm 44 protrudes through a slot 46 in a segmental rack 47 and, also, through a slot 48 in an arcual plate 49, said rack and plate being pivotally attached at 50 to an arm 51 that is loosely mounted on shaft 40, and said slots being disposed substantially opposite each other. Said pin 45 normally seats in the rear ends of the slots 46 and 48 in rack 47 and plate 49, respectively, and holds said rack and plate normally in a position in which the forward ends of same stand directly behind the projection 52 on frame 41 and, also, holds said rack normally out of engagement with the pinion 53, which is rotatably mounted on shaft 21. The projection 52 on frame 41 normally prevents the rack 47 and plate 49 from being moved forwardly by pin 45 borne by arm 44, and is preferably arcuated, in order to allow said rack 47 and plate 49 to pass thereover and in close proximity thereto after said rack and plate have been raised sufficiently by said pin, in the manner about to be described. A spring 54, Fig. 5, attached to cam-plate 55 rigidly mounted on shaft 40 returns and retains the lever 39 and parts actuated thereby to and in their normal positions when said lever is released, such return movement being limited by the engagement of arms 44 and 51 with the cross-rod 42, as depicted in Fig. 18. When the lever 39 is pushed away from the operator and thereby rotates shaft 40 clockwise, Fig. 18, the arm 44 moves toward the right and causes the pin 45 to travel forwardly in the slots 46 and 48 in rack 47 and plate 49, respectively. This forward movement of pin 45 causes same to move out of the inclined rear end 56 of slot 46 and thereby raises the forward end of said rack sufficiently to bring the teeth of said rack into engagement with the pinion 53, at the same time raising the forward end of said rack sufficiently to pass over the projection 52 on frame 41. This raising of the rack 47 into engagement with pinion 53 brings same into a position in which the forward part of slot 46 is substantially concentric to the shaft 40, so that the remainder of the forward travel of pin 45 in said slot holds said rack into engagement with said pinion. The rear part of the slot 48 is normally concentric to the shaft 40, so that, when the pin 45 travels forwardly and raises the rack 47, as just described, simultaneously, said pin travels forwardly in the concentric part of slot 48 and thereby holds the plate 49 in such position that its forward end remains behind the projection 52 on frame 41 until after the rack 47 has been raised into engagement with the pinion 53, at which time the pin 45 enters the declined forward end 57 of slot 48 and thereby raises the forward end of plate 49 sufficiently to pass over the projection 52. The pin 45 reaches the forward ends of slots 46 and 48 simultaneously, and then travels further in the same direction, thereby drawing the rack 47, plate 49, and arm 51 forwardly, with the result that said rack and plate move over and closely to the arcuated projection 52, and said rack rotates the pinion 53 counter-clockwise, Fig. 18. A gear 58, rotatably mounted on shaft 21 and secured to pinion 53 by any suitable means, rotates with said pinion and drives a gear 59, which is rigidly mounted on the platen shaft 19. When the pinion 53 is rotated counter-clockwise, Fig. 18, the gear 58 rotates therewith and drives the gear 59 clockwise, whereby the shaft 19 and platen 7 rotate with said gear 59, with the result that said platen feeds the paper forwardly. Thus, the forward movement of lever 39 causes rotation of platen 7 to such extent as is necessary to disclose any item printed on paper 5, and, thereafter, to retract the paper when the lever is released, so as to allow same to return to its normal position. Naturally, it will be unnecessary to feed the paper by means of lever 39 further forward than to display to the operator the last item printed, and, therefore, the cross-rod 43 is predeterminedly arranged to limit automatically the forward movement of arm 44, thereby limiting the forward movement of rack 47, so as to limit the forward feed of the paper to the extent just mentioned. The curvature of the lower edges of rack 47 and plate 49 is so arranged relative to the curvature of the arcuated projection 52 that when said rack and plate have reached the limit of this forward movement as just described, the lower edges of same bind sufficiently upon said projection a to hold said rack 47 and plate 49 in such position in case the operator releases the lever 39. By this means the paper 5 is retained in position to display any item printed thereon, thus allowing the operator to release the lever 39 for any reason, such as to copy any printed item if desired.

In order to retract the paper 5 after same has been fed forward by the lever 39, the lever is pulled a short distance toward the operator, so as to move the rack 47 and plate 49 out of binding engagement with the projection 52 on frame 41, after which said lever may be released, whereupon the pull of spring 54 on cam-plate 46 causes the shaft 40 to rotate counter-clockwise, Fig. 18, and thereby returns said lever to its initial position. As the rack 47 and plate 49 lie so close to the arcuated surface of projection 52 on frame 41 that the pin 45 is prevented from moving out of the forward ends of slots 46 and 48 until said rack and plate have been returned to a position in which the forward ends of same can be lowered into their normal positions behind said projection, the arms 44 and 51 return simultaneously with shaft 40 until the arm 51 reaches its normal position of rest against the cross-rod 42, after which the arm 51 remains stationary and holds the rack 47 and plate 49 in such position as to allow the forward ends of same to be lowered behind the projection 52. The arm 44 continues on its return movement with shaft 40 and thereby moves the pin 45 through the slots 46 and 48 in rack 47 and plate 49, respectively, until said arm rests against the cross-rod 42 and said pin seats in the rear ends of said slots, with the result that said pin first lowers the forward end of plate 49 into its normal position behind the projection 52 and then lowers the forward end of rack 47 into its initial position behind said projection, thereby moving said rack out of engagement with pinion 53. The return movement of rack 47 rotates the platen shaft 19 counter-clockwise, Fig. 18, through the intermediation of pinion 53, and gears 58 and 59, whereby the platen 7 returns the paper 5 to the same position which the latter occupied previous to being fed forwardly by lever 39, as hereinabove described. Thus, the rack 47 affords a positive means for rotating the platen 7 to such extent as is necessary to disclose any item printed on paper 5, and, thereafter, to retract the paper. Due to the fact that, on the return movement of rack 47, same is brought to a positive stop before being moved out of engagement with pinion 53, said pinion is thereby prevented from spinning, and the paper is returned to the same position which it occupied previous to being moved forwardly by lever 39.

In order to prevent the main operating bar 60, Figs. 5 and 6, from being operated while the paper 5 is being advanced and retracted by the lever 39, a bell-crank 61 is provided and is pivotally attached at 62 to the right side plate of casing 1, said operating bar being mounted so as to reciprocate longitudinally and being supported and guided by the studs 63 that project from the right side plate of casing 1 into slots 64 in said operating bar. Said operating bar contains, also, a slot 42ª to allow the cross-rod 42 to extend therethrough. The end 65 of the arm 66 of bell-crank 61 is preferably rounded and is drawn toward the cam-plate 55 by means of spring 67, said end normally resting against the low side 68 of the cam-plate 55, so that the other arm 69 of said bell-crank occupies such position as to allow the projection 70 borne by the operating bar 60 to pass thereover. When the lever 39 is pushed away from the operator, in order to advance the paper sufficiently to display any item printed on the latter as hereinabove described, the cam-plate 55 rotates with shaft 40 clockwise, Fig. 5, and thereby causes the rounded end 65 of arm 66 to ride out of engagement with the low side 68 of cam-plate 55 and into engagement with the high side 71 of said cam-plate, thus rotating bell-crank 61 clockwise. This movement of bell-crank 61 results in raising its arm 69 into a position in front of the projection 70 on operating bar 60, so as to lock said operating bar in its normal position, thereby preventing same from being moved until the lever 39 is returned to its initial position.

*Normal paper-feeding mechanism.*—The normal paper-feeding operation, which precedes each printing impact upon paper 5, is produced by the actuation of shaft 19 by means of ratchet 72, Figs. 21 to 23, which is actuated by pawl 73, said ratchet being rotatably mounted on shaft 21 and is secured to gear 58, so as to rotate therewith, and said pawl being pivoted at 74 to plate 75, which is rotatably mounted on shaft 21. Said plate 75 is preferably in the form of a bell-crank, one arm of which carries a hook 76, which is pivotally attached at 77 thereto, and the other arm of which bears a projection 78, which is held normally in engagement with the projection 79 on ribbon-guide 80 by means of spring 81 said ribbon-guide being secured to one of the frames 82, Figs. 8 and 25, of which there is a pair supported by shaft 83, on which the sectors 84, Fig. 8, are rotatably mounted, and the cross-rods 42 and 43, which sectors are operated by the finger-pieces 84ª. The end 85, Fig. 23, of pawl 73 also normally rests on the projection 79 on ribbon-guide 80 and thereby holds the nose of said pawl out of engagement with the ratchet 72, in order to allow the platen to be rotated in either direction by the hand paper-feeding mechanism or by the item-displaying mechanism, as hereinabove described. A spring 86 connecting pawl 73 with hook 76 not only holds said hook in engagement with pin 87 borne by cam-plate 88, which is rotatably mounted on shaft 83, but draws the nose of pawl 73 into engagement with ratchet 72 when the plate 75 is rotated so as to move the end 85 of said pawl out of engagement with the projection 79 on ribbon-guide 80. The cam-plate 88 is secured to the hub 89 of plate 90, Fig. 26, which is revolubly mounted on shaft 83, and is adapted to rotate therewith.

Said plate 90 bears a segmental rack 91 that meshes with a rack 92 on bar 60, in order to actuate said bar for the purposes hereinafter described. The shaft 83 protrudes from the right side plate of casing 1 and supports the handle 93, Fig. 1, the latter being revolubly mounted on said shaft and being held in place thereon by a screw 94 or other suitable means. A pin 95, Figs. 5 and 26, borne by plate 90 extends through an opening in plate 96, Fig. 5, which is revolubly mounted on shaft 83, and, also, through an arcuate slot 97, Fig. 1, in casing 1, and is secured to the handle 93 by a bolt 98 or other suitable means, so that, when said handle is depressed, it carries with it the pin 95, the movement of which is limited by the slot 97. This movement of pin 95 causes same to rock the plates 90 and 96 counter-clockwise, Fig. 5, said plate 90, in turn, causing the cam-plate 88 to rock with same through the medium of hub 89 and, also, causing the segmental rack 91 to move the bar 60 away from the operator. The plate 96 is located adjacent the right side plate of casing 1 and is arranged to cover the slot 97, whether said plate stands in normal position, or is rocked by the depression of handle 93, so as to prevent dirt from entering the machine and, also, to prevent tampering with the internal mechanism. When the plate 90 is rocked by the depression of the handle 93 as just described, the segmental rack 91 on said plate causes the bar 60 to move forwardly, and the hub 89 of said plate causes the cam-plate 88 to rock counter-clockwise, Fig. 23, whereby pin 87 borne by said cam-plate 88 moves toward the left and draws the hook 76 with same. This movement of hook 76 rocks plate 75 counter-clockwise on shaft 21 and thereby moves the pawl 73 out of engagement with the projection 79 on ribbon-guide 80, whereupon spring 86 immediately draws the nose of said pawl into engagement with ratchet 72, thereby causing said pawl so to push against a tooth of the ratchet 72 as to rotate said ratchet forward a predetermined distance, whereby the latter drives the platen 7 forward through the medium of gears 58 and 59, with the result of feeding the paper 5 forward. A projection 99, Fig. 21, borne by frame 100, which is supported by cross-rod 42 and shaft 83, is disposed in the path of travel of an inclined surface 76ª on hook 76, so that, when said hook has rotated the plate 75 forward to such extent as is necessary to advance the paper 5 sufficiently to allow the next item or total to be printed thereon, the hook 76 rides upon the projection 99, which, in turn, raises said hook sufficiently to release pin 87. As soon as hook 76 releases pin 87, the spring 81 immediately returns the plate 75 to its normal position, thereby causing the pawl 72 to ride over the teeth of ratchet 72 until the end 85 of said pawl rests upon the projection 79 on the ribbon-guide 80, so as to hold the nose of said pawl out of engagement with said ratchet for the purpose hereinabove described. While the plate 75 returns the pawl 73 to its initial position, the ratchet 72 remains in the position to which same was moved by said pawl. After the hook 76 is released from the pin 87, the extension 101 on the end of said hook rests on the pin 87 during the remainder of the forward movement of said pin and, also, until said pin returns to its initial position, whereupon spring 86 causes said hook to catch upon said pin.

In order to prevent forward feed of the paper during the time when the platen 7 is being swung to printing position, either toward item type-faces 102 borne by sectors 84, or toward the type-faces 103 borne by the accumulator wheels 104, an additional ratchet 105, Figs. 21 and 22, is provided, same being revolubly mounted on shaft 21 and being secured to gear 58, so as to rotate therewith. A member 106 bearing a segmental rack 107 is revolubly mounted on shaft 21, and carries a plate 108, which is mounted thereon so as to reciprocate transversely of said shaft. Said plate 108, Fig. 14, contains an elongated opening 109 to allow the shaft 21 to extend therethrough and, also, slots 110 through which studs 111 borne by member 106 extend for the purpose of guiding the movement of said plate and, also, for attaching same to said member. A spring 112 holds the rounded end 113 of plate 108 normally in engagement with a lip 114, Fig. 21, on member 115, the latter being supported by cross-rod 42 and pin 116 borne by frame 41. Said member 115 is mounted to slide toward and away from shaft 21, and contains slots 117 and 118, through which cross-rod 42 and pin 116, respectively, extend in order to guide the movement of said member. A pin 119 borne by member 115 is held in engagement with the cam-plate 120 by means of spring 121, said cam-plate being revolubly mounted on cross-rod 42 and containing an arcuate slot 122 through which pin 116 extends for the purpose of limiting the movement of same. Said pin 119 normally rests against a projection 123, Fig. 21, on cam-plate 120, whereby member 115 holds the plate 108 in such position as to hold the projection 124 on plate 108 out of engagement with the teeth of ratchet 105, in order to allow the gear 58 to be rotated to feed the paper forwardly, as hereinabove described. A pin 125 borne by cam-plate 88 projects into a relatively wide and deep notch 126 in the cam-plate 120 and normally engages the side 127 of said notch, thereby holding said cam-plate 120 normally in the position depicted in Fig. 21. When the cam-plate 88 is rotated counter-clockwise, Fig. 21, by the depression of the handle 93 as hereinabove described, the pin 125 moves away from the side 127 of said notch and travels toward the right through said notch until same comes in contact with the opposite side 128 of said notch, after which the remainder of the forward movement of pin 125 rocks the cam-plate 120 clockwise on cross-rod 42. The notch 126 being relatively deep prevents the pin 125 from moving out of same at the completion of the forward movement of cam-plate 88, so that, when the cam-plate 88 is returned to its normal position by the return movement of the handle 93, the pin 125, by exerting pressure against the side 127 of notch 126 returns the cam-plate 120 to its initial position. While the pin 125 moves forwardly through the notch 126, i. e., from the side 127 to the side 128, the pin 87 causes the hook 76 to feed the paper forwardly through the instrumentality of plate 75, pawl 73, ratchet 72, and gears 58 and 59 as hereinabove described. Just previous to the completion of the forward feed of the paper, the pin 125 engages the side 128 of notch 126 and causes the cam-plate 120 to rock clockwise, Fig. 21, thereby moving the projection 123 away from pin 119, with the result that spring 121 causes the pin 119 to ride down the inclined surface 129 on cam-plate 120 and, then, to rest on the arcuate surface 130 on said cam-plate. This movement of pin 119 causes the member 115 to move with same, whereby the spring 112 causes the plate 108 to follow said member, thus moving the projection 124 on said plate into engagement with ratchet 105. The crowns of the teeth 131 of ratchet 105 are preferably arranged to slant as clearly illustrated in Fig. 21, so that, when the projection 124 moves toward the ratchet 105 and engages the slanting crown of a tooth 131, the remainder of the forward rotation of said ratchet causes said projection 124 to ride down the slanting crown of said tooth until same enters the space between said tooth and the next tooth adjacent thereto, thereby connecting member 106 with ratchet 105 and consequently with gear 58 for the purpose hereinafter described. Immediately after the member 106 is connected with ratchet 105, the hook 76 releases the pin 87, whereupon the spring 81 returns plate 75 and pawl 73 to their initial positions, as hereinabove described, and then the shaft 21 is rocked either counter-clockwise, Fig. 21, in order to cause the arms 20 to swing the platen 7 toward the item type-faces 102, or clockwise, so as to cause the arms 20 to swing the platen 7 toward the accumulator type-faces 103 by mechanism operated by the bar 60 in the manner hereinafter described.

A member 132, Fig. 21, revolubly mounted on shaft 19 contains an elongated slot 133 into which a pin 134 projects from the casing 1, and bears a segmental rack 135 which meshes with the segmental rack 107 borne by member 106, said pin being stationarily attached to said casing. The pin 134 normally prevents the member 132 from rotating on shaft 19 and holds same in the position depicted in Fig. 21, but when the shaft 21 is rocked and the arms 20 borne by same swing the platen to printing position, the pin 134 causes the member 132 to rock, whereby said member causes the shaft 19 to rotate through the intermediation of member 106, plate 108, ratchet 105 and gears 58 and 59 sufficiently to present the lower side of the platen 7, i. e., the print point on the platen, either to the type-faces 102, or to the type-faces 103. For example, if the shaft 21 is rocked counter-clockwise, Fig. 21, the arms 20 swing the platen 7 from normal position toward the left, and the pin 134 causes the member 132 to rock clockwise, whereby said member rotates the shaft 19 clockwise through the medium of member 106, plate 108, ratchet 105, and gears 58 and 59 sufficiently to present the lower side or print point on platen 7 to the item type-faces 102 on sectors 84, but, if the shaft 21 is rocked clockwise, the arms 20 swing the platen 7 from normal position toward the right, and the pin 134 causes the member 132 to rock counter-clockwise, with the result of rotating the shaft 19 counter-clockwise through the medium of member 106, plate 108, ratchet 105, and gears 58 and 59 sufficiently to present the lower side or print point on platen 7 to the type-faces 103 on the accumulator wheels 104. While the platen 7 is rotated to present its lower side or print point either to the type-faces 102 or type-faces 103, the paper 5 moves with same, and after the printing operation takes place and the operating bar 60 reaches the end of its forward movement, the handle 93 is allowed to return to its initial position, whereby the segmental rack 91 on plate 90 returns the bar 60 to normal position, thus rocking shaft 21 to its normal position as hereinafter described. This return movement of shaft 21 to normal position causes the arms 20 to swing the platen 7 from printing to normal position, whereby pin 134 causes the member 132, through the medium of member 106, plate 108, ratchet 105, and gears 58 and 59, to restore the platen 7 and paper 5 to the position from which same were moved immediately after the operation of feeding the paper forwardly as hereinabove described. The plate 108 rotates with member 106, ratchet 105, and gear 58 and thereby moves its rounded end 113 away from the projection 114 on member 115, when the platen is swung from normal to printing position, but, when the platen is swung from printing to normal position, the plate 108 returns to the position from which same was rotated, after which the cam-plate 88 returns to normal position, whereby the pin 125 returns the cam-plate 120 to its normal position, with the result that pin 119 rides along the arcuate surface 130 on cam-plate 120 and then up the inclined surface 129 until same rests upon the projection 123 on said cam-plate 120. This movement of pin 119 causes the member 115 to move toward shaft 21 and thereby causes the projection 114 on said member to press against the rounded end 113 of plate 108, so as to return said plate to its initial position, thus moving the projection 124 out of the space between two adjacent teeth 131 of ratchet 105, in order to allow the paper 5 to be fed forwardly when the handle 93 is again depressed. A member 136, Fig. 21, preferably having the form of a bell-crank is pivoted at 137 to member 132 and carries a roller 138, which is rotatably attached thereto. A spring 139 holds the roller 138 in engagement with the serrated periphery of a wheel or ratchet 140 that is secured to the gear 59, so as to rotate therewith, and, when the platen shaft 19 is rotated, said roller rides on the serrated periphery of said wheel or ratchet and thereby affords sufficient drag to prevent the platen 7 from spinning.

*Platen-operating mechanism.*—When the finger-piece or finger-pieces 84ª have been pulled down so as to set the desired item type 102 in printing position, the handle 93 is depressed, carrying with it pin 95, which, in turn, rocks the plate 90 counter-clockwise, Figs. 5 and 21. A link 141, Fig. 5, is attached by pin 142 to plate 90 and, also, by stud 143 to plate 144, which is revolubly mounted on shaft 21, and, when the plate 90 is rocked as just described, the link 141 moves with same and thereby rocks the plate 144 toward the left, Fig. 5, so as to move said plate 144 into the space between the projection 22 on the end of shaft 19 and the grooved end of rod 32, thus, preventing, for the time being, said rod from being connected to the end of said shaft for the purpose of manually rotating the platen 7 as hereinabove described. Simultaneously with the operation just described, which renders the rod 32 temporarily inoperative, the aforesaid movement of handle 93 causes the segmental rack 91 on plate 90 to actuate rack 92 on bar 60. This movement of segmental rack 91 causes bar 60 to travel in the direction away from the operator, thereby causing the projection 70 on said bar to move over the arm 69 of bell-crank 61, so as to prevent, for the time being, the use of lever 39 and the accompanying movement and exhibition of printed items. A plate 145, Figs. 5, 26 and 27, which is slidably mounted against one side of bar 60, bears a projection 146, which extends through a slot 147 in said bar, and contains a slot 148 into which a pin 149 projects from said bar. The projection 146 and pin 149 support plate 145 and the slots 147 and 148 guide the movement of same. A spring 150 is attached to the arm 151 of a bell-crank 152, Figs. 5 and 26, which is pivoted at 153 to bar 60, and tends to rotate said bell-crank clockwise, Fig. 26, so as to hold the projection 154 on the arm 155 of said bell-crank in engagement with one side of projection 146 on plate 145, thereby holding plate 145 normally in the position depicted in Fig. 26, so that, when bar 60 is moved forward, the projection 154 on arm 155 pushes against projection 146 on plate 145 and thereby causes said plate to travel forward with said bar. A spring 156, Figs. 6 and 26, is fastened by pin 157 to plate 158 and by pin 159 to link 160. A pin 161, Fig. 26, borne by plate 158, extends into a cam slot 162 in plate 145 and normally holds plate 158 in such position that stud 163, Fig. 26, projecting from one side of casing 1, is seated at the lowest point of slot 164 in said plate 158 and, also, that shaft 21 is seated at the lowest point between the forks 165 of the bifurcated upper end of said plate 158, the pull of spring 156 tending, also, to retain plate 158 in said position. The pull of spring 156 on pin 159 tends to depress link 160 and thereby to hold same down upon pin 166, Figs. 5 and 26, which projects through slot 167 in link 160, said pin 166 being borne by plate 158. When operating bar 60 moves forward, the projection 154 on arm 155 of bell-crank 152 causes the plate 145 to move forwardly with said bar, whereby the cam slot 162 presses on pin 161 and thereby moves plate 158 downwardly, thereby extending spring 156, so as to increase the tension of said spring on link 160, and moving the pin 166 to the lowest point of slot 167 in said link, in order to allow said link to descend. Link 160, in its upper part, encircles shaft 21, the interior of its encircling opening being provided with cam slots 168 and 169, Fig. 26, in which pins 170 and 171 ride, said pins being borne by yoke 172, which is fixed to shaft 21. Said yoke 172 bears an arm 173 containing an opening through which shaft 19 extends, and it also acts, by means of pins 170 and 171, as a lever to rock that shaft. During the first part of movement of bar 60, the link 160 is held stationary by latch 174, which is pivoted at 175 to frame 176, said frame being supported by cross-rods 43 and 177 and affording bearings for various shafts and supports for other parts. Spring 178 holds the toe 179 of latch 174 normally in the path of travel of bevel 180 on bar 60, and it also holds the notched end 181 of latch 174 in engagement with projection 182 on yoke 172. When the movement of handle 93 has caused bar 60 to travel so far that bevel 180 thereon engaging the toe 179 of latch 174 causes its notched end 181 to release the projection 182 on yoke 172 at the same time that pin 161 on plate 158 reaches the lower end of cam slot 162 in plate 145, the spring 156 being under tension causes the link 160 to descend until the upper end of slot 167 rests on the pin 166 borne by plate 158, whereby pin 170 is pressed downwardly by the side of slot 168 in link 160, with the result that yoke 172 is tilted or moved in such manner as to rotate shaft 21 and with it arms 20 and 173, thus rocking platen 7 toward the type-faces 102. The rocking of the platen as just described causes an impact of paper 5 against type-faces 102 and consequent printing thereon of the last item set by means of the finger-pieces 84ª.

The releasing of link 160 as just described occurs before the bar 60 reaches the end of its forward movement, and, therefore, a device is provided which automatically releases the projection 154, Fig. 24, on arm 155 of bell-crank 152 from pushing engagement with projection 146 on plate 145, so as to allow the pin 161 borne by plate 158 to hold the plate 145 stationary while the bar 60 completes the last part of its forward movement, and which, likewise, during the return movement of bar 60, automatically releases the said projection 154 from pulling engagement with projection 146 on plate 145, in order to allow pin 161 to hold the plate 145 stationary while the bar 60 completes the last part of its return movement. This releasing device consists of the following parts: A spring 183, Figs. 5 and 26, connects a dog 184 with a dog 185 and holds said dogs normally in engagement with stop pins 186 and 187, respectively, so as to hold the ends of said dogs normally in the path of travel of projection 188 on the arm 155 of bell-crank 152 and, also, in position to support said arm, as best seen in Fig. 26, said dogs 184 and 185 being preferably arranged to face each other and being pivoted at 189 and 190, respectively, to the side of casing 1, and said stop pins 186 and 187 being secured to said casing. When the bar 60 is moved forward, the bell-crank 152 travels with same and thereby causes the projection 188 borne by its arm 155 to engage the shoulder 191 on dog 184, thereby rocking said dog clockwise, Fig. 26. This engagement of projection 188 with shoulder 191 on dog 184 has no effect on the bell-crank 152, but merely pushes the end of said dog out of the path of travel of said projection 188, after which further forward movement of bar 60 causes the projection 188 to ride up the inclined surface 192 on dog 185, thereby rocking bell-crank 152 counter-clockwise, with the result of moving the projection 154 out of pushing engagement with projection 146 on plate 145 at the same time that link 160 is released as hereinabove described. After the projection 188 moves out of engagement with dog 184, the spring 183 returns said dog 184 to its normal position for the purpose hereinafter described. As soon as projection 154 on arm 155 of bell-crank 152 is moved out of pushing engagement with projection 146 on plate 145, the pin 161 borne by plate 158 holds the plate 145 stationary while the bar 60 completes its forward movement. Thereafter, the projection 188, in riding over the end of dog 185, raises said arm 155, so as to cause the projection 154 to pass over projection 146, and, when the bar 60 reaches the end of its forward movement, the projection 188 will have moved out of engagement with the end of dog 185, thus allowing spring 150 to rock the bell-crank 152 clockwise, Fig. 26, whereby projection 154 drops into pulling engagement with projection 146, in order to cause plate 145 to travel with bar 60 on the return movement of the latter.

When the printing operation has been completed and the operating bar 60 has reached the end of its forward movement, as just described, handle 93 is released by the operator, and, thereupon, spring 193, Fig. 6, exerts its force to return said handle to its initial position. This return movement of handle 93 rocks the plate 90 clockwise, Figs. 5 and 26, whereby the segmental rack 91 o nsaid plate causes the operating bar 60 to return to its initial position. During the first part of the return movement of bar 60, the projection 154 on arm 155 of bell-crank 152 pulls on the projection 146 on plate 145 and thereby causes said plate to travel with said bar, whereby pin 161 borne by plate 158 rides upwardly in cam slot slot 162, Figs. 26 and 27, thus causing the pin 166 borne by said plate 158 to raise the link 160, with the result that the side of cam slot 168 in link 160 presses upwardly against the pin 170 and consequently rotates yoke 172 and shaft 21 and, therefore, arms 173 and 20, which movement of said arms returns the platen 7 to its normal or non-printing position. While the platen 7 is being restored to normal position as just described, the bar 60 will have moved the bevel 180, Fig. 26, thereon to such position as to allow the spring 178 to pull the notched end 181 of latch 174 into engagement with the projection 182 borne by yoke 172, whereby said latch prevents said yoke from being rotated to swing the platen 7 to printing position until the bar 60 is again moved forward. The bell-crank 152 travels with bar 60 and thereby moves the projection 188 borne by arm 155 of said bell-crank into engagement with shoulder 194 on dog 185, thereby rocking said dog coutner-clockwise, Fig. 26, so as to move the end of said dog out of the path of travel of projection 188, after which said projection passes out of engagement with the end of dog 185, whereupon spring 183 returns said dog to its normal position. Further return movement of bar 60 causes the projection 188 to ride up the inclined surface 195 on dog 184, thereby rocking bell-crank 152 counter-clockwise, Fig. 26, with the result of moving the projection 154 on arm 155 of said bell-crank out of pulling engagement with projection 146 on plate 145 at the same time that pin 161 reaches the upper end of cam slot 162 in plate 145. After the projection 154 is released from pulling engagement with projection 146, the pin 161 holds the plate 145 stationary while the bar 60 completes its return movement, during which time the projection 188 rides over the end of pawl 184 and thereby holds th earm 155 of bell-crank 152 in such position as to cause the projection 154 to pass over projection 146. When the bar 60 reaches the end of its return movement, the projection 188 will have moved out of engagement with the en dof dog 184, thus allowing spring 150 to rock the bell-crank 152 clockwise, Fig. 26, whereby projection 154 drops into pushing engagement with projection 146, so as to be in position to cause th eplate 145 to travel with bar 60 when the latter is again moved forward. An antifriction roller 196, Fig. 26, is revolubly mounted on pin 197, which is secured to the side of casing 1, and is adapted to afford additional means for supporting plate 145 when the latter travels with bar 60.

The description of the rocking of the platen up to the present point has been of its movement for the purpose of printing items on paper 5. At any time, however, it may be desirable to print the total of a series of items, and for this purpose mechanism is provided for rocking the platen 7 to printing engagement with the "total type" 103. The printing of totals is controlled by the total key 198, Figs. 1 and 26. The mechanism for rocking the platen 7 to print totals is locked against movement by the depression of any one of the finger-pieces 84ᵃ, and remains so until after the item set by said finger-piece has been printed. It will be perceived that the item-printing motion of platen 7 is controlled by handle 93 and the total-printing movement of said platen by total key 198.

The total for the machine at any particular time will appear on the type-faces 103 on wheels 104. It will, of course, be understood that there are on each wheel 104 a plurality of such type-faces, but that the total at any particular time appears at the point where it is most convenient to impact by the paper borne by platen 7. The mode of reaching such total will be hereinafter described, but, for the time being, the description will be confined to the rocking of platen 7 to printing impact with said particular total type-faces 103 that are set in printing position.

When total key 198 is pressed, it rocks shaft 199, Figs. 11 and 26, by means of arms 200, fixed thereto, the shank of total key 198 being pivoted at 201 to said arm 200, and spring 202 normally holding said arm in engagement with stop 203, which is secured to the side of casing 1, thus holding total key 198 in its upper position. Shaft 199 is journaled in the side plates of casing 1.

The rocking of shaft 199 by the depression of total key 198 rocks arm 204, which is pivoted at 205 to link 206, Fig. 26, and draws said link toward the operator. Notch 207 in the upper surface of link 206 loops over pin 208, which projects from link 160. Rearward movement of link 206 will, therefore, rock link 160 rearwardly, said link 160 being pivoted at 166, with the result that cam slot 168 moves away from pin 170 while, simultaneously, cam slot 169 moves into engagement with pin 171, which tilts or rotates yoke 172 when link 160 is pulled downwardly by spring 156 when printing handle 93 is depressed; said tilting of yoke 172 on shaft 21 being in the direction opposite to that in which it is tilted or rotated when platen 7 is to be moved toward the item-printing type-faces, and, as yoke 172 is fixed to shaft 21 and arms 173 and 20 project upward from shaft 21 and support the platen shaft 19, the platen is rocked toward the total type-printing face 103. In order that this operation may be carried out, the total key 198 must be kept depressed during the time when the handle 93 is being pressed down. The return of the platen to the intermediate or non-printing position is accomplished as follows: When handle 93 and the total key 198 are released, same return to their initial positions under the impulsion, respectively, of springs 193 and 202. The movement of total key 198 to its initial position rotates shaft 199 counter-clockwise which, by means of arm 204, causes link 206 to travel away from the operator, thus rocking link 160 in such manner as to cause pin 171 to ride out of cam slot 169 and pin 170 to ride into cam slot 168, said link 160 being simultaneously raised by the action of plate 145, Fig. 27, actuated by bar 60, as hereinbefore described, by which means yoke 172 causes shaft 21 to move platen 7 away from the total type-printing face 103. In order that a total may not be printed until the last registration, by means of a finger-piece 84ᵃ, has been printed in the list of items, the depression of a finger-piece 84ᵃ to any extent locks the total key 198, as hereinafter described, until after the item has been printed. In case of accidental or erroneous depression of one of the finger-pieces 84ᵃ, the use of one of the error keys 209, Fig. 7, will not release the total key 198, but such release can be effected only by the depression of the printing handle 93 and consequent movement of connected parts.

In order to insure a full stroke of the operating bar 60 in each direction, a rack 210 Fig. 5 and another rack 211 are located thereon adapted to be engaged by a compound pawl 212 having three arms, said pawl being pivoted at 213 to the side of casing 1. When operating bar 60 is traveling away from the operator, one tooth of said pawl 212 engages rack 210 on said bar while the detent arm 214 of said pawl 212 rests in the position shown in Fig. 5 in engagement with one side of nose 215 on stop 216. When operating bar 60 has traveled the full distance forward, the projection 217 on said bar engages shoulder 218 on pawl 212, and trips the tooth out of engagement with rack 210, throwing the other tooth of said pawl 212 into engagement with rack 211, over which same rides, until operating bar 60 has completely returned to its initial position, at which time projection 217 engages shoulder 219 and rocks pawl 212 to the position shown in Fig. 5. While said tooth is in engagement with rack 211, the detent 214 is held by the other beveled surface of stop 216, which is pivoted at 220 to the side of casing 1 and pulled by spring 221. The alternate engagement of pawl 212 with rack 210 makes it impossible for operating bar 60 to return to its initial position before it has made a full forward stroke, as during such stroke it is held from return by the engagement of pawl 212 with rack 210, which pawl is not tripped out of such engagement until projection 217 strikes shoulder 218, said projection and shoulder being so located as to produce this operation at the completion of the full forward stroke, while the other tooth of pawl 212, by its engagement with rack 211, similarly prevents said operating bar 60 from traveling forward until it has made a complete return to the initial position, for the reason that projection 217 does not engage shoulder 219 and thus trip pawl 212 out of engagement with rack 211 until operating bar 60 has fully returned to the said initial position.

*Item-printing mechanism.*—The normal operation of the finger-pieces 84ª is that they are pulled down the desired distance for the purpose of setting the proper item-printing type-faces 102 in printing position. When a finger-piece 84ª is depressed, the internal segmental rack 222, Fig. 10, rotates gear 223, loosely mounted on shaft 224, carrying with it ratchet 225, over which, in this direction of rotation, finger-piece-retaining pawl 226 freely rides, said pawl being held normally in engagement with said ratchet by spring 227 and operating, however, with said ratchet 225 to prevent the return of its finger-piece 84ª until after the item designated thereby has been printed. Retaining pawl 226 is loosely mounted on shaft 228 and is provided with an arm 229, Fig. 7, which extends into contact with finger 230 on member 231, said member being loosely mounted on cross-rod 232 and bearing a lip 233, which is located directly behind the inner end of its respective error key 209. Each error key 209 is reciprocatively mounted in an opening provided therefor in the front plate of casing 1 and, also, in an opening provided therefor in a plate 234, Figs. 7, 29 and 30, which is secured to lugs 235 on the front plate of casing 1 by screws 236 or other suitable means. Each error key 209 is provided with a projection 237, which is located between the front plate of casing 1 and plate 234, as best seen in Fig. 29, in order to limit the movement of said key in each direction. When said error key 209 is pressed inwardly, the inner end of same engages the lip 233 on member 231 and thereby rocks said member away from the operator, whereby the finger 230 of said member presses against the rounded end of arm 229 and moves pawl 226 out of engagement with ratchet 225, which allows finger-piece 84ª immediately to return to its initial position under the impulsion of its respective spring 238, Fig. 10, each finger-piece 84ª being provided with such a spring. After an item is printed by the depression of handle 93, each finger-piece 84ª that is depressed in the manner hereinafter described, is returned to its initial position, during which return movement each of said finger-pieces actuates its accumulator wheel 104, in order to add the item in the accumulator, except when the non-add key 239 has been pressed to prevent such actuation of accumulator wheel 104, as hereinafter described. If it is desired to remove an item from the machine before same is printed and thus prevent same from being added in the accumulator, the error key 209 of each depressed finger-piece 84ª is pressed inwardly before handle 93 is depressed, for the reason that such actuation of said error keys at this time allows each of said finger-pieces to return to its initial position without actuating its accumulator wheel 104. When pressure is released from an error key 209, spring 227 pulls the pawl 226 into engagement with ratchet 225 and thereby causes the rounded end of arm 229 so to push against the finger 230 on its respective member 231 as to rock said member toward the operator, thus causing the lip 233 on said member to return said error key to its normal position.

In order to prevent the depressed finger-piece or finger-pieces 84ª from being released by the error keys 209 after the operating bar 60 has started on its forward movement, a device is provided which renders the error keys inoperative while the operating bar 60 travels forward and returns to its initial position. This device consists of the following parts: A plate 240, Fig. 6, and another plate 241, Fig. 7, are fixed to shaft 242 and are connected by a rod 243 which extends through the paths of movement of projections 237 on each error key 209. A spring 244 holds the rod 243 normally in engagement with the projections 237 on said error keys 209 and thereby tends to return and retain each error key in its initial position. The plate 240 bears an arm 245, the end of which arm normally occupies a position above a notch 246 in the operating bar 60. When an error key 209 is pressed inwardly, its projection 237 presses against rod 243 and thereby rocks shaft 242 clockwise, Fig. 5, with the result that the end of arm 245 of plate 240 enters the notch 246 in bar 60, thus preventing for the time being the use of handle 93. When the operating handle 93 is depressed and the operating bar 60 starts on its forward movement, the notch 246 will be moved from beneath the end of arm 245 of plate 240, so that in case an error key 209 is pressed, the end of said arm 245 will strike the upper edge of bar 60 and thereby prevent said error key from being pressed inwardly far enough to release its finger-piece 84$^a$. By this means each error key 209 is prevented from releasing its respective finger-piece 84$^a$ excepting when the operating bar 60 occupies its normal position.

When the printing of an item has been completed, spring or springs 238 tend to return each finger-piece 84$^a$ to its initial position. To save jar upon such return, a projection 247, Fig. 9, strikes a buffer 248 made of leather, felt, or other resilient material located in cup 249, each projection 247 being borne by an arm 250 of sector 84. The cup 249 extends from one side wall of casing 1 to the other, and is supported by the plates 251, which separate the finger-pieces 84$^a$, said plates being themselves supported by cross-rods 232 and 253, which are borne by the side walls of casing 1. Each sector 82 bears a pin 254, Fig. 9, which fits into the slot 266 in the end 255 of a member 256, said member being rotatably mounted on cross-rod 42. Said member 256 has two arms, one of which 257 extends toward a dash-pot 258, the piston 259 of which is actuated by a piston rod, there being a plurality of such piston rods, each of said piston rods being borne by the arm 257 of one of the members 256. When the finger-pieces 84$^a$ are pulled forward and, after the item has been printed, and released, the dash-pot 258 absorbs part of the jar arising from the spring return of finger-pieces 84$^a$ to their initial positions. Spring 238 is attached to the other arm 260 of the member 256, and the other end of spring 238 is attached to a finger 261, pivoted to rod 262, which latter connects the two members 263, that are located on opposite sides of the machine. A plate 264 is received in the slotted ends of members 263, and an adjustable screw 265 for each of the plurality of fingers 261 allows of the suitable adjustment of the tension of each spring 238. When a sector 84 is pulled down to register an item, its pin 254 pulls the hooked or slotted end 255 of member 256 with it, necessarily rocking member 256 on cross-rod 42 and raising piston 259 in dash-pot 258 and distending spring 238. Due to the path of travel of pin 254, it slides upward in slot 266 in member 256, but never becomes disengaged therefrom. Whenever retaining pawl 226 is released, either by use of an error key 209 or by the operation of printing an item, the detention of finger-pieces 84$^a$ is discontinued and the tension of spring 238 pulling on arm 260 causes member 256 to pull pin 254 so as to rotate its respective sector 84 on shaft 81, and thus to return its respective finger-piece 84$^a$ to its initial position, the jar of such return being mitigated by dash-pot 258 and cushion 248.

Since the items are printed from the type-faces 102 borne by sectors 84, and as each section 84 moves synchronously with its respective finger-piece 84$^a$, each finger-piece 84$^a$ must be retained in its depressed position until the item that it has been depressed to indicate has been printed, and such retention is performed by the retaining pawl 226. The mechanism for releasing pawl 226 after the performance of the item-printing operation is as follows: As operating bar 60 travels forward to actuate the item-printing mechanism, pin 267, Figs. 6 and 32, borne by said bar 60 moves out of the notch 268, Fig. 32, in plate 269, which is pivoted on shaft 228, and, in doing so, said pin moves out of engagement with finger 270 on plate 269 and rides on the inclined arm 271 borne by plate 269, thus rocking said plate and allowing spring 227 to pull pawl 272 into engagement with ratchet 273, due to the movement of plate 274 out of contact with said pawl 272, said plate 274 extending from one side of the machine to the other and engaging all the pawls 272 and being supported by plate 269 and arm 275, Fig. 7. The engagement of said pawls 272, of which there is one for each ratchet 273, and one such ratchet 273 for each finger-piece 84$^a$, results in preventing further downward movement of the finger-pieces after the movement of the printing handle 93 has been commenced for the performance of the item-printing operation. Further movement of plate 274 away from pawls 272 toward retaining pawls 226 disengages said pawls 226 from ratchets 225 and takes place after the printing operation and is caused by the return movement of the operating bar 60 in the manner about to be described.

A trigger 276, Fig. 5, which is pivoted at 277 to plate 269, is held normally in engagement with projection 278 on arm 271 of said plate 269 by means of spring 279, and, when the plate 269 is rocked by pin 267 moving out of notch 268, said plate moves the trigger 276 to such position that the lip 280 on the latter extends into the path of travel of pin 267. Further forward movement of bar 60 causes the pin 267 to engage and pass underneath the lip 280 on trigger 276, thereby rocking said trigger upwardly on its pivot 277 until the operating bar reaches the end of its forward movement, at which time pin 267 will have moved out of engagement with lip 280, so as to allow spring 279 to pull the trigger 276 back into engagement with the projection 278 on arm 271, thereby moving the lip 280 back into the path of travel of said pin. The return movement of the operating bar 60 causes the pin 267 to ride on the lip 280 and thereby presses the trigger 276 downwardly, whereby said trigger presses downwardly on the projection 278 on arm 271 of plate 269, thus rocking plate 269 on shaft 228, which plate 269, in turn, moves the plate 274 farther toward pawls 226, thereby moving said pawls out of engagement with their respective ratchets 225. This release of ratchets 225 from the detention of their respective retaining pawls 226 allows finger-pieces 84ª to return to their initial position under the impulsion of their respective springs 238.

Projection 281, Figs. 32 and 33, borne by member 282, drops in front of pawl 226 when same is moved out of engagement with ratchet 225 by the pressure of plate 274 against said pawl 226, and said projection 281 remains between said pawl 226 and said ratchet 225 until the respective finger-piece 84ª controlled thereby has returned to its normal position. Then projection 283 on said finger-piece 84ª strikes the arm 284 of member 282, which is pivoted on shaft 199, and again raises projection 281 to the position of resting on top of pawl 226. A projection 285 borne by pawl 286, which is pivoted on shaft 199, normally rests on member 282, which, in turn, holds said pawl 286 normally out of engagement with ratchet 287, Figs. 7 and 8. When projection 281 moves in front of pawl 226, spring 288 pulls tooth 289 of pawl 286 into engagement with ratchet 287, for the purpose of preventing accidental or other depression, to any extent, of finger-piece 84ª after the printing operation has been completed and prior to complete return of the finger-piece to its initial position. When the operating bar 60 returns to its normal position, the pin 267 will have moved out of engagement with lip 280 on trigger 276 and entered the notch 268 in plate 269, thereby engaging the finger 270 on plate 269, with the result of rocking said plate 269, so as to cause the plate 274 to move the pawls 272 out of engagement with their respective ratchets 273, thus allowing the finger-pieces 84ª to be depressed to set the item-printing type in position to print the next item. It should be understood that there are as many ratchets 287, pawls 286, members 282, ratchets 273, pawls 272, ratchets 225, pawls 226, gears 223 and connected parts as there are finger-pieces 84ª, the ratchets 287, 273, and 225 being secured to the hubs of their respective gears 223, so as to rotate therewith.

In order to center the item type 102 in printing position and, also, to afford a positive means for holding the sectors 84 stationary while the printing operation takes place, the following mechanism is provided: Each sector 84 is provided with an arcuate opening, 290, Figs 8 and 25, one side of which contains a plurality of notches 291 which are preferably V-shaped. A rod 292 having a cross-sectional configuration similar to the notches 291 extends through the openings 290 in each sector 84, and is supported by a pair of arms 293, fixed to shaft 294, which is journaled in openings provided therefor in frames 82. Springs 295 tend to rotate the arms 293 and shaft 294 toward the front of the machine, so as to hold the rod 292 normally out of engagement with the notched side of each opening 290, in order to allow the finger-pieces 84ª to be pulled downwardly, such rotation of arms 293 and shaft 294 being limited by the engagement of one of the arms 293 with stop pin 293ª borne by frame 100. The notches 291 are accurately and predeterminedly spaced apart so that a notch in each sector registers in the path of movement of rod 292, whether the sectors occupy their normal position or are depressed to set the item-printing type-faces 102 in printing position. A bell-crank 296, Fig. 25, is rotatably mounted on shaft 294 and carries a roller 297, which is revolubly attached at 298 to one arm of said bell-crank, the other arm of said bell-crank being notched at 299 to form a seat for the end of a trigger 300, which is pivotally attached at 301 to one of the arms 293. A spring 305, Fig. 25, holds the end of trigger 300 normally in the notch 299 in bell-crank 296 and, also, holds the arm 303 of said trigger in the path of movement of pin 304 borne by cam-plate 88. A spring 302 holds the roller 297 normally in engagement with cam surface 306 on cam-plate 88 and, when the operating handle 93 is depressed, said handle causes the cam-plate 88 to rotate counter-clockwise, Fig. 25, whereby the cam surface 306 on cam-plate 88 so presses against roller 297 as to rock the bell-crank 296, with the result that the notched arm of said bell-crank pushes against the end of trigger 300 and thereby rocks the shaft 294, thus causing the arms 293 to move the rod 292 toward the notched side of opening 290 until said rod seats in a notch 291 in each sector 84, after which the roller 297 rides on the arcuate surface 307 on cam-plate 88 and thereby holds the rod 292 in the notches in each sector until after the printing operation takes place. By this means the sectors 84 are held stationary while the printing operation takes place, and the item-printing type-faces are centered in printing position. After the printing operation is completed, the pin 304 borne by cam-plate 88 strikes the arm 303 of trigger 300 and thereby rocks said trigger until the end of same disengages the notched end of bell-crank 296, whereupon spring 295 returns arms 293 to their initial position, thus moving rod 292 out of the notches 291 in each sector 84 in order to allow the depressed finger-pieces 84ª to return to their normal positions. The return movement of handle 93 causes reverse movement of cam-plate 88, whereby, as the roller 297 rides on the arcuate surface 307 and then on the cam surface 306, the pull of spring 302 rocks bell-crank 296 counter-clockwise, Fig. 25, and thereby causes the notched arm of said bell-crank to trip the trigger 300 until the pull of spring 305 causes the end of said trigger to seat in its normal position in notch 299 in bell-crank 296, so as to be in position to rock shaft 294 when the handle 93 is again depressed.

As the return movement of sectors 84 registers the printed item in the accumulator except when the non-add key 239 is depressed, it is necessary to provide mechanism for preventing the item from being reprinted until all the depressed finger-pieces 84ª return to their initial positions and said finger-pieces are again depressed to set the item-printing type in printing position. By means of this mechanism about to be described, in case the operator prevents the return of the depressed finger-piece or finger-pieces 84ª to normal position after the item is printed, the handle 93, upon returning to its initial position, is locked from subsequent depression and can only be released when each depressed finger-piece returns to its initial position. This mechanism consists of the following parts: A rod 308, Fig. 25, extends through the openings 290 in each sector 84, and is secured to a pair of plates 309, which plates are revolubly mounted on shaft 83. Said rod 308 is held normally in engagement with the upper end of each opening 290 by the pull of springs 310, so that, when any finger-piece 84ª is depressed, the upper end of the opening 290 in its respective sector 84 depresses the rod 308 and thereby rocks the plates 309 on shaft 83. As long as a finger-piece 84ª is retained in a depressed position, the upper end of the opening 290 in its sector 84 holds the rod 308 and plates 309 in a depressed position, but when all of the depressed finger-pieces 84ª return to normal position, the pull of springs 310 returns the plates 309 and rod 308 to their initial positions. One of the plates 309 bears a beveled extension 311, on which a pin 312 borne by pawl 313 normally rests, so as to hold the notched end of said pawl out of engagement with the end of detent 314 and, also, to hold the tooth 315 of said pawl normally out of the path of rotation of the shoulder 316 on cam-plate 88, as best seen in Fig. 25, said pawl and detent being pivotally attached at 317 and 318, respectively, to frame 100. A spring 319, which connects the pawl 313 and detent 314, tends to draw said pawl and detent toward each other and thereby holds the projection 320 on said detent normally in engagement with a stop pin 321 borne by frame 100. When a finger-piece 84ª is pulled downward, the upper end of the opening 290 in its sector 84 pulls the rod 308 with said sector and thereby rocks the plates 309 on shaft 83, whereby the beveled extension 311 moves out of engagement with pin 312 borne by pawl 313, thus allowing the spring 319 to pull the notched end of pawl 313 toward the cam-plate 88 until the end of detent 314 seats in the notch 322 in the end of said pawl, thereby arresting for the time being the movement of pawl 313 toward cam-plate 88 and, also, preventing the tooth 315 of said pawl from entering the path of movement of shoulder 316 on said cam-plate. The detent 314 is located in the path of movement of the shoulder 316 on cam-plate 88 and when said cam-plate is rotated by the depression of handle 93, the shoulder 316 travels toward the detent 314 and strikes same before the handle 93 reaches the end of its downward stroke, thereby rocking said detent on pivot 318 and moving the end of said detent out of the notch 322 in the end of pawl 313, whereupon spring 319 pulls the pawl 313 toward the cam-plate 88 until the tooth 315 of said pawl rests on the arcuate surface 323 on said cam-plate. While the tooth 315 of pawl 313 rests on the arcuated surface of cam-plate 88, the notched end of said pawl occupies a position in front of the detent 314 and thereby prevents the end of said detent from entering notch 322. The return movement of the handle 93 releases the depressed finger-pieces 84ª, which return to their initial position, thereby allowing the springs 310 to return the plates 309 and rod 308 to their normal position, with the result that the beveled extension 311 on one of said plates engages the pin 312 borne by pawl 313 and thereby raises said pawl to its initial position, whereupon the pull of spring 319 returns the end of detent 314 to its normal position underneath the notch 322 in said pawl. In case a finger-piece 84ᵃ is held in a depressed position after same has been released by the return movement of handle 93 as hereinabove described, the opening 290 in the sector 84 of said finger-piece prevents the rod 308 and plates 309 from returning to their initial positions, under which circumstances, the tooth 315 of pawl 313 rides on the arcuate surface 323 until the cam-plate 88 returns to its initial position, whereupon the spring 319 causes the tooth 315 of pawl 313 to drop in front of the shoulder 316 on cam-plate 88, thereby preventing the handle 93 from being depressed until each depressed finger-piece 84ᵃ is returned to its initial position. The handle 93 is thus locked in its normal position and is prevented from being depressed until each depressed finger-piece 84ᵃ returns to its initial position, such return of said finger-piece allowing the beveled extension 311 on plate 309 to raise the pawl 313 out of engagement with the shoulder 316 on said cam-plate and to restore said pawl to its normal position as hereinabove described.

*Automatic cipher mechanism.*—Each sector 84 is provided with a segmental rack 324, Fig. 28, which coöperates with a longitudinally-reciprocatory rack bar 325, there being one of these rack bars for each sector. When a finger-piece 84ᵃ is depressed, the segmental rack on its attached sector 84 causes its rack bar 325 to travel away from the operator. Simultaneously, one of the ten consecutively arranged type-faces 102 borne by said sector 84 will be moved to printing position, which one being dependent upon which finger indentation in finger-piece 84ᵃ is used in moving said finger-piece and its attached sector, as the limitation of movement thereof is gaged by the finger of the operator striking surface 326, Fig. 1.

In addition to the usual type-faces 102, each sector 84 is provided with means whereby the setting of one sector to bring a selected type-face 102 thereon to printing position will automatically set the auxiliary zero type-faces 327 of all sectors to the right thereof, in printing position without requiring operation of such sectors, either manually or otherwise, to accomplish this result. To this end, each sector 84 is provided with a shiftable bar 328, Fig. 28, which is suitably guided by grooves 329 in said sector, and the outer end of this bar bears a zero type-face 327 which is normally below or within the arc of the type-faces 102 and is yieldably retained in such position by the retracting spring 330 which acts on the bar 328, but this zero type-face is capable of being brought into printing position, i. e. arcual alinement with the other type-faces, by a shifting movement of the bar 328.

The reciprocatory rack bar 325 is formed with a longitudinally extending slot 331, Figs. 8 and 28, and the front end of this slot has an enlargement 332, an inclined or cam surface 333 being between the narrower portion of the slot and its enlargement. A plate 334 is mounted at the left-hand side of each rack bar 325, the rear end of each plate being slotted and guided by cross-rod 42, and the front end of each plate being guided relatively to its respective rack bar 325 by a pin 334ᵃ on said plate which pin operates freely in a longitudinal slot 325ᵃ in said rack bar and each plate is normally held in rearward position by a tension spring 335. Each plate 334 has an upwardly and rearwardly sloping incline 336 upon which the adjacent lower end of the bar 328 bears under the influence of its spring 330, and each plate is, also, formed with a slot 337 which forms a shoulder 338. A set of independently movable arms 339, Figs. 9 and 28, of a number corresponding to the number of rack bars 325 and plates 334, are pivotally mounted on a cross-bar 340, the latter having its ends fitted in longitudinal slots 341 in the side frames 82 to permit the cross-bar 340 and the arms 339 thereon to shift bodily in a forward and rearward direction, such parts however being returned to and held in normal position by the tension springs 342 attached to depending lugs on the arms. The free end of each arm 339 is provided with a laterally turned and downwardly inclined finger 343 which extends through the slot enlargement 332 of the rack bar 325 and the slot 337 in the plate 334, the finger of each arm engaging beneath or underlying the finger of the next adjacent arm to the right, as shown clearly in Fig. 36. By this arrangement, rotation of a sector to bring a selected type-face 102 to printing position will cause its coöperating rack bar 325 to move toward the right, Fig. 28, and during such movement the cam or inclined surface 333 will operate upon the respective finger 343 to elevate it, this lifting of one of these fingers 343 causing lifting of the remaining fingers to the right, so that the remaining fingers are thereby presented to the respective shoulders 338. Forward movement of cross-bar 340 will then cause the raised fingers to abut against the shoulders 338 and thereby shift the corresponding plates 334 forwardly or toward the right, Fig. 28, the inclined surface 336 of each plate operating upon the respective bar 328 bearing thereon and causing the latter to shift in a manner to bring its zero type-face 327 into printing position. No ciphers will be printed to the left of the set sector, as the finger 343 of each arm 339 is capable of setting fingers to the right thereof, the zero type-faces on the bars 328 to the left therefore remaining depressed below the printing line. It should be understood that the printing of zeros in each column adds nothing to the total.

Operation of cross-bar 340 is effected by the cam-plate 88 as follows: A pair of links 344, Figs. 8 and 28, connects the cross-bar 340 with a pair of arms 345, said arms being fixed to shaft 346, which is journaled in suitable openings in frames 82, and being pivotally attached at 347 to said links. A hook 348, which is pivotally attached at 349 to one of the links 344, is also, pivotally attached at 350 to link 351 which is pivoted at 352 to arm 353, fixed to shaft 354, and said hook normally engages a pin 355 borne by plate 356, which is rotatably mounted on shaft 346. Plate 356 has a roller 357 revolubly attached at 358 thereto, and is pulled toward the cam-plate 88 by means of spring 359, so as to cause said roller to seat normally in a notch 360 in said cam-plate. When the cam-plate 88 is rotated by the depression of handle 93, the roller 357 moves out of notch 360 and then rides upon the cam surface 361, which, in turn, rocks the plate 356 toward the rear of the machine, thereby causing the pin 355 to draw the hook 348 toward the rear. This movement of hook 348 pulls upon the attached link 344 and thereby rocks shaft 346, which causes the arms 345, fixed thereto, to pull both links 344 toward the rear of the machine, so as to cause the cross-bar 340 to move toward the right, Fig. 28, whereby all the arms 339 are moved toward the rear of the machine, thus causing the raised fingers 343 to abut against the shoulders 338 in front of same, so as to shift the corresponding plates 334 toward the right, Fig. 28, thereby moving the proper bars 328 to set the zero type-faces 327 thereon in printing position as hereinabove described. The return movement of cam-plate 88 allows the plate 356 and parts connected therewith to return to their initial positions. When, for any reason, it may be undesirable or, at least, not desired thus automatically to print the zeros, the "split key" 362, Fig. 28, is depressed until the upper end of slot 363 in same engages the pin 364 that projects from the side wall of casing 1 into said slot and then said key is pushed toward the rear of the machine, whereby pin 36 enters notch 365 in the upper end of said slot and thereby holds said key in its depressed position. A spring 366 returns the key 362 to and holds same in its raised position, as shown in Fig. 28, when the key is pulled toward the operator, so as to move the notch 365 out of engagement with pin 364, which pin limits the upward and downward movement of said key. Said key 362 is pivoted at 367 to arm 368 fixed to shaft 354, and when said key stands in its raised position, the hook 348 is held in engagement with the pin 355 borne by plate 356, thereby rendering the automatic cipher-printing mechanism operative. When key 362 is depressed, it rocks shaft 354 and thereby causes the arm 353, fixed to said shaft to lower the hook 348, so as to move and hold said hook out of engagement with pin 355. The lowering of hook 348 allows the pin 355 borne by plate 356 to pass over same without actuating the automatic cipher-printing mechanism when the cam-plate 88 is rotated by the depression of the handle 93, and thereby renders the automatic cipher-printing mechanism inoperative as long as key 362 is held in its depressed position.

*The accumulator.*— The accumulator is actuated by the racks 369, Fig. 16, on rack bars 325, there being one such rack bar for each sector 84 and finger-piece 84ᵃ. The front ends of the rack bars 325 and the cooperative plates 334 normally rest upon a supporting cross-member 370, which is arranged at the entrance of the accumulator and is supported by frame 82, said cross-member bearing a comb 371 through which said rack bars and plates operate, whereby such parts are maintained in proper spaced relation. The teeth of each rack 369 are so arranged that when the bars 325 move away from the operator they ride without engagement past the teeth of their respective accumulator ratchets 372, but when rack bars 325 are returning toward their initial position, same are raised by mechanism about to be described, so that during such return movement racks 369 will engage with their respective ratchets 372 and thus actuate the accumulator wheels 104, to produce the usual accumulator results. Such actuation of the ratchets 372 by the racks 369 causes the rotation of the accumulator wheels 104, which are rotatably mounted on shaft 373, Figs. 16 and 17, and are separated by division plates 374. Each of the ten ratchets 369 is fastened to a wheel 104, of which there are ten, as is, also, each of the rings 375, Figs. 16, 17 and 38, said wheels exceeding by one the number of rack bars 325. Each of said rings is provided on its inner edge with a projection 376, Fig. 38, protruding into the path of rotation of a tooth upon comb 377, Fig. 17, when said comb is moved out of groove 378 by the depression of the clearing key 379, Figs. 1 and 11. When clearing key 379 is depressed, it actuates intermediate parts which raise comb 377 into space 380, so that projections 376 will be in the path of travel of the teeth of comb 377 when same is rotated with shaft 373, which occurs after clearing key 379 has been depressed and handle 93, also, has been depressed, such raising of said comb being hereinafter described. The raising of the racks 369, as hereinabove indicated, into engagement with their respective ratchets 372 is produced by the raising of the jack 381, Figs. 16 and 37, which in rising presses against the underside of the rack bar 325. Said jack 381 is located immediately adjacent to the cross-member 370, and embodies a pair of end members 382, which are connected by and loosely mounted on a cross-bar 383. Vertical movement and a limited extent of forward and backward movement are permitted the upper portion of the jack by the link 384, Fig. 13, which is pivotally connected to one of the main side plates 385 of the accumulator frame or casing at the point 386, the opposite end of said link being slotted at 387 and connected to an end member 382 of the jack by pin 388. The cross-bar 383 is secured to a pair of arms 389, Fig. 37, each of these arms being secured to shaft 390 journaled in side plates 385. The end members of the jack have extensions 391 adapted to engage the laterally turned upper ends 392 of a pair of detents 393, which are pivoted at 394 to side plates 385. Springs 395 hold the detents 393 normally in position to allow the ends of the arms 389 to rest thereon and thereby retain the jack 381 normally in its elevated position, one end of each of these springs being attached to an eccentrically arranged eye 396 on the respective detent while the opposite end of the spring is attached to the respective end member of the jack, whereby the jack will be pulled down after the arms 389 are released by the detents. The detents 393 are disengaged from supporting engagement with arms 389, when the upper portion of jack 381 is rocked toward the right, Figs. 16 and 37, the disengagement being effected by the extensions 391, which bear against and rock the respective detents 393, and the rocking of the jack 381 being produced by the engagement of the front end of rack bar 325, when said rack bar is moved into the accumulator by the depression of its finger-piece 84ª. Each plate 334 is provided with a finger 397 which is preferably located near the front end of same. The fingers 397, Fig. 16, on said plates 334 extend toward the interior of the accumulator and support the cross-member 398 which connects a pair of arms 399, said arms being adapted to swing in unison and being pivotally mounted on a cross-rod 400, which is supported by frames 82. The free ends of the arms 399 are formed with upwardly directed hooks 401 which are held normally in lowered position, as clearly illustrated in Fig. 16, by means of springs 402. When a rack bar 325 that has been moved into the accumulator is raised by the jack 381, so as to raise the rack 369 on said bar into engagement with its respective ratchet 372, the finger 397 borne by the plate 334 that coöperates with said rack bar raises the hooks 401 into engagement with the rear side of jack 381 and thereby locks said jack in its elevated position until said rack bar 325 and plate 334 return to their initial position.

The periphery of each accumulator wheel 104 carries a circular row of type-faces 103 bearing consecutively arranged numerals, and, also, a type-face 103ª bearing a zero character. Said wheel 104 is normally held in such position as to maintain its zero type-face 103ª normally out of printing position by means of a member 403, Fig. 16, there being one of these members provided for each accumulator wheel. Each member 403 contains slots 404 and 405 to allow the cross-rods 406 and 407, respectively, to extend therethrough, and one end of said member bears an upwardly directed finger 408 which is adapted to enter a wedge-shaped notch 409 formed in the periphery of the respective accumulator wheel 104, the slot 404 being preferably straight and the slot 405 being preferably curved in order to control the movement of the finger 408 in such manner that, when the member 403 is moved away from its wheel 104, the finger 408, in leaving the notch 409, rotates the wheel 104 counter-clockwise, Fig. 16, so as to move the zero type-face 103ª on said wheel from its normal or non-printing position to the print point designated by arrow A, and, when the member 403 is moved toward the wheel 104 after the accumulator is cleared in the manner hereinafter described, the finger 408 in entering said notch, rotates said wheel clockwise, Fig. 16, and thereby moves the zero type-face 103ª back to its normal or non-printing position. A latch 410, Fig. 16, is provided for each member 403, each of these latches being pivotally mounted on cross-rod 411 and bearing a projection 412 which is arranged to coöperate with the shoulder 413 on its respective member 403, so as to hold said member normally in an elevated position as depicted in Fig. 16. The forward end of each latch bears a laterally turned projection 414 which is adapted to bear upon the top of its respective plate 334, the latter when lowered and resting on cross-member 370 permitting the latch 410 to remain in locked engagement with its respective member 403, and when such plate is elevated by the jack 381, said latch will be elevated, thereby disengaging it from its respective member 403. This disengagement permits member 403 to descend under the influence of its spring 415, the finger 408 on such member then acting to turn the respective accumulator wheel sufficiently to bring the zero type-face 103ª thereon into printing position, continued movement of said member causing its finger to move entirely out of the notch 409 in said wheel. After a member 403 is released as just described, it remains in its lowered position until raised to its normal position as hereinafter described, when the clearing key 379 and handle 93 are depressed to clear the accumulator. Springs 416 tend to rotate the latches 410 counter-clockwise, Fig. 16, and thereby hold said latches in locking position.

A pin 417, Fig. 6, borne by the operating bar 60 projects into a radial slot 418 in the crank plate 419, Figs. 5 and 6, which is rotatably mounted on shaft 420. The upper edge of the crank plate 419 has a concentric portion 421 and, also, a notch 422, Fig. 5, the latter being adapted to receive a laterally turned projection 423 formed on a second plate 424. The plate 424 has a central slot 425 which accommodates the shaft 420 and permits the plate 424 to shift transversely thereof, the plate 424 also bearing a pin 426, Fig. 6, which operates in a radial slot 427 formed in a plate 428, the latter plate being fixed to rotate with shaft 420. The plate 424 is revoluble with the plate 428 and is shiftable to control the operative relation between the latter and the crank 419, the projection 423 on said plate 424 being normally held in notch 422 by spring 429, Fig. 5. The shaft 420 also has a cam 430, Fig. 37, fixed thereon, this cam having the successively arranged stepped surfaces 431, 432, and 433. One of the arms 389 of the jack is part of a bell crank, the other arm 434, Fig. 37, of which has a pin 435 arranged to coöperate with the cam 430. When the jack 381 is supported in its normal or elevated position, the bell-crank arm 434 holds the pin 435 normally out of engagement with cam 430, as illustrated in Figs. 12 and 37, but, when the jack is caused to drop as hereinabove described, same rotates the bell-crank arm 434 toward the left, thereby moving the pin 435 into engagement with the surface 431 of the cam 430.

In order to raise the jack 381 so as to elevate such of the rack bars 325 as have been pushed into the accumulator by the depression of certain finger-pieces 84ª and consequent actuation of certain sectors 84, the handle 93 must be depressed, by which movement not only said jack 381 is raised, but, also, the printing of the item is accomplished as hereinabove described. When the handle 93 is depressed by the operator, the operating bar 60 travels away from the operator and thereby causes the crank plate 419 to rotate counter-clockwise, Fig. 5, and this crank plate operates through the medium of the plate 424 and its projection 423 and plate 428 to rotate the main accumulator shaft 420 counter-clockwise, thereby causing the cam surface 431 of cam 430 to press against the pin 435 borne by the bell-crank arm 434, thereby rotating the bell-crank clockwise, Fig. 37, until the pin 435 thereon reaches the part 432 of the cam 430, with the result that the arm 389 of the bell-crank and its companion arm 389 raise the jack 381, and the jack in turn operates to raise the ends of such rack bars 325 as rest thereon and, also, the associated plates 334. These rack bars, however, are not at this time raised sufficiently to cause their rack teeth 369 to engage their respective ratchets 372, although the plates 334 are at this time raised sufficiently to lift their respective latches 410, the latter then releasing or unlocking their corresponding members 403, thus permitting the latter to be pulled downward by their respective springs 415, so that said members operate to turn their accumulator wheels 104, in order to move the zero type-face 103ª on said accumulator wheels into printing position as hereinabove described. After the accumulator wheels 104 have been rotated to present their zero type-faces 103ª to the printing point, the further rotation of cam 430 causes the cam surface 432 to press against the pin 435, thereby rocking the bell-crank arm 434 farther in a clockwise direction until said pin rides on the surface 433 of said cam, whereby the arms 389 lift the jack 381 farther until same reaches its initial position, the rack bars being then elevated sufficiently to engage the rack teeth 369 thereon with the ratchets 372, and hence when the rack bars 325 and their associated plates 334 are restored to initial position, the accumulator wheels will be rotated clockwise, Fig. 16.

A pawl 436, Fig. 16, is provided for each ratchet 372 and is preferably arranged for longitudinally reciprocatory motion, these pawls having slots 437 and 438 to allow cross-rods 439 and 440, respectively, to extend therethrough and being held in engagement with their respective ratchets by means of springs 441, their function being to prevent the accumulator wheels 104 from spinning. The nose of pawl 436 normally occupies a position between two teeth of its ratchet 372, as best seen in Fig. 16, in order to allow the accumulator wheel 104 to be rotated rearwardly to set its zero type-face 103ª in printing position in the manner hereinabove described. In addition to these pawls 436, a carry-over pawl 442, Figs. 29 to 43, is provided for each accumulator wheel 104, except the units accumulator wheel adjacent the right-hand side of the accumulator, it being unnecessary, for obvious reasons, to provide a carry-over pawl for the units wheel. Said carry-over pawl 442 is pivotally attached at 443 to a plate 444, which is mounted to reciprocate longitudinally in guides 445 in the upper portion of the accumulator, and is held in engagement with its respective ratchet 372 by means of spring 446, there being as many plates 444 as carry-over pawls 442. Shoulders 447 and and 488 on plate 444 are arranged to limit the movement of said plate by engagement with one of the guides 445, said plate 444 normally occupying such position that neither the shoulder 447 nor the shoulder 448 engage said guide, as best seen in Fig. 16, so as to allow said plate to be moved either toward the front or toward the rear of the machine. The nose of each carry-over pawl 442 normally rests upon the point of a tooth of its respective ratchet 372, as shown in Fig. 16, but, when its accumulator wheel 104 is released, in order to allow the zero type-face 10£ thereon to stand in printing position as hei inabove described, the nose of said pawl 442 rests upon the flat side of a tooth of said ratchet as illustrated in Fig. 42. When, however, the plate 444 is released in the manner hereinafter described, its spring 449, Fig. 16, draws same toward the operator, i. e., toward the left, Fig. 42, and thereby causes the carry-over pawl 442 borne by said plate to move therewith, whereby the nose of said pawl rides along the flat surface of a tooth of ratchet 372 until same drops in front of the point of said tooth as illustrated in Fig. 43, in order to be in position to rotate the coöperating accumulator wheel 104 through substantially one-tenth of a revolution in the manner hereinafter described.

Each spring 449 tends to pull its respective plate 444 toward the operator, i. e., toward the left, Fig. 16, but such movement of said plate is normally arrested by hook 450, Figs. 16, 40 and 41, said hook being pivotally mounted on cross-rod 451 and being held normally in engagement with a projection 452 on said plate by means of a spring 416 which is attached to its coöperating latch 410, there being one such hook provided for each plate 444. As no carry-over pawl 442 and plate 444 are necessary for the units wheels 104, same are omitted, and, for this reason, the spring 416 which holds the latch 410 of the units wheel 104 in normal position is attached to cross-rod 453, Fig. 16. The end of hook 450 rests normally on a projection 454 borne by the rear end of lever 455 and thereby holds the rear end of said lever in a position resting upon cross-rod 456, as illustrated in Figs. 16, 40 and 41, said lever being pivotally mounted on cross-rod 457 and having a projection 458 formed on the front end thereof, which projection 458 protrudes into the path of rotation of projection 459 borne by ring 375 of the adjacent accumulator wheel 104 to the right of said lever, there being one such lever 455 provided for each accumulator wheel 104 except the wheel of the highest order, as illustrated in Fig. 15. The lever 455 of the units wheel 104 normally stands in the position depicted in Fig. 40, and, when same is rotated clockwise, so as to move its "9" typeface past printing position, the projection 459 on the ring 375 borne by said wheel strikes the projection 458 on lever 455 and thereby rocks said lever counter-clockwise, with the result that the projection 454 on the rear end of said lever lifts the hook 450 out of engagement with the projection 452 on its coöperating plate 444, whereupon spring 449 pulls said plate 444 toward the left, Fig. 16, until the shoulder 448 on said plate engages the guide 445. This movement of plate 444 sets the carry-over pawl 442 borne by same in position ready to rotate the tens accumulator wheel sufficiently to carry over the total from the units to the tens wheel, when said pawl is moved to produce the carry-over in the manner hereinafter described.

Each plate 444 to the left of the plate 444 that supports the carry-over pawl 442 of the tens accumulator wheel 104 is provided with an additional hook 460, Fig. 41, for holding same in its normal position, said hook 460 being pivotally mounted on cross-rod 451 and being held normally in engagement with the projection 452 on its respective plate 444 by means of spring 461, Fig. 16. The end of said hook 460 rests upon a projection 462, Fig. 41, borne by the rear end of lever 463 and thereby holds the rear end of said lever normally in a position resting upon cross-rod 456, these levers 463 corresponding in number to the hooks 460 and being pivotally mounted on cross-rod 457. Each lever 463 bears an arm 464, Fig. 41, which extends below a projection 465 borne by the forward arm of its companion lever 455, which arm of said lever 455 is arranged to hold the projection 458 on the end of same normally in position to be engaged by the projection 459 on the ring 375 of its coöperating wheel 104, when the latter is rotated clockwise, Fig. 41, to move its "8" type-face 103 past printing position so as to present its "9" type-face in printing position. During this movement of accumulator wheel 104, the engagement of the projection 459 on its ring 375 with the projection 458 on its lever 455 results in rocking said lever counter-clockwise, Fig. 41, whereby the projection 454 on the rear end of said lever raises hook 450 out of engagement with projection 452 on its coöperating plate 444 and holds said hook in such raised position as long as the "9" type-face 103 on said wheel remains in printing position. The hook 460, however, remains in engagement with the projection 452 on said plate 444 and thereby holds said plate in its normal position, for the reason that the movement of lever 455 as just described merely releases hook 450 from engagement with projection 452 on said plate. Further rotation of the wheel 104 causes the projection 459 on its ring 375 to rock lever 450 farther in a counter-clockwise direction, Fig. 41, whereby the projection 465 on said lever engages the arm 464 of its companion lever 463, thereby rocking said lever 463 counter-clockwise and causing the projection 462 on the rear end of said lever 463 to raise the hook 460 out of engagement with the projection 452 on said plate 444, whereupon spring 449 draws said plate toward the left so as to move the carry-over pawl 442 borne by said plate to a position to carry over the total to the wheel 104 of the next higher order.

Each lever 463 also bears an arm 466, Fig. 41, which stands in front of a projection 467 borne by the front end of the plate 444 to the right thereof, as best seen in Fig. 39. In case, however, the units wheel 104 is rotated so as to move its "9" type-face past printing position, the projection 459 on its ring 375 trips its lever 455, which, in turn, releases its coöperating hook 450 from engagement with the projection 452 on the plate 444, which bears the carry-over pawl 442 of the tens wheel 104, whereupon said plate is pulled toward the left, Fig. 16, by its spring 449, thereby setting said pawl in position to carry over the total from the units to the tens wheel. This movement of said plate 444 causes the projection 467 on the front end of same to strike the arm 466 on lever 463 of the hundreds 104 and thereby rock said lever, which, in turn, releases the coöperating hook 460 from engagement with the projection 452 on the plate 444 which bears the carry-over pawl 442 of the hundreds wheel 104. Under these circumstances, if the tens wheel 104 stands with its "9" type-face 103 in printing position, the projection 459 on its ring 375, through the medium of its coöperating lever 455 and hook 450, holds said hook 450 out of engagement with the projection 452 on the plate 444 that bears the carry-over pawl 442 of the hundreds wheel 104, so that, when the plate 444 of the tens wheel 104 is released and same, in moving toward the left, Fig. 16, releases the hook 460 of the hundreds wheel 104 from engagement with the projection 452 on its coöperating plate 444, the latter moves toward the left by the pull of its spring 449 and thereby moves its carry-over 442 to the position to carry over the total from the tens to the hundreds wheel
104. In like manner when any other accumulator wheel 104 stands with its "9" type-face 103 in printing position and the plate 444 of the next wheel 104 to the right thereof is released, said plate in moving toward the left, Fig. 16, releases the next plate 444 to the left thereof as hereinabove described, so as to set the carry-over pawl 442 borne by the latter in position to carry over the total from the wheel 104 having its "9" type-face in printing position to the wheel 104 of the next higher order.

Each plate 444 has a projection 468 formed on the rear end of same, which projection, when said plate is released and moved toward the left, Fig. 16, is adapted to strike the rounded end 469 of one arm of a bell-crank 470, Fig. 16, thereby to rock said bell-crank on cross-rod 471, with the result that the rounded end 472 of the other arm of said bell-crank presses downwardly on projection 473 borne by the rear end of its coöperating latch 410 and thereby rocks said latch, so as to release same from engagement with its coöperating member 403, which, in turn, descends by the pull of its spring 415 and moves its respective wheel 104 to a position to present the zero type-face 103ᵃ thereon in printing position. By this means, whenever an accumulator wheel is rotated sufficiently to set a carry-over pawl 442 in position to carry over the total to the next higher wheel 104, which still remains with its zero type-face 103ᵃ in its normal or non-printing position, the movement of the particular plate 444 that bears said pawl results in releasing the coöperating latch 410 from engagement with its member 403 as hereinabove described, whereupon spring 415 pulls said member downwardly and thereby sets the zero type-face 103ᵃ of the latter wheel 104 in printing position before said wheel is rotated by the carry-over pawl.

From the foregoing description, it will be observed that the function of each plate 444 when released is to set the carry-over pawl 442 in carrying over position, but the actual movement of the carry-over pawl 442 for the purpose of carrying over the total from one wheel 104 to the next accumulator wheel is produced by the depression of handle 93, which causes the operating bar 60 to travel away from the operator, which movement of said bar rocks shaft 420 counter-clockwise, Fig. 12, as hereinabove described. A plate 474, Fig. 12, fixed to shaft 420 so as to rotate therewith has a pawl 475 pivotally attached at 476 thereto, which pawl is held in engagement with a ratchet 477 by means of spring 478, said ratchet being rotatably mounted on said shaft 420 and having a cam 479 fixed thereto. This cam is preferably somewhat like a star wheel, and each tooth 480 thereof is rounded on one side for the purpose about to be described. A pin 481 borne by an arm 482 that is fixed to shaft 483 is normally held in a position resting between two teeth 480 of cam 479 by means of spring 484 as shown in Fig. 12. The arm 482 is located adjacent one side of the accumulator and is connected with an arm 485, Fig. 13, adjacent the other side of the accumulator by means of rod 486, said arm 485 being, also, fixed to shaft 483. Said rod 486 passes through the upper part of the accumulator and extends in front of the arms 487 on each plate 444, being normally in the position depicted in Fig. 16 so as to allow the plates 444 to be moved toward the left when same are released as hereinabove described. When the shaft 420 is rocked counter-clockwise, Fig. 12, the plate 474 rocks therewith and rotates the cam 479 through the instrumentality of pawl 475 and ratchet 477, whereby the rounded side of a tooth 480 of said cam presses against the pin 481 and thereby rocks the arm 482 toward the right, thus rocking shaft 483. This rocking of shaft 483 causes the arms 482 and 485 to move the rod 486 toward the right, Fig. 16, whereby said rod engages the arms 487 on plates 444 and thereby forces said plates toward the right, with the result that each plate 444 that had been previously moved to set its carry-over pawl 442 in carrying-over position in the manner hereinabove described is moved toward the right, thus causing the carry-over pawl 444 to rotate its wheel 104 sufficiently to produce the carry-over, such movement of said plates 444 being limited by the engagement of the shoulders 447 thereon with guide 445. By the time the plates 444 have reached the limit of their movement toward the right, the pin 481 will have ridden over one tooth 480 of cam 479, whereupon spring 484 pulls the arm 482 toward the left, Fig. 12, and thereby returns the pin 481 to its normal position in front of the next tooth 480, with the result that arms 482 and 483 return rod 486 to its normal position, thus allowing the plates 444 to return the carry-over pawls 442 to their normal position. Immediately after the carry-over pawls 442 are returned to their normal position, the jack 381 raises such rack bars 325 as have been pushed into the accumulator into engagement with their respective ratchets as hereinabove described, after which the handle 93 is allowed to return to its initial position. The return movement of handle 93 moves the operating bar 60 toward the front of the machine and thereby rocks the shaft 420 clockwise, Figs. 5 and 12. During the return movement of shaft 420, the plate 474 rotates therewith, and the pawl 475 carried by said plate rides idly over a tooth of ratchet 477, thereby allowing said ratchet and cam 479 to remain at rest until the handle 93 is again depressed.

In order to prevent the carry-over pawls 442 from being disengaged from their ratchets 372 while the former are being moved to produce the carry-overs, a detent 488, Fig. 16, is provided for each carry-over pawl, these detents being pivotally mounted on cross-rod 489. Each detent 488 bears a finger 490 which is normally held in engagement with cross-rod 491 by means of spring 492. Each carry-over pawl 442 is provided with a projection 493, Fig. 16, which, when said pawl occupies its normal position, stands in front of projection 494 borne by said detent as best seen in Fig. 16. When, however, a carry-over pawl 442 has been set in carry-over position as illustrated in Fig. 43 and is then moved toward the right to produce the carry-over, the projection 493 on same will pass underneath the projection 494 on its detent 488, whereby said detent prevents said carry-over pawl from disengaging its ratchet 372. The projections 493 on the carry-over pawls 442 which stand in normal position strike the projections 494 on their respective detents 488, when said pawls are moved toward the right, Fig. 16, and thereby merely rock said detents on cross-rod 489. In case a carry-over pawl 442 occupies the position depicted in Fig. 42 and same is moved toward the right, its nose merely slides along the flat side of a tooth of its ratchet 372 without rotating the latter, and the projection 493 on said pawl passes underneath the projection 494 on its detent 488.

The arm 487 of each plate 444 is provided with a projection 495, Fig. 12. A set of latches 496, one for each plate 444 is pivotally mounted on a rod 497 of a cradle 498, the arms of which are pivotally attached at 499 to the side plates 385 of the accumulator, and springs 500 operate to move such rod toward the left, Fig. 12. Each latch 496 has a shoulder 501, Fig. 16, adapted to snap over and lock itself to the projection 495 on arm 487 of its coöperating plate 444, when said plate is moved toward the left, Fig. 16, as hereinabove described. A controlling device 502, Fig. 16, is provided for each latch 496, each of these devices having a tail 503, which is located beneath a projection 504 on its respective latch, and when any one of the controlling devices is actuated to lower its tail 503, the corresponding latch will be permitted to descend by the pull of its spring 505 and allow its shoulder 501 to rest upon the projection 495 on the arm 487 of its respective plate 444, there being a slot 506, Fig. 9, provided in the top plate of the casing for each controlling device to extend therethrough. A spring 507, Fig. 16, is provided to hold the controlling device in operative and inoperative positions. Ordinarily, however, all the controlling devices will be set in inoperative position so that the latches 496 will be supported thereby, and will not engage the projections 495 borne by plate 444, certain of these latches being released when the machine is being operated to simultaneously add a plurality of sets or columns of numerals. Each latch 496 has an arm 508 which, when the respective plate 444 moves said latch toward the right, Fig. 16, and thereby rocks the cradle 498, engages the cross-rod 509, such latches as have been moved toward the right being thereby raised out of engagement with the projections 495 on arms 487 of their respective plates 444. The cradle 498 forms part of a signal for indicating when a carry-over has occurred, it having a spring supported clapper 510, Fig. 13, fixed thereto, and when the cradle is released by the disengagement of the latch or latches, it suddenly returns to initial position under the influence of its springs 500, the clapper striking and sounding the bell 511.

The total key 198 is locked, so as to prevent the printing of a total before the last item has been printed, said locking taking place as follows: When a rack bar 325 is, by the pulling of a finger-piece 84$^a$, caused to travel into the accumulator, it engages jack 381, as hereinbefore described, causing said jack to drop. When jack 381 drops, the rod 383 pushes downwardly in fork 512, Fig. 16, thus pushing arm 513 downwardly and rocking arm 514 fixed on shaft 515, said arm 513 being pivoted at 516 to arm 514 and being pulled toward said rod by spring 517, Fig. 16. Also fixed to said shaft 515 is arm 518, Fig. 6, which is pivoted at 519 to link 520, which, at its upper end, is pivoted at 521 to link 206. When arm 514 is rotated downwardly, arm 518 is rotated upwardly and pushes link 520 and thereby link 206 upwardly, thereby causing projection 522, Fig. 6, borne by link 206 to rise into notch 523, Fig. 26, behind hook 524 borne by frame 176. When said projection 522 is thus seated in notch 523 behind hook 524, projection 525 passes underneath projection 522, so as to hold same in said notch 523, said projection 525 being actuated to assume said holding position by the member 526, Fig. 26, loosely mounted on cross-rod 43 and normally pulled by spring 527 into engagement with the side of projection 522 and thus passing under same as soon as projection 522 is raised out of the way. A projection 528 borne by member 526 extends into the path of movement of the rear end of plate 145 borne by operating bar 60, and, when operating bar 60 moves plate 145 toward the rear of the machine by depression of handle 93, the rear end of said plate 145 engages the projection 528 and thereby pushes the projection 525 from underneath projection 522, and thus unlocks the total key 198, without the depression of which no total can be printed. While projection 522 is in engagement with hook 524, link 206, Fig. 26, can not be pulled toward the operator by pressure upon the total key 198, but, when the operating bar 60 is moved toward the rear of the machine, as just described, the rear end of plate 145 pushes projection 525 from beneath projection 522, thus unlocking same from engagement with hook 524, thereby rendering link 206 free to move toward the operator when the total key 198 is pushed inwardly. As heretofore described, link 206 governs the movement of the platen 7 toward either the total type or the item type, directing same toward the total type when the total key 198 is depressed.

*Clearing mechanism.*—The clearing key 379 is locked by the operation of registering the first item and remains locked until the total has been printed. The use of the clearing key 379 removes all results from the accumulator, allowing each accumulator wheel 104 to return to its initial position. The movement of any one of the finger-pieces 84$^a$ at the beginning of any particular use of the machine causes its respective rack bar 325 to travel into the accumulator, and thus to engage the jack 381, which drops and, through the medium of rod 383, fork 512, and arms 513 and 514, causes shaft 515 to rock, thus carrying upward with it arm 529, Fig. 11, which carries a pin 530 that engages in slot 531 in plate 532, so as to cause hook 533 to latch over pin 534, which projects from the left-hand side of the side casing 1. Pin 535 is located in opening 536 in plate 532, projecting thereinto from arm 537, which latter is pivoted at 538 to clearing key 379 and is rigidly mounted on shaft 539. The raising of arm 529 causes opening 536 in plate 532 to rise, so that its lower edge will engage pin 535, immediately after which hook 533 latches on pin 534, and pin 535 then rests on the lower edge of opening 536, and can not be moved farther downwardly by pressure upon clearing key 379, because said lower edge of opening 536 being then at its highest point, is held in such position by the retention of hook 533 by pin 534. After hook 533 has been latched on pin 534, the clearing key 379 obviously is locked from operation until such future time when hook 533 is unlatched from pin 534, which occurs when the platen 7 is rocked toward the total type. Thus, after the printing of the total, clearing key 379 can be depressed and the machine cleared. In the meantime and while hook 533 is latched on pin 534, shaft 515 partially rotates from time to time (at each occasion when an item is entered in the machine), but the pin 530 slides in slot 531 in plate 532, and thus does not pull on plate 532 or hook 533. Thus, the normal entering of items and printing of items continues to take place while the clearing key is locked against actuation, but, when platen 7 has been rocked, so as to print a total, arm 540, Fig. 11, has been simultaneously rocked by shaft 21, on which it is rigidly mounted, platen 7 being, also, in rigid connection with shaft 21, and said movement of arm 540 will push hook 533 off pin 534, allowing spring 541 to pull the plate 532 to its lower position with hook 533 disengaged from pin 534 and with pin 535 out of engagement with the lower edge of opening 536 in plate 532. The movement of arm 540 is in one direction limited by bolt 542, Fig. 11, and in the opposite direction by a similar bolt 543, said bolts 542 and 543 being supported by arms 544 of plate 545, which is riveted or otherwise secured to the left-hand side of casing 1. Spring 546 tends to hold the clearing key 379 in its normal position and, also, to return same to normal position. Thus has been described the locking and unlocking of the clearing key 379. The connected parts for clearing the accumulator will next be described.

When clearing key 379 is depressed, it rocks shaft 539, thus causing arm 547, Fig. 12, rigidly mounted thereon to rock downwardly and thereby press downwardly upon projection 548 borne by arm 549, which is loosely mounted on shaft 539, thereby rocking said arm 549 downwardly. Link 550, pivoted at 551 thereto, will be thereby pulled downwardly, the other end of same being pivoted at 552 to arm 553, Fig. 8, loosely attached to shaft 83. The clearing type, "C," 554 is carried by said arm 553, and when link 548 is lowered as aforesaid, said clearing type 554 is held in printing position by continuation of pressure on clearing key 379 at the time when the handle 93 is depressed for clearing the accumulator. Thus, the depression of clearing key 379 prepares the parts in the accumulator and in connection therewith to be cleared, depression of handle 93 operates to clear the accumulator, and retention of the clearing key 379 in its depressed position while the operation of clearing takes place holds the "C" type 554 in printing position, so that the depression of handle 93 will not only clear the accumulator, but also rock platen 7, so as to print "C" on the paper 5.

The rocking of shaft 539 as aforesaid, raises a pair of arms 555, Fig. 13, thereby causing links 556, pivoted at 557 to each of the arms 555, respectively, to rise, the upper ends of each of said links 556 being pivoted at 558 to a pair of yokes 559, said yokes being pivoted at 560 to the outside of the accumulator casing 385. Each of said yokes 559 contains an opening 561, Fig. 13, the upper edge of which normally rests on comb 377, which fits in groove 378 in shaft 373, and, by the pressure of yokes 559, is caused normally to hold the teeth of comb 377 out of space 380, by which means the accumulator wheels 104 are allowed to rotate without interference by engagement of projections 376 with comb 377 until such time as the clearing key 379 is pushed in, which, as aforesaid, results in raising links 556 and yokes 559 and thereby comb 377 into space 380, where same meets projections 376, when shaft 373 is rotated by the handle 93 for clearing purposes. Said shaft 373 is rotated to clear the machine by depression of handle 93 in the following manner: When shaft 539 is rocked as aforesaid, it raises arm 562, Fig. 6, which raises link 563 pivoted thereto at 564, there being a horizontal slot 565 in said link, into which slot a pin 566 borne by hook 567 projects, said hook being pivotally attached at 568 to arm 569, Fig. 5, rigidly mounted on shaft 570. A pin 571, Fig. 6, secured to frame 176 projects into a vertical slot 572 in the upper part of link 563, in order to guide the movement of said link, and normally seats in the upper end of said slot, which position keeps notch 573 in said hook 567 from engagement with pin 574 borne by the operating bar 60. When shaft 539 is rocked so as to raise arm 562 and thereby link 563, pin 566 is thus pushed up in such manner as to rock hook 567 upwardly, so that pin 574 will seat in notch 573 and when the operating bar 60 travels toward the right, Fig. 5, pin 574 pulls hook 567 with it, said hook thus pulling on arm 569, causing same to rock shaft 570 counter-clockwise, Fig. 5. The forward end of hook 567 normally rests upon cross-rod 177, as shown in Fig. 5, and when said hook is raised and moved toward the right as just described, same passes over and closely to cross-rod 177, which, in turn, prevents said hook from becoming disengaged from pin 574 until the operating bar 60 and clearing key 379 are returned to their initial position. A plate 575, Fig. 12, is rigidly mounted on shaft 570 and contains a cam slot 576 into which a pin 577 projects from arm 578 of a segmental rack 579, the latter being revolubly mounted on shaft 580 and meshing with pinion 581 rigidly mounted on shaft 373. When, as aforesaid, shaft 570 is rocked, the plate 575 revolves therewith and causes the cam slot 576 therein to press against pin 577, whereby the rack 579 revolves counter-clockwise, Fig. 12, and causes the pinion 581 and shaft 373 to rotate clockwise through substantially nine-tenths of a revolution, with the result that the teeth of comb 377 engage the projections 376 within space 380, said projections being on the rings 375 fastened to the accumulator wheels 104, by which engagement of the teeth of comb 377 with said projections all the accumulator wheels 104 are rotated to zero. The rotation of shaft 373 is limited to substantially nine-tenths of a revolution, as hereinabove described, in order that said accumulator wheels may stop at zero, said limitation being produced by the length of arc of segmental rack 579, same being prearranged exactly for that purpose. In order to prevent the accumulator wheels 104 from spinning past the zero position by reason of mere momentum, a plate 582, Fig. 12, engages projections 583, there being one such projection 583 on each accumulator wheel 104, and said projection 583 being so located as to stop the accumulator wheels at zero. The plate 582 is in rigid connection at one end thereof with plate 584, which is pivotally attached at 585 to one side of the accumulator casing 385, and at the other end thereof with arm 586, Fig. 13, which is mounted on pivot 585 at the other side of the accumulator casing 385. A member 587, Fig. 12, is pivoted at 588 to plate 584 and bears an eccentric eye 589 to which a spring 590 is attached. Said spring 590 is also attached to one side of the accumulator casing 385, and not only tends to rotate the member 587 clockwise on its pivot 588, so as to hold projection 591 on said member normally in engagement with projection 592 on plate 584, but, also, tends to rotate plate 584 counter-clockwise on its pivot 585, in order to hold said plate 584 normally in engagement with stop pin 593 as illustrated in Fig. 12. A lip 594 borne by member 587 protrudes into the path of rotation of arm 595 rigidly mounted on shaft 570, and, when said shaft is rocked as hereinabove described, the arm 595 rotates therewith and engages the lip 594, thereby rocking plate 584 clockwise, Fig. 12, which results in moving plate 582 into the path of rotation of projections 583 on wheels 104, so as to stop said wheels at zero. When the shaft 570 has completed rotating in a counter-clockwise direction, Fig. 12, the arm 595 will have passed out of engagement with lip 594 on member 587, whereupon spring 590 returns plate 584 and member 587 to their initial positions, and, when the shaft 570 is rotated by the return movement of handle 93, the arm 595, in returning to its initial position trips the member 587 without rocking plate 584.

After the accumulator wheels 104 have been restored to zero as just described, same are rotated sufficiently to move the zero type-faces 103ª to their normal or non-printing position by raising members 403 to their initial position in the following manner: A link 596, Fig. 12, is attached at one end thereof to plate 575 by means of pivot 597 and contains a slot 598 in the other end thereof, into which slot a stud 599 projects from one arm of a lever 600 fulcrumed on cross-rod 177, the other arm of said lever being connected with a pair of plates 601, Fig. 16, by means of a tie-rod 602, said plates being pivotally mounted on said cross-rod 177. The stud 599, Fig. 12, normally seats in the rear end of slot 598 and, when the shaft 373 is being rotated to turn the accumulator wheels to zero as hereinabove described, the plate 575 pushes the link 596 to the right, Fig. 12, but such movement of said link is an idle one until the forward end of slot 598 moves into engagement with stud 599, which occurs about the same time that the accumulator wheels 104 have been returned to zero printing position, this restoring of said wheels 104 to zero being accomplished by the first part of the forward rotation of plate 575 that causes the pin 577 to ride through the eccentric part of cam slot 576. After the wheels 104 have been restored to zero as just described, the pin 577 rides in the concentric part of cam slot 576 and thereby prevents the segmental rack 579 from further rotation, and the forward end of slot 598 so presses against stud 599 as to rock the lever 600 clockwise, Fig. 12. This rocking of lever 600 causes the plates 601 to rock therewith, whereby one of the rods 603 that connects said plates 601 is moved upwardly against the shoulders 604, Fig. 16, on members 403 and thereby raises said members to their normal position, with the result that the fingers 408 borne by said members reënter the notches 409 in their respective accumulator wheels 104, thus rotating same sufficiently to move the zero type-faces 103ª thereon to their normal or non-printing position. When the members 403 are raised as just described, the projections 412 on latches 410 reëngage shoulders 413 on said members and thereby hold same in normal position. The shaft 539 has a pair of arms 606, Fig. 16, rigidly mounted thereon and, when the former is rocked by the depression of the clearing key 379, the arms 606 are thereby raised until the ends of same stand in front of the projections 392 borne by detents 393, so as to prevent said detents from being rocked out of supporting engagement with arms 389, thus preventing the jack 381 from being dropped in case the operator attempts to depress a finger-piece 84ª. One of the yokes 559 bears an arm 607, Fig. 13, to which one end of a link 608 is pivoted at 609, the other end of said link being provided with a slot 610 into which a stud 611 projects from arm 485. The stud 611 normally seats in the forward end of slot 610, and, when the yokes 559 are raised by the depression of the clearing key 379, the arm 607 forces the link 608 toward the left, Fig. 13, thereby rocking arm 485 sufficiently to move and hold the rod 486 in touching engagement with arms 487 of plates 444, whereby the latter are held in their normal position and are prevented from being moved to set their carry-over pawls 442 in carrying-over position, as hereinabove described, in case any of the hooks 450 and 460 are released from engagement with the projections 452 on said plates 444 while the accumulator wheels 104 are being restored to zero. When, however, the arm 485 is rocked to produce the carry-over operation by the depression of handle 93 as hereinabove described, the stud 611 moves idly through slot 610. After the accumulator wheels 104 have been restored to their normal or non-printing position as hereinabove described, the handle 93 is released, whereupon the operating bar 60 returns to its initial position and thereby causes reverse movement of shaft 570, thus restoring the parts of the clearing mechanism to normal position. Each plate 601 bears a projection 612, which, when the former is in normal position, rests upon shaft 390 as depicted in Fig. 16.

When the link 563 is raised by the depression of the clearing key 379 as hereinabove described, a projection 613, Fig. 6, borne by said link moves upwardly against projection 614 on plate 424 and thereby raises the latter sufficiently to raise the projection 423 on said plate 424 out of notch 422 in crank plate 419 and, also, raises the projection 614 into a position in front of projection 615 on frame 176. A shoulder 616 on link 563 extends upwardly adjacent the forward side of projection 614 on plate 424 and, when the link 563 raises the plate 424 as just described, the projection 614 on said plate 424 then occupies a position between shoulder 616 on link 563 and projection 615 on frame 176, in order to prevent said plate 424 and shaft 420 from being rotated when the operating bar 60 is moved toward the right, Fig. 5, by the depression of handle 93. When plate 424 is raised as just described and the operating bar 60 is moved toward the right, Fig. 5, the pin 417 borne by said bar causes the crank plate 419 to rotate loosely on shaft 420 while the shoulder 616 on link 563 and projection 615 on frame 176 hold the plate 424 stationary for the time being, thereby preventing the shaft 420 from rotating. When the operating bar 60 returns to its initial position, the pin 417 returns the crank plate 419 to its normal position, whereupon release of pressure from clearing key 379 allows the spring 429 to lower the plate 424 to its normal position, thereby causing the projection 423 on said plate 424 to seat in notch 422 in crank plate 419 and, also, lowering the projection 614 sufficiently to allow the latter to pass the projection 615 on frame 176 when the plate 424 is rotated with plate 419 as hereinabove described.

*Non-add key.*—In case, however, it is desired to print an item without entering same in the accumulator, so as to eliminate same from the total, the non-add key 239 is depressed before the handle 93 is depressed to print the item from the item type-faces 102, which have been previously set in printing position by the depression of the proper finger-piece 84ª. The non-add key 239 is pivoted at 617 to the arm 618 of a bell-crank 619 and is held in its normal position by the spring 620, as illustrated in Fig. 5, said bell-crank being pivoted at 621 to one side of the casing 1. A link 622 is attached at one end thereof to the other arm 623 of said bell-crank 619 by pivot 624, and, at the other end of said link, same is pivoted at 625 to plate 626 rigidly mounted on shaft 627, and, when the non-add key 239 is depressed, the bell-crank 619 is thereby rocked counter-clockwise, Fig. 5, whereby link 622 rocks the plate 626 and shaft 627 counter-clockwise. When plate 626 is thus rocked by the depression of the non-add key 239, a projection 628 borne by said plate 626 moves upwardly against projection 423 on plate 424 and thereby raises plate 424, so as to lift the projection 423 out of notch 422 in crank plate 419 and, also, to raise the projection 614 to a position between shoulder 616 on link 563 and projection 615 on frame 176, thus preventing the shaft 420 from rotating when the operating handle 93 is depressed. The depression of the handle 93 while the non-add key 239 is held in a depressed position, results in swinging the platen 7 toward the item type 102 and thereby printing the item, but, as the shaft 420 is prevented from rotating as hereinabove described, the jack 381 remains in its lowered position, whereby the rack bars 325, which have been pushed into the accumulator, are allowed to return to their normal position without actuating their respective accumulator wheels, thus eliminating the item from the total. When shaft 627 is rocked by the depression of the non-add key 239, the arm 629 rigidly mounted on said shaft is rocked upwardly, Fig. 8, thereby raising the link 630 which is pivoted at 631 to said arm. The link 630 is also pivotally attached at 632 to plate 633, Fig. 45, which is revolubly mounted on shaft 539, and, when said link is raised as just described, same rocks the plate 633 counter-clockwise, Fig. 12, and thereby causes said plate to press downwardly upon the projection 548 on plate 549, as will be understood from Fig. 45, whereby the latter pulls downwardly upon link 550 which, in turn, rocks the arm 553 on shaft 83 and thereby moves the non-add type-face 634 on said arm 533 into printing position. When the handle 93 is depressed, the platen 7 is swung toward the item type-face 102, whereby not only the item is printed from the item type set in printing position, but, also, prints the letter "E" or any other suitable letter or character from the non-add type-face 634 at one side of the item on paper 5, in order to indicate on the paper that such item was printed and eliminated from the total, that is to say not entered in the accumulator.

In order to make it unnecessary for the operator to hold the non-add key 239 in its depressed position, the same is locked temporarily in its depressed position in the following manner: A latch 635, Fig. 5, is pivoted at 636 to one side of the casing 1 and is held normally in engagement with projection 637 on arm 618 of bell-crank 619 by means of a spring 638, as best seen in Fig. 5. Said latch 635 contains a notch 639 and, when the non-add key 239 is depressed sufficiently to bring the projection 637 on arm 618 of bell-crank 619 into registration with the notch 639, the spring pulls the latch toward the right, Fig. 5, and thereby causes the notch 639 to catch upon the projection 637, thus locking, for the time being, the non-add key 239 in its depressed position. The plate 90, Fig. 5, has a member 640 pivotally attached at 641 thereto, one end of which member is held normally in engagement with pin 95 on said plate by means of spring 642, and the other end of said member being provided with a projection 643. A finger 644 borne by latch 635 projects into the path of movement of the projection 643 on member 640, and when the plate 90 is rotated by the depression of handle 93 as hereinabove described, the projection 643 on member 640 engages the right-hand side of finger 644 on latch 635, but such engagement of said projection 643 with finger 644 merely rocks the member 640 clockwise on its pivot 641, Fig. 5, until the projection 643 passes out of engagement with the finger 644, whereupon spring 642 pulls the end of said member back into engagement with pin 95. The depression of the handle 93 prints the item and the non-add character "E" upon the paper 5 as hereinabove described, during which time the latch 635 holds the non-add key 239 in its depressed position, but when the handle 93 is allowed to return to its initial position, the plate 90 is thereby rotated in the reverse direction on shaft 83, whereby the projection 643 on member 640 engages the left-hand side of the finger 644 and thereby rocks the latch 635 counterclockwise, Fig. 5, thus moving the notch 639 out of engagement with projection 643, whereupon spring 620 returns the non-add key 239 to its normal position. When the plate 90 has been restored to its normal position, the projection 643 on member 640 will have passed out of engagement with the finger 644 on latch 635, so as to allow the spring 638 to return the latch 635 to its initial position. By means of the mechanism just described, the non-add key 239 is locked in its depressed position, and remains locked in such position until it is released after the item, which is thereby prevented from being added in the accumulator, is printed. Thus, it is necessary for the operator to depress the non-add key 239 for each item to be printed without adding same in the accumulator.

In case the non-add key 239 has been erroneously depressed, the operation of any one of the error keys 209 will release same in the following manner: The arm 245 of plate 240 is pivoted at 645 to one end of a link 646, the other end of the latter being provided with a slot 647 into which a pin 648 projects from the latch 635, which slot allows idle movement of the pin 648 when the latch is rocked to release the non-add key 239 as hereinabove described. When, however, it is desired to release the non-add key 239 after same has been depressed, pressing any one of the error keys 209 inwardly results in moving the projection 237 on same into engagement with the rod 243, which connects the plates 240 and 241, and thereby rocks said plate 240 clockwise, Fig. 5, whereby the arm 245 of said plate 240 pulls the link 646 downwardly, with the result that said link pulls upon the pin 648 borne by latch 635 and thereby rocks said latch, which, in turn, releases the non-add key 239, whereupon spring 620 returns the non-add key and parts connected therewith to their initial positions. In order to release the non-add key 239 as just described, it is necessary to press an error key 209 before the handle 93 is depressed, because the depression of the handle 93 causes the operating bar 60 to travel toward the right, Fig. 5, and thereby moves the notch 246 from beneath the end of arm 245 of plate 240, thus rendering the error key inoperative as hereinabove described, until the operating bar returns to its initial position.

When, as aforesaid, shaft 627 is rocked by the depression of the non-add key 239, the arm 649, Fig. 6, rigidly mounted on said shaft is thereby rocked toward the left. A pin 650 borne by said arm 649 projects into a slot 651 in the rear end of link 652 and normally seats in the front end of said slot, said link being attached at the forward end thereof to the arm 204 on shaft 199 by means of pivot 205. When the arm 649 is rocked by the depression of the non-add key 239 as just described, the pin 650 is thereby moved to the rear end of slot 651 in link 652, thus preventing the shaft 199 from being rocked by the depression of the total key 198 as hereinabove described. By this means, the total key 198 is locked and is prevented from being depressed while the non-add key 239 is depressed. By this same means, the non-add key 239 is locked in its normal position, when the total key 198 is depressed, for the reason that the depression of the total key 198 causes the shaft 199 to rock the arm 204 toward the right, Fig. 6, and thereby draws the link forwardly until the pin 650 seats in the rear end of slot 651, thereby preventing the non-add key 239 from being depressed.

In order to prevent the depression of the non-add key 239 while the handle 93 is being operated, the crank plate 419 is provided with an arcuate flange 653, Fig. 5, which, when said crank plate is rocked by the depression of the handle 93 as hereinabove described, passes over the projection 628 borne by plate 626, thereby preventing the depression of the non-add key 239 until the crank plate 419 has been returned to its initial position by the upward stroke of the handle 93.

*The ribbon.*—The ribbon 654 is preferably wound on spools 655 and 656 and passes over ribbon-guide 657, Fig. 2, secured to one of the sides of casing 1 and, also, over ribbon-guide 80 secured to one of the frames 82. One end of said ribbon 654 is attached to one of said spools, and the other end to the other of said spools, and said ribbon is fed alternately from one spool to the other, and its direction of travel is automatically reversed. In its travel, it passes horizontally adjacent to the automatic cipher type-faces 327 and the type-faces 102 of all sectors 84 and, also, the type-faces 103 and 103ª of all of the accumulator wheels 104, being held out of engagement with said type-faces by means of auxiliary spring guides 658 and having its greatest width presented toward said type-faces. Said ribbon may be of any color or be bichrome or polychrome. When a bichrome ribbon is used, the items will be printed from the item type in one color, and the totals will be printed from the total type in the other color. The clearing key 379 and the non-add key 239 are indirectly connected to the plate 553 bearing the clearing type-face 554 and the non-add type-face 634, which are adapted to print some signs that the machine has been cleared, or an item has been printed without adding same in the accumulator, as, for instance, the abbreviations "C" or "E," respectively, and, in order that said type-faces may print, the ribbon 654 passes also adjacent to same. The feeding of the ribbon 654 is preferably intermittent in character rather than continuous, and each movement of the ribbon is preferably timed to occur immediately before a printing operation has been performed, the twofold object of this arrangement being that a fresh part of the ribbon may be presented for each printing operation and that the ribbon shall not be moving while the printing operation is taking place, as movement at that time would produce a blurred type impression. The travel of the ribbon 654 is produced by the rotation of the spool upon which same is being wound, which is alternately spool 655 and spool 656. Each of said spools is provided with actuating devices adapted to rotate same, said actuating devices on each spool operating only at the time when the ribbon is being wound upon the particular spool, during which time said actuating devices on the other spool are inoperative. This results in alternately rendering each of said spools a puller and a follower. The time of actuation of either spool as a puller for the ribbon is when the operating bar 60 has traveled so far from the operator in its operating stroke that pin 659, Fig. 6, fixed to the rear end of operating bar 60 has ridden nearly to the mouth of inclined notch 660 in arm 661 fixed to shaft 662, which will be at the time when operating bar 60 has reached nearly the limit of its operating stroke. Shaft 662 extends from one side of the casing to the other, and rocks with and by means of arm 661. Shaft 662 thus rocks arm 663, Fig. 11, which is, also, fixed thereto at the other end thereof. Arm 663 is pivoted at 664 to link 665, which is pivoted at 666 to bar 667, said bar containing slots 668 and 669, in which pins 670 and 671 ride. Said pins 670 and 671 project from the adjacent side of the casing 1 and serve as supports for bar 667 and, also, as guides therefor and, furthermore, by reason of their location in slots 670 and 671, limit the travel of bar 667. Each spool 655 and 656 is provided with a ratchet 672, Fig. 11, which is engaged by a pawl 673, said pawls being pivoted at 674 to bar 667, and each being provided with a heel 675, which rides on the upper surface 676 of the arm of a U-shaped plate 677 extending underneath the bottom of bar 667 and upwardly on each side thereof. Each surface or edge 676 of plate 677 is beveled at 678, Fig. 44, with which, for automatic reversing purposes, as hereinafter described, the heels 675 of pawls 673 engage. The feed of the ribbon 654 in one direction is caused by the engagement with a ratchet 672 of either pawl 673, one of which engages one ratchet 672 and the other pawl 673 the other ratchet 672. While one pawl 673 is engaged with the ratchet 672 adjacent to same, the other pawl 673 is held out of engagement with its ratchet 672 by its heel 675 resting upon the high part of the surface 676 of its side of the U-shaped plate 677. When the operating stroke of the operating bar 60 causes shaft 662 to rock and, through the intermediation of arm 663 and link 665, causes bar 667 to move toward the right, Fig. 11, carrying with it both pawls 673, but particularly that one which is in engagement with one of the ratchets 672, the tooth of said engaging pawl 673 pushes against a tooth of its ratchet 672 and thereby rotates said ratchet until the bar 667 has reached the limit of its operating stroke, thus feeding the ribbon 654 forward just previous to the printing operation hereinabove described. When said bar 667 returns to its initial position, by reason of the action of spring 193 on handle 93, the tooth of the engaging pawl 673 rides loosely over the teeth of its ratchet 672 until the bar 667 reaches its normal position, said ratchet 672, while the tooth of its pawl 673 is riding loosely thereover, being held from reverse rotation by retaining pawl 679, Fig. 11. A pair of these retaining pawls 679 is provided, one such pawl being adapted to engage one ratchet 672 and the other said pawls 679 being adapted to engage the other ratchet 672. Each of said pawls is mounted on an arm 680 of a bell-crank pivoted at 681 to a division plate 682, which is supported by stud 683 and cross-rod 177, the other arm 684 of said bell-crank resting upon the heel 675 of its pawl 673, said heel being bent out of alinement with its pawl, so as to be adapted to be engaged by the extremity of said arm 684. It is to be understood that both pawls 679 are constructed and arranged in like manner, but that one is arranged relative to the ratchet 672 on spool 655 and the other relative to ratchet 672 on spool 656.

Springs 685 are fastened to bar 667, and rest, respectively, upon the heels 675 of pawls 673, and press same into engagement with the upper surface 676 of U-shaped plate 677, so as to cause the said heels to engage at all times said surface 676 and to ride alternately on the low and high part thereof. When most of the ribbon has fed from one of the spools to the other, plate 677 is caused automatically to move relative to bar 667 by means of the pushing engagement of the extremity of one arm 685, Fig. 11, of the bell-crank pivoted at 687 to the division plate 682, with projections 688 on U-shaped plate 677, or by the pulling engagement of hook 689 on the extremity of one arm 690 of a second bell-crank pivoted at 687 to the division plate 682, with projection 692 on U-shaped plate 677, said bell-cranks having their other arms 686 and 692, Figs. 2 and 11 constituted by leaf springs. In this forward and backward movement of U-shaped plate 677, same is held by pins 693 projecting through slots 694 in bar 667, said pins 693 passing through holes in the arms of the U-shaped plate 677. Until actuated by arm 685, U-shaped plate 677 is held in the position indicated in Fig. 11 by means of the detent spring 695, the free end of which latter fits into notch 696 in bar 667, said spring being attached to the U-shaped plate 677. When said detent spring 695 rests in notch 697 in bar 667, said U-shaped plate 677 is similarly held until actuated by arm 690. Arms 685 and 690 are, respectively, caused to move into engagement with projections 688 and 692 by being rocked downwardly on pivot 687 by the pull of springs 698 on projections 699, which are attached to said bell-cranks, said rocking downwardly movement of arms 685 and 690 being possible alternately when so much of the ribbon 654 has fed off of spool 655 that spring arm 686 has reached a position adjacent to the axis 700 of spool 655 or when spring arm 691 has closely approached the axis of spool 656 by reason of most of the ribbon having been fed off said spool 656. Simultaneously with the depression of either arm 685 or arm 690 into position for engagement with, respectively, either projection 688 or projection 692, the respective spring 698 will pull its retaining pawl 679 into operative position relative to the ratchet 672 upon spool 655 when arm 685 is depressed, or upon spool 656 when arm 690 is depressed. It will be observed that the actuation of U-shaped plate 677 forward is thus automatically caused by the roll of ribbon 654 becoming low upon the axis of spool 655, and that the actuation of said plate 677 toward the rear of the machine is caused by the same condition upon spool 656, the automatic reversal in direction of the travel of the ribbon 654 being produced alternately by the approach of spring arm 686 or spring arm 691 toward the axis, respectively, of spools 655 and 656, due to the ribbon 654 having fed thereoff. Guide rod 701 is so located as to direct the course of travel of ribbon 654 adjacent to spools 655 and 656. When, for any reason, it is desirable to render the ribbon feed inoperative, as, for instance, for the purpose of cleaning or repairing the parts, pressure applied to arm 702, Fig. 11, will disengage latch 703 from cross-rod 177, thus enabling the rocking of division plate 682 on stud 683. Said latch 703 thus forms a clamp for said division plate, being pivoted at 704 to the division plate 682 and being held normally in engagement with cross-rod 177 by means of spring 705.

*The operation of the machine.*—The following is a general description of the operation of the machine: Each item to be printed is entered into the machine by the depression of the proper finger-piece or finger-pieces 84$^a$ in the usual manner, the particular digit of each denomination being determined by the extent to which the proper finger-piece 84$^a$ is depressed, and the extent of such depression depending, in turn, upon the particular finger indentation of said finger-piece in which the finger of the operator is placed. This depression of a finger-piece 84$^a$ causes its segmental rack, 222, Fig. 6, to rotate the particular gear 223 in mesh therewith and, also, the ratchets 225, 273, and 287 attached to said gear, and moves the projection 283 borne by said finger-piece away from the end 284 of a member 282, in order that the spring 288 that is attached to the pawl 286 may draw the tooth 289 of said pawl 286 into engagement with the ratchet 287 after the printing operation takes place, or when an error key 209 is depressed to allow said finger-piece to return to its initial position, as hereinabove described. As fast as each finger-piece 84ᵃ is depressed to the limit permitted with the finger placed in any particular finger indentation, and the sector 84, to which it is secured thereby rotated, one of the pawls 226, Fig. 7, locks the ratchet 225, so that the sector and attached parts are locked against return movement. By the rotation of the sector, the item types 102 carried thereon are raised until the proper typeface is set at a point opposite the ribbon 654, and, simultaneously therewith, the rack-bar 325, Fig. 8, engaging said sector is driven away from the operator, said rack-bar, in turn, causing the same number of teeth of its rack 369 to move into the accumulator as is represented by the figure on the particular type-face occupying the printing position. The inclined surface 333, Fig. 9, of the enlarged end 332 of slot 331 in the left-hand rack-bar 325, which is moved away from the operator, rides underneath and raises the finger 343 passing through said rack-bar, and all such fingers for rack-bars to the right are simultaneously raised, so that each one will be moved in front of a shoulder 338 of slot 337 in a plate 334, in order to be in position to move said plate away from the operator to cause the inclined surface 336 on said plate to raise the coöperating bar 328, thereby to present the zero type-face 327 on the latter in printing position. The rack-bar 325, in moving into the accumulator, causes the jack 381, Fig. 16, to drop, as hereinabove described, whereby the rod 383 forces the arms 513 and 514 downwardly, so as to rock the shaft 515 clockwise, Figs. 16 and 26. This rocking of shaft 515 causes the arm 518, Fig. 6, to rotate therewith, and said arm raises the link 520, which, in turn, raises link 206 sufficiently to cause projection 522 on said link 206 to enter notch 523 behind hook 524 and, also, to allow the projection 525 on member 526 to move underneath the projection 522, in order to hold the latter in said notch, thus locking the total key 198 from depression until after the platen is rocked toward the item type-faces. The arm 529, Fig. 11, also, rocks with shaft 515 and raises plate 532 until the spring 541 causes the hook 533 to latch over pin 534, thus locking the clearing key 379 from depression and maintaining same locked until the platen 7 is rocked to print the total represented upon the typefaces of the accumulator wheels 104 that occupy the printing position. When all the necessary finger-pieces 84ᵃ have been depressed, it is obvious that the proper typeface 102, which will then be in a position opposite the ribbon 654, will represent the desired number to be printed. The depression of any finger-piece 84ᵃ causes the upper end of the arcuate slot 290, Fig. 8, in its sector 84 to depress the rod 308, which rocks the plates 309, so as to move the beveled extension 311 of one of said arms out of engagement with pin 312, Fig. 25, borne by pawl 313, whereupon spring 319 lowers the pawl 313 until the notched end 322 of same rests upon the end of detent 314.

In order to print the numbers, the operator depresses the handle 93, thereby not only causing the operating bar 60 to travel toward the right, Fig. 5, but, also, causing the operating cam 88 to rotate counter-clockwise, Figs. 7, 21, and 25. When the operating bar 60 moves toward the right, Fig. 5, the pin 267, Fig. 5, moves out of the notch 268 in plate 269 and thereby rocks the latter, which, in turn, moves the plate 274 away from the pawls 272, Fig. 32, so that the springs 227 pull said pawls into engagement with their respective ratchets 273 and hold same in such position until the operating bar returns to its initial position, whereby the depressed finger-pieces 84ᵃ are locked from further depression, after which further movement of the bar 60 causes the pin 267 to travel underneath and then pass beyond the lip 280, Fig. 5, on trigger 276. Simultaneously, the rotation of the operating cam 88, Fig. 25, causes the cam surface 306 thereon to rock the bell-crank 296, which rocks the arm 293 toward the rear of the machine and causes the rod 292 to seat in a notch 291 in each sector 84, as hereinabove described, thereby not only centering the item type 102 in printing position, but affording a positive means for holding the sectors stationary. At the same time, the cam surface 361, Fig. 28, on the operating cam 88 rocks the plate 356 toward the rear of the machine, whereby the pin 355 borne by said plate draws the hook 348 with same, with the result that said hook moves the arms 339 toward the rear of the machine through the medium of arms 345, links 344, and rod 340, so as to cause the fingers 343 on each elevated arm 339 to press against the shoulders 338 on their coöperating plates 334, thereby to move said plates toward the rear of the machine, so that the bar 328 of each unmoved sector 84 to the right of the left-hand depressed sector will be thereby elevated to set the zero type-face 327 thereon in printing position just previous to the printing operation. The bell-crank 152, Fig. 26, carried by the operating bar 60 causes the plate 145 to travel with said bar, thereby causing the cam slot 162 in said plate 145 to force the pin 161 downwardly, so as to lower the plate 158, which, in turn, stretches spring 156. At this time bevel 180 on bar 60 rocks the latch 174 and causes same to release yoke 173, whereby the pull of said spring 156 causes the link 160 to descend suddenly, and said link, in turn, causes yoke 173 to rock shaft 21 counter-clockwise, Fig. 26, with the result that arms 20, Fig. 8, rock with said shaft and cause the platen 7 to move and strike the item type, which, thereupon, print their respective figures on the paper carried by the platen. At the same time that the latch 174 releases the yoke 173 as just described, the end of plate 145 engages the projection 528, Fig. 26, on member 526 and thereby rocks said member toward the rear of the machine, thus moving the projection 525 on said member out of supporting engagement with projection 522 on link 206, whereupon the rear end of said link 206 descends and withdraws the projection 522 from notch 523, thereby unlocking the total key. Immediately after the latch 174 releases the yoke 173 as just described, the projection 188 on arm 152 of bell-crank 153 rides up the inclined surface 192 on dog 185 and passes over the upper end of said dog, thereby disengaging the projection 154 on said arm 152 from the front side of projection 146 on plate 145 and causing same to engage the rear side of projection 146, as hereinabove described.

During the first part of the operating stroke of bar 60, the pin 659, Fig. 6, rocks arm 661 and thereby causes shaft 662 and arm 663, Fig. 11, to rock, with the result that said arm 663 forces the bar 667 away from the operator, whereby the pawls 673 travel toward the right, Fig. 11, with said bar, and the particular pawl 673 that engages one of the ratchets 672 rotates same, so as to cause the ribbon 654 to feed from the spool 655 to the spool 656, or vice versa, just previous to the printing operation. Simultaneously with the ribbon-feeding operation just described, the rotation of the cam 88 causes the pin 87, Figs. 21 to 23, borne thereby to draw the hook 76 toward the front of the machine, thereby rocking plate 75 on shaft 21 and causing the pawl 73 to rotate the platen 7 forward through the medium of ratchet 72, and gears 58 and 59, so as to feed the paper 5 forwardly just before the item is printed thereon. After the pin 87 has pulled the hook 76 forward sufficiently to feed the paper forward as just described, the projection 99 on frame 100, by engagement with the inclined surface 76ª on hook 76, raises said hook out of engagement with the pin 87, whereupon spring 81 returns plate 75 to its initial position as hereinabove described. Simultaneously with the completion of paper-feeding operation just described, the pin 125, Fig. 21, borne by cam 88 will have moved across the notch 126 in cam plate 120 and into engagement with the side 128 of said notch, thereby rotating said cam plate 120 clockwise, Fig. 21, so as to move the projection 123 on said cam plate out of engagement with pin 119 on member 115, whereupon spring 121 pulls the member 115 away from the shaft 21. Spring 112, Fig. 21, then causes plate 108 to follow the member 115, in order to cause the projection 124 on said plate 108 to seat between two adjacent teeth 131 of ratchet 105, thereby locking said ratchet 105 and consequently gear 58 to member 103, so as to prevent farther forward or backward feed of the paper as hereinabove described. The pin 417 borne by the operating bar 60 travels with same and thereby rocks the shaft 420 counter-clockwise, Figs. 5 and 12, through the medium of crank plate 419 and plate 424, thus causing said shaft 420 to rotate the cam 430, Fig. 37. When the cam 430 is rotated, the pin 435 borne by the bell-crank arm 434 rides from the cam surface 431 to the cam surface 432 on cam 430 and thereby causes the arm 389 of the bell-crank and its companion arm 389 to raise the jack 381, which, in turn, raises the ends of such rack bars 325 and plates 334 that rest thereon. The plates 334 are thus caused to lift their respective latches 410, Fig. 16, which release or unlock their coöperating members 403, thus permitting the latter to be pulled downward by their respective springs 415, with the result that said members 403 operate to turn their accumulator wheels 104 sufficiently to move the zero-type faces 103ª into printing position. Thereafter the pin 435 rides from the cam surface 432 to the cam surface 433 and thereby causes the arms 389 to raise the jack 381 to its initial position, so as to elevate the rack bars 325 sufficiently to engage the rack teeth 369 thereon with the ratchets 372, so that, when said rack bars 325 return to their normal position the rack teeth 369 thereon will rotate the accumulator wheels 104 sufficiently to add the item in the accumulator.

After the printing operation takes place, the pin 304 on cam plate 88 trips the trigger 300, Fig. 25, out of engagement with the notched end 299 of bell-crank 296 and thereby allows the spring 295 to return arm 293 to its normal position, so as to move the rod 292 out of the notches 291 in sectors 84, thereby releasing said sectors so that same can return to their intitial position when released by the return movement of handle 93. When the handle 93 nears the end of its downward stroke, the shoulder 316 on cam 88 engages the detent 314 and thereby rocks same forward, so as to move the upper end of said detent out of the notch 322 in pawl 313, whereupon spring 319 lowers said pawl until the tooth 315 borne by same rests upon the arcuate surface 323 on said cam 88.

After the completion of the operating stroke of the operating bar 60 caused by the depression of handle 93, the handle 93 is released, and the spring 193 causes said handle and operating bar and parts connected therewith to return to their initial positions, whereby the pin 267 borne by the operating bar 60 engages and passes over the lip 280 on trigger 276 thus depressing the plate 269. Plate 274 is thereby caused to move all the pawls 226 out of engagement with the ratchets 225, in order to allow each depressed finger-piece 84ª to return to its initial position by the pull of its spring 238 and, also, to allow the pawls 286 for the depressed finger-pieces to engage their respective ratchets 287, whereby each depressed finger-piece 84ª is prevented from being again depressed until same returns to its initial position. This return movement of each depressed finger-piece 84ª draws its rack-bar 325 toward the front of the machine, whereby the rack 269 on said rack bar causes its accumulator wheel 104 to rotate the distance necessary to make the type on said wheel that is then left exposed to the ribbon 654 represent the sum of the number at which the accumulator wheel last stood and the new digit that has been added in. When all the depressed finger-pieces 84ª return to their normal position, same allow the rod 308 and plates 309, Fig. 25, to return to their normal position, whereby the beveled extension 311 on one of said plates raises the pawl 313 to its normal position, so as to prevent said pawl from locking the cam plate 88 at the completion of the return stroke of handle 93. During the first part of the return movement of the operating bar 60, the bell-crank 152, Fig. 26, causes the plate 145 to travel therewith, whereby the cam slot 162 forces the pin 161 upwardly and thereby raises the link 160, which, in turn, returns the platen 7 to its normal position, whereupon the projection 188 on the arm 152 of bell-crank 153 rides up the inclined surface 195 on dog 184 and passes over the upper end of said dog, thereby disengaging the projection 154 on said arm 152 from the rear side of projection 146 on plate 145 and causing same to engage the rear side of projection 146 as hereinabove described.

After a sufficient amount of numbers has been printed and added to cause an accumulator wheel 104 to rotate the distance necessary to carry its "9" type-face past printing position, a plate 444, Fig. 16, bearing a carry-over pawl 442 is thereby released in the manner hereinabove described, whereupon said plate 444 is moved forward by the pull of its spring 449, so as to set the carry-over pawl 442 in position to rotate the next accumulator wheel 104 to the left of the particular accumulator wheel 104 that moved its "9" type-face past printing position. The arms 482 and 485 are then rocked toward the rear of the machine by the rotation of cam 479, Fig. 12, as hereinabove described, whereby the rod 486 moves the plates 444 toward the rear of the machine, so as to cause the carry-over pawls 442 previously set in carrying-over position, as just described, to rotate their respective accumulator wheels 104 through one-tenth of a revolution, thus producing the carry-over operation in the accumulator before the completion of the operating stroke of the operating bar 60, as hereinabove described.

The operation hereinabove described may be repeated *ad libitum*, so long as there are numbers to be printed and added, and, in case it is desired to print any item without permitting same to be added in the accumulator, the non-add key 239 is depressed before the handle 93 is depressed to print such item, whereby the shaft 420 is prevented from rotating, as hereinabove described, when the handle 93 is depressed, with the result that the jack 381 remains in its lowered position so as to allow the rack bars 325 to return to their normal positions without actuating their respective accumulator wheels 104. The depression of the non-add key 239 rocks the shaft 627 and thereby rocks the plate 549 counter-clockwise, Fig. 8, on shaft 539 through the medium of arm 629, link 630, and plate 633, whereby said plate 549 pulls downwardly upon link 555, which, in turn, rocks plate 553 so as to set the non-add type-face 634 in printing position, so that when the platen is swung toward the item type, not only the item will be printed, but the non-add sign "E" is printed opposite the item on the paper, so as to indicate that such item is eliminated from the total. Finally, when all the numbers to be added have been printed and added as hereinabove described, the total key 198 is depressed which results in drawing link 206, Fig. 26, toward the front of the machine. The link 206 rocks the link 160 toward the front of the machine, whereby the cam slot 168 releases the pin 170 and the pin 171 enters cam slot 169. The handle 93 is depressed in order to move the operating bar 60 toward the rear of the machine, which results in producing the last carry-over operation in the accumulator, and then in rocking shaft 21 clockwise, Figs. 5 and 9, as hereinabove described, whereby the platen is rocked and caused to strike the accumulator type faces, which thereupon print the sum or total of the numbers to be added upon the paper 5. When shaft 21 is rocked as just described, the arm 540, Fig. 11, rocks therewith and causes the hook 533 on plate 532 to release pin 534, whereby spring 541 lowers said plate to its initial position, in order to unlock the clearing key 379, which may then be depressed.

After a total is printed as just described, the total key 198 and handle 93 are released, whereby same return to their initial positions. When the total key 198 returns to its initial position, the link 206 returns the link 160 to its normal position, so that the latter will rock the platen toward the item type during the next depression of the handle 93. If it is then desired to clear the machine, the clearing key 379 is depressed, whereby the shaft 539 rocks and thereby lowers the typeface 554, Fig. 8, to printing position through the medium of arms 547 and 549 and link 550 and, at the same time, raises the yokes 559, Fig. 13, through the intermediation of arms 555 and links 556, said yokes, in turn, raising comb 377 into space 380. The arm 562, Fig. 5, rocks with shaft 539 and raises link 563, thereby lifting hook 567, so as to cause the pin 574 borne by the operating bar 60 to enter notch 573 in said hook, and, simultaneously therewith, the projection 613 on link 563 presses upwardly against the projection 614 on plate 424, thereby raising plate 424, so as to lift the projection 423 on same out of the notch 422 in crank plate 419, thus allowing the operating bar 60 to move toward the rear of the machine without rocking shaft 420. The handle 93 is then depressed to cause the operating bar 60 to travel toward the rear of the machine, so as to cause the platen 7 to rock toward the type-face 554, which prints the clearing sign "C" upon the paper on the platen, and, also, to cause the hook 567 to travel with said operating bar, in order to rock shaft 570 counter-clockwise, Figs. 5 and 12. This rocking of shaft 570 rotates shaft 373 through substantially nine-tenths of a revolution, whereby said shaft 373 rotates comb 377 in such manner as to cause the teeth of said comb to engage the projections 376 within space 380, with the result that each accumulator wheel 104 standing with its zero type-face 103$^a$ out of printing position is thereby rotated to zero, as hereinabove described. Thereafter the shaft 570 completes its forward rotation, whereby the link 596 rocks the lever 600, Fig. 12, which, in turn, rocks the plates 601 in such manner as to cause the rod 603, Fig. 16, to raise the members 403 to their normal position, so that said members rotate the accumulator wheels 104 sufficiently to move the zero typefaces 103$^a$ thereon to their normal or non-printing position as hereinabove described. After the machine is cleared, the clearing key 379 and handle 93 are released, in order to allow same and the parts connected therewith to return to their initial positions in the manner hereinabove described, thus leaving the machine clear for the next column of numbers to be printed and added. Subtotals may be obtained at any desired intermediate point and the adding operation resumed, because the machine is not cleared by merely printing a total, since the clearing requires the independent and distinct operations hereinbefore described.

We claim:

1. In a calculating machine, the combination of a plurality of printing sectors, each having a normally inoperative adjustable cipher printing device, a rotary operating member, and means actuated by said member for moving said cipher printing devices into operative position.

2. In a calculating machine, the combination of a plurality of printing sectors, each having a normally inoperative adjustable cipher printing device, a rotatable cam, means actuated by said cam for moving said cipher printing devices into operative position, and means for actuating said cam.

3. In a calculating machine, the combination of a plurality of printing sectors, each having an adjustable cipher printing device, a cam, a shaft, means actuated by said cam for rocking said shaft, and means operatively connected with said shaft adapted to set said cipher printing devices.

4. In a calculating machine, the combination of a plurality of printing sectors, each having an adjustable cipher printing device, a shaft, a member revoluble on said shaft, a cam adapted to rock said member, a pair of arms borne by said shaft, means actuated by said member for rocking said shaft, and means operatively connected with said arms for setting said cipher printing devices.

5. In a calculating machine, the combination of a plurality of printing sectors, each having an adjustable cipher printing device, a shaft, a member revoluble on said shaft, a cam adapted to rock said member, a pair of arms borne by said shaft, a shiftable member, links connecting said shiftable member with said arms, a pin borne by said revoluble member, a hook carried by one of said links and normally engaging said pin, thereby to rock said shaft when said revoluble member is rocked, and means actuated by said shiftable member for setting said cipher printing devices.

6. In a calculating machine, the combination of a plurality of printing sectors, each having an adjustable cipher printing device, a cam, means actuated by said cam for setting said cipher printing devices, and means for rendering said setting means inoperative.

7. In a calculating machine, the combination of a plurality of printing sectors, each having an adjustable cipher printing device, a rocking member, a cam adapted to actuate said member, a shiftable member operatively connected with said rocking member, and means actuated by said shiftable member for setting said cipher printing devices.

8. In a calculating machine, the combination of a plurality of printing sectors, each having an adjustable cipher printing device, a rack bar operative by each sector, a set of members, one coöperating with each rack bar and adapted to set said cipher printing devices, a set of arms each bearing a finger, said fingers being arranged in overlapping relation, means on each rack bar for setting its respective finger in operative position, thereby to cause all fingers to the right thereof to be set correspondingly, a shiftable member supporting said arms, a rocking member connected with said shiftable member for operating same, and means for actuating said rocking member.

9. In a calculating machine, the combination of a plurality of printing sectors, each having a set of type-faces which are normally in non-printing position, a cam, and means actuated by said cam for centering the type-faces on said sectors in printing position.

10. In a calculating machine, the combination of a plurality of printing sectors, each having a set of type-faces which are normally in non-printing position, a pivoted member, a cam adapted to actuate said member, and means actuated by said member for centering the type-faces on said sectors in printing position.

11. In a calculating machine, the combination of a plurality of printing sectors, each having a set of type-faces which are normally in non-printing position, a shaft, a bell-crank supported by said shaft, a cam adapted to rock said bell-crank, and means actuated by said bell-crank for centering the type-faces on said sectors in printing position.

12. In a calculating machine, the combination of a plurality of printing sectors, each having a set of type-faces which are normally in non-printing position, a shaft, a member supported by said shaft, a cam adapted to rock said member, means actuated by said member for centering the type-faces on said sectors in printing position, and means actuated by said cam for releasing said centering means.

13. In a calculating machine, the combination of a plurality of printing sectors, each having a set of type-faces, which are normally in non-printing position, and having a serrated edge, a shaft, a member supported by said shaft, a cam adapted to rock said member, a pair of arms supported by said shaft, a rod connecting said arms and adapted to enter a serration in each sector, thereby to center the type-faces on said sectors in printing position, and means actuated by said member for rocking said arms.

14. In a calculating machine, the combination of a plurality of printing sectors, each having a set of type-faces, which are normally in non-printing position, and having a serrated edge, a shaft, a member supported by said shaft, a cam adapted to rock said member, a pair of arms supported by said shaft, a rod connecting said arms and adapted to enter a serration in each sector, thereby to center the type-faces on said sectors in printing position, releasable means connecting said member with one of said arms, and means borne by said cam for actuating said connecting means, thereby to release same from operative connection with said member.

15. In a calculating machine, the combination of a plurality of printing sectors, each having a set of type-faces, which are normally in non-printing position, and having a serrated edge, a shaft, a member supported by said shaft, a cam adapted to rock said member, a pair of arms supported by said shaft, a rod connecting said arms and adapted to enter a serration in each sector, thereby to center the type-faces on said sectors in printing position, means for holding said rod normally out of engagement with the serrated edge of each sector, a trigger carried by one of said arms and normally engaging said member for causing said arms to rock with said member, and means borne by said cam for releasing said trigger from engagement with said member, thereby to allow said holding means to return said arm and said rod to normal position.

16. In a calculating machine, the combination of a plurality of printing sectors, each having a set of type-faces, which are normally in non-printing position, and containing an arcuate slot one side of which is provided with a plurality of notches, a shaft, a pair of arms supported by said shaft, a rod connecting said arms and extending through the slots in said sectors, means for holding said rod normally out of engagement with the notched sides of the slots in said sectors, and means for rocking said arms to cause said rod to seat in a notch in each sector, thereby to center the type-faces on said sectors in printing position.

17. In a calculating machine, the combination of item printing means, impression mechanism, and means for locking the impression mechanism from subsequent operation after an item is printed until the item printing means is restored to normal position.

18. In a calculating machine, the combination of item printing means, impression mechanism, and means controlled by the item printing means for locking the impression mechanism from subsequent operation after an item is printed until the item printing means is restored to normal position.

19. In a calculating machine, the combination of a plurality of printing sectors, impression mechanism, actuating means for said impression mechanism, a cam controlled by said actuating means, and means controlled by the printing sectors for locking said cam, thereby to prevent a subsequent printing operation until after the printing sectors are restored to normal position.

20. In a calculating machine, the combination of a plurality of rotatable printing sectors, each having an arcuate slot, a pair of revoluble members, a rod connecting said members and extending through the slots in said sectors, resilient means for holding said rod normally in engagement with an end of each slot in said sectors, impression mechanism, means for actuating said impression mechanism, a cam controlled by said actuating means, and means controlled by one of said revoluble members for locking said cam, thereby to prevent a subsequent operation of said impression mechanism until after the printing sectors are restored to normal position.

21. In a calculating machine, the combination of a plurality of rotatable printing sectors, each having an arcuate slot, a shaft supporting same, a pair of revoluble members supported by said shaft, a rod connecting said members and extending through the slots in said sectors, resilient means for holding said rod normally in engagement with an end of each slot in said sectors, impression mechanism, means for actuating said impression mechanism, a cam controlled by said actuating means, and a latch adapted to lock said cam after each printing operation, thereby to prevent a subsequent printing operation until the printing sectors are restored to normal position, one of said members having means for disengaging said latch from said cam when all the printing sectors return to normal position.

22. In a calculating machine, the combination of a plurality of rotatable printing sectors, each having an arcuate slot, a shaft supporting same, a pair of revoluble members supported by said shaft, a rod connecting said members and extending through the slots in said sectors, resilient means for holding said rod normally in engagement with an end of each slot in said sectors, impression mechanism, means for actuating said impression mechanism, a cam controlled by said actuating means, a latch adapted to lock said cam after each printing operation, thereby to prevent a subsequent printing operation until the printing sectors are restored to normal position, and a detent controlled by said cam for preventing said latch from engaging said cam until after each printing operation, one of said members having means for disengaging said latch from said cam when all the listing sectors return to normal position.

23. In a calculating machine, the combination of a plurality of rotatable printing sectors, a shaft supporting same, a revoluble member supported by said shaft and controlled by said sectors, impression mechanism, actuating means for said impression mechanism, a cam controlled by said actuating means, a latch adapted to lock said cam after each printing operation, thereby to prevent a subsequent printing operation until the printing sectors are restored to normal position, and a detent controlled by said cam for preventing said latch from engaging said cam until after each printing operation, said member being adapted to release said latch from locking engagement with said cam when all the printing sectors are restored to normal position.

24. In a calculating machine, the combination of item printing means, an accumulator for adding and printing totals, a platen, means for moving said platen to and from printing position with respect either to the item printing means or the accumulator, means under the control of the platen operating means for rotating said platen to advance the paper for each printing operation of the platen, means for partially rotating said platen to present the print point on the paper either to the item printing means or the accumulator, and a device for locking the paper advancing means from operation while said platen is being moved to and from printing position.

25. In a calculating machine, the combination of item printing means, an accumulator for adding and printing totals, a platen, a rock shaft supporting said platen for swinging movement, means for rocking said shaft to move said platen to and from printing position with respect either to the item printing means or the accumulator, means under the control of the platen operating means for rotating said platen to advance the paper for each printing operation of the platen, and a segmental rack operatively connected with the platen for partially rotating said platen to present the print point on the paper either to the item printing means or the accumulator.

26. In a calculating machine, the combination of item printing means, an accumulator for adding and printing totals, a rock shaft, rocker-arms borne by said shaft, a platen, a shaft journaled in said rocker-arms and supporting said platen, means for rocking said rock shaft to move said platen to and from printing position with respect either to the item printing means or the accumulator, means under the control of the platen operating means for rotating said platen to advance the paper for each printing operation of the platen, a segmental rack revoluble on said rock shaft and operatively connected with said platen, a segmental rack revoluble on the platen shaft and meshing with said first-mentioned rack, and means for rocking said second-mentioned rack to rock said first-mentioned rack for partially rotating said platen to present the print point on the paper either to the item printing means or the accumulator.

27. In a calculating machine, the combination of item printing means, an accumulator for adding and printing totals thereof, a platen movable in opposite directions to print items or totals, a reciprocatory bar, a member slidably attached to said bar, an actuator operative by said member for moving the platen to and from printing position with respect either to the item printing means or the accumulator, and means for controlling the direction of motion of the platen.

28. In a calculating machine, the combination of item printing means, an accumulator for adding and printing totals, a platen movable in opposite directions to print items or totals, a reciprocatory bar, a member slidably attached to said bar, a device carried by said bar and releasably engaging said member to cause the latter to travel with said bar, an actuator operative by said member for moving the platen to and from printing position with respect either to the item printing means or the accumulator, means for controlling the direction of movement of the platen, and a pair of dogs, one of said dogs being adapted to disengage said device from said member after each movement of the platen to printing position, and the other being adapted to disengage said device from said member after each movement of the platen from printing position.

29. In a calculating machine, the combination of item printing means, an accumulator for adding and printing totals, a platen movable in opposite directions to print items or totals, a reciprocatory bar, a member carried by said bar and containing a cam slot, an actuator operative by the cam slot in said member for moving the platen to and from printing position with respect either to the item printing means or the accumulator, and means for controlling the direction of movement of the platen.

30. In a calculating machine, the combination of a plurality of printing sectors having finger-pieces for actuating same, means for locking each sector in the position to which same has been moved, means for releasing all of the sectors in series to permit the return thereof, a ratchet wheel actuated by each finger-piece, pawls for engaging said ratchets to prevent subsequent setting of each sector until same returns to its initial position, detents under the control of the finger-pieces for holding said pawls normally out of engagement with said ratchets, and springs for moving said pawls into engagement with said ratchets when released by said detents.

31. In a calculating machine, the combination of item printing mechanism, an accumulator coöperative therewith, a non-add key, means controlled by said key for permitting the items to be printed without being added in the accumulator, and a printing device connected with said key for actuation thereby.

32. In a calculating machine, the combination of item printing mechanism, an accumulator coöperative therewith, a platen movable to and from printing position with respect either to the item printing mechanism or the accumulator, a non-add key, means controlled by said key for permitting the items to be printed without being added in the accumulator, a printing device controlled by said key and movable to and from printing position, and means controlled by said key for locking the platen operating means from operation until after said printing device is set in printing position.

33. In a calculating machine, the combination of item printing mechanism, an accumulator coöperative therewith, a platen having means for moving same to and from printing position with respect either to the item printing mechanism or the accumulator, a total key, a non-add key, means controlled by the second-named key for permitting the items to be printed without being added in the accumulator, and means for locking the said second-named key from operation when the total key is depressed.

34. In a calculating machine, the combination of item printing mechanism, an accumulator coöperative therewith, a platen having means for moving same to and from printing position with respect either to the item printing mechanism or the accumulator, a non-add key, means controlled by said key for permitting the items to be printed without being added in the accumulator, and a device for locking the non-add key in its depressed position.

35. In a calculating machine, the combination of item printing mechanism, an accumulator coöperative therewith, a platen having means for moving same to and from printing position with respect either to the item printing mechanism or the accumulator, a non-add key, means controlled by said key for permitting the items to be printed without being added in the accumulator, a device for locking the non-add key in its depressed position, and means controlled by the platen operating means for unlocking the non-add key after the operation of printing the item.

36. In a calculating machine, the combination of item printing devices, an accumulator coöperative therewith, error keys individual to the respective item printing devices for permitting restoration thereof, a platen having means for moving same to and from printing position with respect either to the item printing devices or the accumulator, a non-add key, means controlled by said non-add key for permitting the items to be printed without being added in the accumulator, means for locking said non-add key in its depressed position, and means controlled by the error keys for unlocking said non-add key to permit the restoration of the latter.

37. In a calculating machine, the combination of item printing means, an accumulator embodying a set of adding wheels, a set of bars operative by the item printing means for actuating the adding wheels of the accumulator, a jack for raising said bars to permit the latter to actuate the adding wheels of the accumulator, a platen having means for moving same to and from printing position with respect either to the item printing means or the accumulator, a rock shaft, means operative by said rock shaft for raising said jack, means operative by the platen operating means for rocking said shaft, and means for rendering the rocking means for said shaft temporarily inoperative, thereby to permit the items to be printed without being added in the accumulator.

38. In a calculating machine, the combination of item printing devices, an accumulator embodying a set of adding wheels, a set of bars operative by the item printing means for actuating the adding wheels of the accumulator, a jack for raising said bars to permit the latter to actuate said wheels, a rock shaft, means operative by said shaft for raising said jack, a plate fixed to said shaft, a shiftable plate connected to turn with the plate first mentioned and bearing a projection, a crank plate loosely mounted on said shaft and having a notch to receive the projection on said shiftable plate, an operating bar connected to said crank plate, and a non-add key operative to move the shiftable plate out of operative relation with the crank plate, thereby to prevent actuation of the accumulator wheels by their operating bars.

39. In a calculating machine, the combination of item printing mechanism embodying a set of reciprocatory bars, an accumulator embodying a set of adding wheels operative by said bars, a jack for setting said bars in operative relation to said wheels, a rock shaft, means operative by said shaft for raising said jack, a plate capable of being coupled or uncoupled with respect to said shaft, and an operating bar connected to said plate.

40. In a calculating machine, the combination of item printing mechanism, embodying a set of reciprocatory bars, an accumulator embodying a set of adding wheels operative by said bars, a jack for setting said bars in operative relation to said wheels, a rock shaft, means operative by said shaft for raising said jack, a plate capable of being coupled or uncoupled with respect to said shaft, an operating bar connected to said plate, and a key operative to uncouple said plate from said shaft, thereby to permit the operating bar to move without rocking said shaft.

41. In a calculating machine, the combination of item printing mechanism embodying a set of reciprocatory bars, an accumulator embodying a set of adding wheels operative by said bars, a jack for setting said bars in operative relation to said wheels, a rock shaft, means operative by said shaft for raising said jack, a plate capable of being coupled or uncoupled with respect to said shaft, an operating bar connected to said plate, a key operative to uncouple said plate from said shaft, thereby to permit the operating bar to move without rocking said shaft, and means borne by said plate for locking said key from operation while said plate is being rocked.

42. In a calculating machine, the combination of item printing mechanism embodying a set of reciprocatory bars, an accumulator embodying a set of adding wheels operative by said bars, a jack for setting said bars in operative relation to said wheels, a rock shaft, means operative by said shaft for raising said jack, a plate fixed to said shaft, a shiftable plate connected to turn with the plate first mentioned and bearing a projection, a crank plate loosely mounted on said shaft and having a notch to receive the projection on the shiftable plate, an operating bar connected to said crank plate, means operative for moving the shiftable plate to disengage the projection on same from the notch in said crank plate, thereby to allow the operating bar to move without rocking said shaft, and a lock for preventing said shiftable plate from rocking when same is moved to disengage the projection thereon from the notch in said crank plate.

43. In a calculating machine, the combination of a set of accumulator wheels, means for normally holding the accumulator wheels in non-printing position, carry-over mechanism, and means controlled by the carry-over mechanism to set the accumulator wheels in printing position.

44. In a calculating machine, the combination of a set of accumulator wheels each bearing a cipher type-face, means for normally holding each wheel with its cipher type-face in non-printing position, carry-over mechanism, and means controlled by the carry-over mechanism to set the accumulator wheels with the cipher type-faces in printing position.

45. In a calculating machine, the combination of a set of accumulator wheels, each bearing a cipher type-face, carry-over mechanism, a member engaging each wheel and having a normal tendency to turn same to cipher printing position, and a latch controlling said member and releasable by the carry-over mechanism.

46. In a calculating machine, the combination of a set of accumulator wheels each bearing a cipher type-face, a set of reciprocatory members, a set of carry-over pawls each carried by one of said members, means releasable by said wheels for normally holding said members in inoperative relation with respect to said wheels, means for moving each released member to set its carry-over pawl in operative relation with respect to its wheel, means operative upon each released member for actuating same to produce the carry-over between the wheels, a set of members each engaging one of said wheels and having a normal tendency to turn same to cipher printing position, and a latch controlling each of said last-mentioned members and releasable by its coöperating reciprocatory member when the latter is released.

47. In a calculating machine, the combination of a set of accumulator wheels each bearing a cipher type-face, a set of reciprocatory members, a set of carry-over pawls each carried by one of said members, means releasable by said wheels for normally holding said member in inoperative relation with respect to said wheels, means for moving each released member to set its carry-over pawl in operative relation with respect to its wheel, means operative upon each released member for actuating same to produce the carry-over between the wheels, a set of members each engaging one of said wheels and having a normal tendency to turn same to cipher printing position, a set of latches each controlling one of said last-mentioned members, and a tripping device controlled by each reciprocatory member for releasing its coöperating latch.

48. In a calculating machine, the combination of a set of item printing means, an accumulator embodying accumulator wheels having cipher type-faces thereon, means for normally holding said wheels with their cipher type-faces in non-printing position, means controlled by the item printing means for setting said wheels in cipher printing position, carry-over mechanism, and means controlled by the carry-over mechanism for actuating said setting means.

49. In a calculating machine, the combination of item printing means, a set of accumulator wheels, a platen having means for moving it to print either an item or a total, a set of reciprocatory members, a set of carry-over pawls each carried by one of said members, means for holding each member normally in inoperative relation with respect to its coöperating wheel and releasable by the latter, means for moving each released member to set its carry-over pawl in operative relation with respect to its coöperating wheel, and a device operable by the platen operating means for reciprocating said members.

50. In a calculating machine, the combination of item printing means, a set of accumulator wheels, a platen having means for moving it to print either an item or a total, means for normally holding the accumulator wheels in non-printing position, carry-over mechanism operable by the platen operating means, and means controlled by the carry-over mechanism to set the accumulator wheels in printing position.

51. In a calculating machine, the combination of item printing means, a set of accumulator wheels each bearing a cipher type-face, a platen having means for moving it to print either an item or a total, means for normally holding each wheel with its cipher type-face in non-printing position, carry-over mechanism operable by the platen operating means, and means controlled by the carry-over mechanism to set the accumulator wheels with the cipher type-faces in printing position.

52. In a calculating machine, the combination of item printing means, a set of accumulator wheels each bearing a cipher type-face, a platen having means for moving it to print either an item or a total, carry-over mechanism operable by the platen operating means, a member engaging each wheel and having a normal tendency to turn same to cipher printing position, and a latch releasable by the carry-over mechanism for holding said member normally in engagement with its coöperating wheel.

53. In a calculating machine, the combination of item printing means, a set of accumulator wheels, a platen having means for moving it to print either an item or a total, carry-over mechanism operable by the platen operating means, means for normally holding the accumulator wheels in non-printing position and operable by either the item printing means or the carry-over mechanism, clearing mechanism operable by the platen operating means, and means controlled by the clearing mechanism for setting the accumulator wheels in non-printing position.

In testimony whereof we hereunto affix our signatures in the presence of two witnesses.

ALBERT JOHN MEIER.
WILLIAM L. SWIFT.
EDWIN L. RELLER.

Witnesses:
GEORGE G. ANDERSON,
WALTER C. GUELS.